United States Patent
Kanenari et al.

(10) Patent No.: US 6,397,913 B1
(45) Date of Patent: Jun. 4, 2002

(54) PNEUMATIC TIRE HAVING CRESCENT SECTIONAL SHAPE REINFORCING LINER LAYER

(75) Inventors: Daisuke Kanenari; Yoshiaki Hashimura; Zenichiro Shida; Tadashi Higuchi, all of Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/297,076

(22) PCT Filed: Sep. 29, 1998

(86) PCT No.: PCT/JP98/04376

§ 371 (c)(1),
(2), (4) Date: May 3, 1999

(87) PCT Pub. No.: WO99/16823

PCT Pub. Date: Apr. 8, 1999

(30) Foreign Application Priority Data

| Sep. 29, 1997 | (JP) | 9-264245 |
| Oct. 13, 1997 | (JP) | 9-278959 |
| Oct. 15, 1997 | (JP) | 9-281985 |
| Oct. 21, 1997 | (JP) | 9-288661 |
| Oct. 23, 1997 | (JP) | 9-291025 |
| Oct. 24, 1997 | (JP) | 9-292959 |
| Nov. 18, 1997 | (JP) | 9-316980 |
| Jan. 20, 1998 | (JP) | 10-008920 |

(51) Int. Cl.[7] ............... B60C 1/00; B60C 17/00
(52) U.S. Cl. ........... 152/517; 152/524; 152/525; 152/555; 152/DIG. 12
(58) Field of Search ............. 152/524, 525, 152/517, 555, DIG. 12

(56) References Cited

U.S. PATENT DOCUMENTS

| 4,826,925 A | * | 5/1989 | Ozawa et al. | 525/331.8 |
| 4,990,570 A | * | 2/1991 | Saito et al. | 525/254 |
| 5,158,627 A | * | 10/1992 | Saneto et al. | 152/517 |
| 5,405,690 A | * | 4/1995 | Hirakawa | 428/327 |
| 5,988,248 A | * | 11/1999 | Sandstrom et al. | 152/DIG. 12 |

FOREIGN PATENT DOCUMENTS

| JP | 1-306443 | | 12/1989 |
| JP | 3-192138 | | 8/1991 |
| JP | 5-50813 | * | 3/1993 |
| JP | 5-185805 | | 7/1993 |
| JP | 9-143306 | * | 6/1997 |
| JP | 9-295378 | * | 11/1997 |
| JP | 9-295379 | * | 11/1997 |

* cited by examiner

Primary Examiner—Steven D. Maki
(74) Attorney, Agent, or Firm—Arent Fox Kintner Plotkin & Kahn

(57) ABSTRACT

A pneumatic tire constituting part or all of the part members constituting the pneumatic tire by a rubber composition containing, based on a total 100 parts by weight of a rubber containing at least 70 parts by weight of an ethylenic unsaturated nitrile-conjugated diene-based highly saturated rubber having a content of conjugated diene units of not more than 30 percent by weight, 0 to 120 parts by weight of zinc methacrylate and 0 to 60 parts by weight of carbon black and having a total of formulations of zinc methacrylate and carbon black of 10 to 120 parts by weight, and providing, between the above part members and the adjoining diene-based rubber layer, a bonding rubber layer comprising of a rubber composition containing, based on a total 100 parts by weight of a predetermined diene-based rubber and acrylonitrile butadiene copolymer rubber, 5 to 80 parts by weight of a predetermined aromatic petroleum resin.

4 Claims, 11 Drawing Sheets

Fig. 2
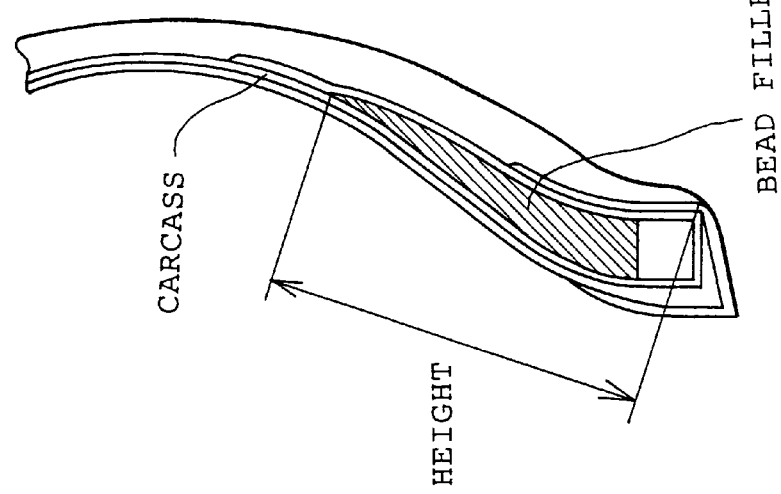
(c)
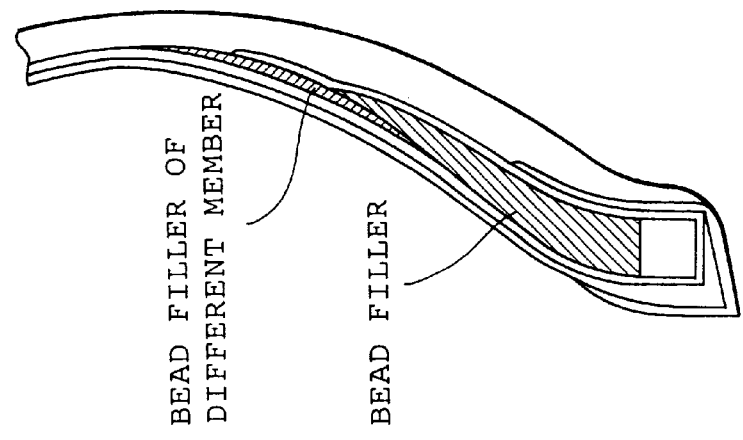
(b)
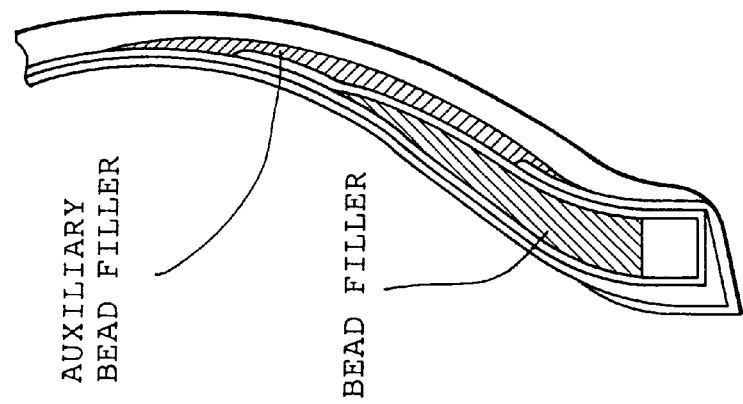
(a)

Fig. 5
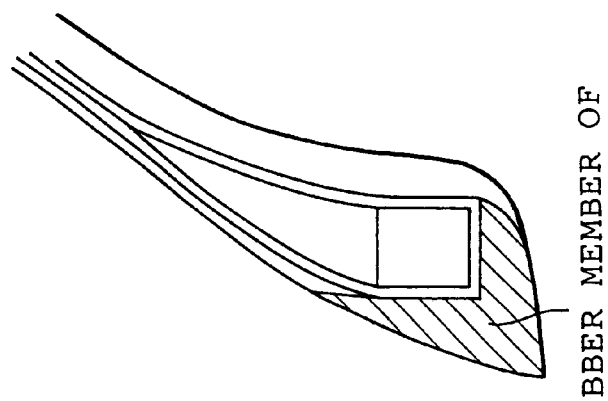
(b)
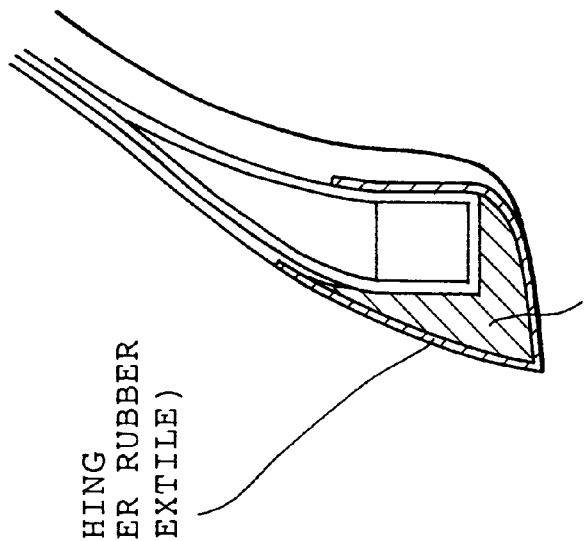
(a)

ated NBR as a reinforcing layer for part of the inside and outside layers of the tire or using it as a white or colored decorative member for the outer surface of the tire.

PNEUMATIC TIRE HAVING CRESCENT SECTIONAL SHAPE REINFORCING LINER LAYER

TECHNICAL FIELD

The present invention relates to a pneumatic tire, more particularly relates to a pneumatic tire using a rubber containing a specific hydrogenated NBR (that is, "a rubber composition containing, based on a total 100 parts by weight of rubber containing at least 40 parts by weight of an ethylenic unsaturated nitrile-conjugated diene-based highly saturated rubber having a content of conjugated diene units of not more than 30 percent, 0 to 120 parts by weight of zinc methacrylate and 0 to 60 parts by weight of carbon black and having a total amount of formulations of zinc methacrylate and carbon black of 10 to 120 parts by weight") for part or all of the tire.

BACKGROUND ART

Known in the art is the use of hydrogenated NBR for tires etc., making use of the fact that vulcanized formulations of this with a zinc compound, methacrylic acid, and organic peroxide have extremely high strength characteristics (Japanese Unexamined Patent Publication (Kokai) No. 1-306443). There is the problem, however, that such hydrogenated NBR compositions are generally extremely difficult to bond with general purpose rubbers. Techniques are also being developed for bonding general purpose rubbers for tires and such members through a specific bonding layer to solve the problem of bonding (Japanese Unexamined Patent Publication (Kokai) No. 5-185805). Even with this method, however, the bonding force with the adjoining rubber is not sufficient. When applied to a tire, not only does the durability fall, but also, since two bonding layers are needed, there is the problem that the productivity of the tire worsens.

DISCLOSURE OF THE INVENTION

Therefore, an object of the present invention is to provide a pneumatic tire reducing the weight of the tire, lightening the rolling resistance, and improving the durability, abrasion resistance, cut resistance, and driving stability by constituting part or all of the part members in a tire by a rubber containing a specific hydrogenated NBR or by using a specific bonding rubber layer for the bonding layer between such part members and parts comprised of other general purpose rubbers when using the rubber containing a specific hydrogenated NBR for part of the part members and not requiring the inner layer required in the past due to the superior air barrier property of the hydrogenated NBR. Another object of the present invention is to provide a pneumatic tire using such a rubber containing a hydrogenated NBR as a reinforcing layer for part of the inside and outside layers of the tire or using it as a white or colored decorative member for the outer surface of the tire.

According to a first aspect of the present invention, an object of the present invention is the provision of a pneumatic tire which can strikingly improve the abrasion resistance and rolling resistance or improve the driving stability feeling and lighten the weight without reducing the high speed durability by applying a specific hydrogenated NBR rubber composition including the rubber containing a hydrogenated NBR and zinc methacrylate and/or carbon black for the members of the cap tread and/or under tread of the tire and further by using a specific bonding layer to strongly bond the cap tread and adjoining under tread or belt layer or the under tread and the adjoining rubber layer.

According to the present invention, there is provided a pneumatic tire having a cap tread which is comprised of a rubber composition containing, based on a total 100 parts by weight of rubber containing at least 70 parts by weight of hydrogenated NBR, 0 to 80 parts by weight of zinc methacrylate and 0 to 40 parts by weight of carbon black and having a total of the formulations of zinc methacrylate and carbon black of 10 to 120 parts weight, and providing between the cap tread and the adjoining rubber layer (normally an under tread layer or belt layer) a bonding rubber layer comprised of a rubber composition containing, based on a total 100 parts by weight of (A) at least one type of diene-based rubber selected from the group consisting of a natural rubber, polyisoprene rubber, polybutadiene rubber, and conjugated diene-aromatic vinyl copolymer rubber and (B) an acrylonitrile-butadiene copolymer rubber, (C) 5 to 80 parts by weight of an aromatic petroleum resin having an average molecular weight of 300 to 1500, a softening point of 50 to 160° C., and an iodine adsorption value of at least 20 g/100 g.

Further, according to the present invention, there is provided a pneumatic tire inserting between a cap tread and belt layer an under tread comprised of a rubber composition containing, based on a total 100 parts by weight of rubber containing at least 40 parts by weight of a hydrogenated NBR, 0 to 120 parts by weight of zinc methacrylate and 0 to 40 parts by weight of carbon black and having a total of the formulations of zinc methacrylate and carbon black of 10 to 120 parts by weight, and providing between the under tread and adjoining rubber layer a bonding rubber layer comprised of a rubber composition containing, based on a total 100 parts by weight of (A) at least one type of diene-based rubber selected from the group consisting of a natural rubber, polyisoprene rubber, polybutadiene rubber, and conjugated diene-aromatic vinyl copolymer rubber and (B) an acrylonitrile-butadiene copolymer rubber, (C) 5 to 80 parts by weight of an aromatic petroleum resin having an average molecular weight of 300 to 1500, a softening point of 50 to 160° C., and an iodine adsorption value of at least 20 g/100 g.

Further, according to the present invention, there is provided a pneumatic tire having, at a layer under a cap tread of a hydrogenated NBR rubber composition comprised of the composition of said cap tread, an under tread of a hydrogenated NBR rubber composition comprised of the composition of the under tread and having, between the under tread and the adjoining rubber layer, a bonding layer of a rubber composition comprised of the composition of the bonding rubber.

Further, according to the present invention, there is provided a pneumatic tire characterized in that a thickness of the bonding rubber layer positioned between the cap tread and the adjoining rubber layer is 0.1 to 4 mm; the thickness of the bonding layer positioned between the under tread and the adjoining rubber layer is 0.1 to 0.5 mm; the ratio of weight (A)/(B) of the component (A) and component (B) in the bonding rubber layer is 90/10 to 10/90; and the bonding rubber layer further contains at least one co-cross-linking agent selected from the group consisting of a methacrylic acid higher ester, triallyl isocyanurate, metal salt of methacrylic acid or acrylic acid, diallyl phthalate ester, and 1,2-polybutadiene and is cross-linked by an organic peroxide.

Further, according to a second aspect of the present invention, an object of the present invention is to provide a pneumatic tire which improves the run flat property by constituting a crescent sectional-shaped reinforcing liner inserted between a carcass layer of a side wall portion and inner liner layer by a specific rubber material and which strongly bonds the reinforcing liner and the adjoining rubber layer through a specific bonding rubber layer comprised of one layer.

According to the present invention, there is provided a pneumatic tire having at a side wall portion a crescent sectional-shape reinforcing liner layer comprised of a rubber composition containing, based on a total 100 parts by weight of a rubber containing 70 to 100 parts by weight of an ethylenic unsaturated nitrile-conjugated diene-based highly saturated copolymer rubber having a content of conjugated diene units of at least 30 percent by weight, 20 to 120 parts by weight of zinc methacrylate, containing no carbon black or not more than 40 parts by weight of the same, and having a total of formulations of zinc methacrylate and carbon black of not more than 120 parts by weight and bonding with an adjoining rubber layer through a bonding rubber layer containing, based on a total 100 parts by weight of (A) at least one type of diene-based rubber selected from the group consisting of a natural rubber, polyisoprene rubber, polybutadiene rubber, and conjugated diene-aromatic vinyl copolymer rubber and (B) an acrylonitrile-butadiene copolymer rubber, (C) 5 to 80 parts by weight of an aromatic petroleum resin having an average molecular weight of 300 to 1500, a softening point of 50 to 160° C., and an iodine adsorption value of at least 20 g/100 g.

Further, according to the present invention, there is provided a pneumatic tire characterized in that a thickness of the bonding rubber layer is 0.1 to 2.0 mm; the ratio of weight of the (A) diene-based rubber and (B) acrylonitrile-butadiene copolymer rubber contained in the bonding rubber layer is A:B=10:90 to 90:10; and the bonding rubber layer further contains at least one co-cross-linking agent selected from the group consisting of a methacrylic acid higher ester, triallyl isocyanurate, metal salt of methacrylic acid or acrylic acid, diallyl phthalate ester, and 1,2-polybutadiene and is cross-linked by an organic peroxide.

Further, according to a third aspect of the present invention, an object of the present invention is to provide a tire improved in durability and improved in the driving stability since it becomes possible to increase the rigidity of a side wall portion without reducing the durability of the reinforcing rubber member of the bead portion and without increasing the tire mass and it becomes possible to bond the members strongly to the adjoining rubber layers by using a hydrogenated NBR composition containing a specific hydrogenated NBR and zinc methacrylate for the reinforcing rubber member of the bead portion and using a bonding rubber composition comprised of a specific diene-based rubber, NBR, and aromatic petroleum resin for the bonding rubber layer.

According to the present invention, there is provided a tire providing a rubber composition containing, based on a total 100 parts by weight of a rubber containing 70 to 100 parts by weight of an ethylenic unsaturated nitrile-conjugated diene-based highly saturated copolymer rubber having a content of conjugated diene units of not more than 30 percent by weight, 40 to 120 parts by weight of zinc methacrylate, containing no carbon black or containing not more than 40 parts by weight of the same, and having a total of formulations of zinc methacrylate and carbon black of not more than 120 parts by weight as the reinforcing rubber layer of the bead portion at least at part of a bead filler and/or providing it as a reinforcing bead filler at the outside of the axial direction of the carcass turn up layer, and bonding with the adjoining rubber layer through a bonding rubber layer containing, based on a total 100 parts by weight of (A) at least one type of diene-based rubber selected from the group consisting of a natural rubber, polyisoprene rubber, polybutadiene rubber, and conjugated diene-aromatic vinyl copolymer rubber and (B) an acrylonitrile-butadiene copolymer rubber, (C) 5 to 80 part5 by weight of an aromatic petroleum resin having an average molecular weight of 300 to 1500, a softening point of 50 to 160° C., and an iodine adsorption value of at least 20 g/100 g.

Further, according to the present invention, there is provided a tire characterized in that a thickness of the bonding rubber layer is 0.1 to 2.0 mm; the (A) diene-based rubber and (B) acrylonitrile-butadiene copolymer rubber contained in the bonding rubber layer have a ratio by weight in the range of A:B=10:90 to 90:10; and the bonding rubber layer further contains at least one co-cross-linking agent selected from the group consisting of a methacrylic acid higher ester, triallyl isocyanurate, metal salt of methacrylic acid or acrylic acid, diallyl phthalate ester, and 1,2-polybutadiene and is cross-linked by an organic peroxide.

Further, according to a fourth aspect of the present invention, an object of the present invention is, taking note of the characteristic of hydrogenated NBR of having a higher rigidity and lower tan δ than general purpose rubber, being superior in heat resistance, weather resistance, and abrasion resistance, and having a low unvulcanized viscosity contrary to its hardness, to use a rubber composition containing a specific hydrogenated NBR and zinc methacrylate and/or carbon black for the carcass coat of a pneumatic tire, and thereby has as its object to provide a pneumatic tire comprised of a rubber which exhibits a high strength with a reduction in the amount of use of carbon or without formulation of the same, has an extremely low tan δ, and can reduce the rolling resistance of the tire by use of this for the carcass coat, can further improve the driving stability, and, since the hydrogenated MPR is also superior in air barrier property, enables elimination of the inner liner (air barrier layer) and a major reduction in weight when used for the carcass, and further uses a rubber bonding layer of a specific composition between the carcass coat and the adjoining rubber and thereby improves the bonding force and also increases the productivity.

According to the present invention, there is provided a pneumatic tire covering the reinforcing cord by a rubber composition containing, based on a total 100 parts by weight of a rubber containing at least 70 parts by weight of an ethylenic unsaturated nitrile-conjugated diene-based highly saturated rubber (hydrogenated NBR) having a content of conjugated diene units of not more than 30 percent by weight, 0 to 90 parts by weight of zinc methacrylate and 0 to 40 parts by weight of carbon black and having a total of formulations of zinc methacrylate and carbon black of 10 to 90 parts by weight and further using at least one carcass layer of $1.1\ d \leq T \leq 3.6\ d$ where the diameter of the reinforcing cord is d and the thickness of the reinforcing cord covering is T.

Further, according to the present invention, there is provided a pneumatic tire of the above composition which provides between the carcass and the tire members positioned at the outside of the carcass such as a belt and side wall, etc., a rubber composition layer containing, based on 100 parts by weight of (A) at least one type of diene-based rubber selected from the group consisting of a natural rubber, polyisoprene rubber, polybutadiene rubber, and conjugated diene-aromatic vinyl copolymer rubber and (B) an acrylonitrile-butadiene copolymer rubber, (C) 5 to 80 parts by weight of an aromatic petroleum resin having an average molecular weight of 300 to 1500, a softening point of 50 to 160° C., and an iodine adsorption value of at least 20 g/100 g.

Further, according to the present invention, there is provided a pneumatic tire characterized in that a thickness of the rubber composition positioned at the outside of the carcass is 0.1 to 1.7 mm; the ratio of weight of (A) and (B) of the rubber composition is (A)/(B)=90/10 to 10/90; the rubber composition further contains at least one co-cross-linking agent selected from the group consisting of a methacrylic acid higher ester, triallyl isocyanurate, metal salt of methacrylic acid or acrylic acid, diallyl phthalate ester, and 1,2-polybutadiene and is cross-linked by an organic peroxide; and the carcass does not have an air barrier layer.

Further, according to a fifth aspect of the present invention, an object of the present invention is to provide a pneumatic tire which reinforces at least part of the side wall of the tire by a rubber containing a hydrogenated NBR or a rubber composition containing this and zinc methacrylate and/or carbon black, and further uses a specific adhesive to ensure bonding with the adjoining rubber layer and thereby reduce the thickness of the side wall and accordingly reduce the weight of the tire without lowering the durability and cut resistance.

Further, an object of the present invention is to provide a pneumatic tire which, by using a hydrogenated NBR rubber or a hydrogenated NBR rubber composition containing zinc methacrylate for the white or colored ribbon or letter parts positioned at the surface of the side wall part of the tire, is greatly improved in weather resistance and cut resistance and which does not necessarily require an exclusive mold or can reduce the thickness of the rubber at the ribbon or letter part, can lighten the weight of the tire since not requiring a protective layer for preventing migration of the polluting antioxidant, and uses a specific adhesive to ensure bonding wih the adjoining rubber layer and thereby also improves the durability of the tire.

According to the present invention, there is provided a pneumatic tire which reinforces at least part of the side wall by a reinforcing layer comprised of a rubber composition containing, based on a total 100 parts by weight of rubber containing at least 40 parts by weight of the hydrogenated NBR, 0 to 120 parts by weight of zinc methacrylate and 0 to 30 parts by weight of carbon black and having a total of formulations of zinc methacrylate and carbon black of 10 to 120 parts by weight.

Further, according to the present invention, there is provided a pneumatic tire providing a rubber composition colored other than black at the surface of the side wall portion wherein the rubber composition is comprised of a rubber composition containing, based on a total 100 parts by weight of a rubber containing at least 30 parts by weight of a hydrogenated NBR, 0 to 90 parts by weight of zinc methacrylate and the thickness is not less than 0.5 mm.

Further, according to the present invention, there is provided a pneumatic tire providing between the reinforcing layer or rubber composition providing layer and the rubber layers adjoining these a bonding rubber layer comprised of a rubber composition containing, based on a total 100 parts by weight of (A) at least one type of diene-based rubber selected from the group consisting of a natural rubber, polyisoprene rubber, polybutadiene rubber, and conjugated diene-aromatic vinyl copolymer rubber and (B) an acrylonitrile-butadiene copolymer rubber, (C) 5 to 80 parts by weight of an aromatic petroleum resin having an average molecular weight of 300 to 1500, a softening point of 50 to 160° C., and an iodine adsorption value of at least 20 g/100 g.

Further, according to the present invention, there is provided a pneumatic tire characterized in that a thickness of the bonding rubber layer is 0.1 to 2.0 mm; the ratio of weight (A)/(B) of the (A) component and (B) component in the bonding rubber layer is 90/10 to 10/90; and the bonding rubber layer further contains at least one co-cross-linking agent selected from the group consisting of a methacrylic acid higher ester, triallyl isocyanurate, metal salt of methacrylic acid or acrylic acid, diallyl phthalate ester, and 1,2-polybutadiene and is cross-linked by an organic peroxide.

Further, according to a sixth aspect of the present invention, an object of the present invention, noticing the characteristics of hydrogenated NBR, is to provide a pneumatic tire which uses a rubber composition containing a specific composition of hydrogenated NBR and zinc methacrylate and/or carbon black for the air barrier layer of the pneumatic tire to achieve a high strength while reducing the amount of carbon used or without formulating it, which is extremely low in tan δ and superior in air barrier property and therefore enables a reduction of weight through a lower thickness of the air barrier layer and further improves the driving stability, and which uses a specific composition of a rubber bonding layer between the air barrier layer and the adjoining rubber to improve the bonding force and increase the productivity.

According to the present invention, there is provided a pneumatic tire forming an air barrier layer by a rubber composition containing, based on a total 100 parts by weight of a rubber containing at least 70 parts by weight of an ethylenic unsaturated nitrile-conjugated diene-based highly saturated rubber having a content of conjugated diene units of not more than 30 percent by weight, 0 to 90 parts by weight of zinc methacrylate and 0 to 40 parts by weight of carbon black and having a total of formulations of zinc methacrylate and carbon black of 10 to 90 parts by weight and providing between the air barrier layer and the adjoining rubber a bonding rubber layer comprised of a rubber composition containing, based on a total 100 parts by weight of (A) at least one type of diene-based rubber selected from the group consisting of a natural rubber, polyisoprene rubber, polybutadiene rubber, and conjugated diene-aromatic vinyl copolymer rubber and (B) an acrylonitrile-butadiene copolymer rubber, (C) 5 to 80 parts by weight of an aromatic petroleum resin having an average molecular weight of 300 to 1500, a softening point of 50 to 160° C., and an iodine adsorption value of at least 20 g/100 g.

Further, according to the present invention, there is provided a pneumatic tire characterized in that the thickness of the air barrier layer is 0.2 to 1.2 mm; the thickness of the bonding rubber layer is 0.1 to 1.1 mm; the ratio of weight of (A) and (B) of the rubber composition forming the bonding rubber layer is (A)/(B)=90/10 to 10/90, and the rubber composition forming the bonding rubber layer further contains at least one co-cross-linking agent selected from the group consisting of a methacrylic acid higher ester, triallyl isocyanurate, metal salt of methacrylic acid or acrylic acid, diallyl phthalate ester, and 1,2-polybutadiene and is cross-linked by an organic peroxide.

Further, according to a seventh aspect of the present invention, an object of the present invention is to provide a pneumatic tire improving the rim detachment and improving the driving stability without reducing the strength of the bead toe portion by providing at the bead toe portion a specific hydrogenated NBR composition having a hardness higher than rubber, a high strength with respect to deformation, and a small temperature dependency of the hardness compared with rubber.

According to the present invention, there is provided a pneumatic tire providing at least at part of the bead toe portion a rubber composition containing 70 to 100 parts by weight of an ethylenic unsaturated nitrile-conjugated diene-based highly saturated rubber having a content of conjugated diene units of not more than 30 percent by weight and containing 20 to 120 parts by weight of zinc methacrylate.

Further, according to the present invention, there is provided a pneumatic tire having a rubber composition of the bead toe portion further containing not more than 40 parts by weight of carbon black and having a total of formulations of zinc methacrylate and carbon black of not more than 120 parts by weight.

Further, according to the present invention, there is provided a pneumatic tire bonding the rubber member of the bead toe portion with the adjoining rubber layer through a bonding rubber layer comprised of a rubber composition containing, based on a total 100 parts by weight of (A) at least one type of diene-based rubber selected from the group consisting of a natural rubber, polyisoprene rubber, polybutadiene rubber, and conjugated diene-aromatic vinyl copolymer rubber and (B) an acrylonitrile-butadiene copolymer rubber, (C) 5 to 80 parts by weight of an aromatic petroleum resin having an average molecular weight of 300 to 1500, a softening point of 50 to 160° C., and an iodine adsorption value of at least 20 g/100 g.

Further, according to the present invention, there is provided a pneumatic tire characterized in that the ratio of weight (A)/(B) of the component (A) and component (B) in the bonding rubber layer is 90/10 to 10/90; the thickness of the bonding rubber layer is 0.1 to 1.5 mm; and the bonding rubber layer further contains at least one co-cross-linking agent selected from the group consisting of a methacrylic acid higher ester, triallyl isocyanurate, metal salt of methacrylic acid or acrylic acid, diallyl phthalate ester, and 1,2-polybutadiene and is cross-linked by an organic peroxide.

Further, according to an eighth aspect of the present invention, there is provided a pneumatic tire having at least one carcass layer comprised of rubberized organic fiber cord or steel cord and at least two belt layers comprised of rubberized organic fiber cord or steel cord, wherein at least the carcass coat rubber and the belt coat rubber are comprised of a rubber composition containing, based on a total 100 parts by weight of a rubber containing at least 40 parts by weight of an ethylenic unsaturated nitrile-conjugated diene-based highly saturated rubber having a content of conjugated diene units of not more than 30 percent by weight, 0 to 120 parts by weight of zinc methacrylate and 0 to 60 parts by weight of carbon black and having a total of formulations of zinc methacrylate and carbon black of 10 to 120 parts by weight, and providing between the rubber composition and adjoining diene-based rubber a bonding rubber layer comprised of a rubber composition containing, based on a total 100 parts by weight of (A) at least one type of diene-based rubber selected from the group consisting of a natural rubber, polyisoprene rubber, polybutadiene rubber, and conjugated diene-aromatic vinyl copolymer rubber and (B) an acrylonitrile-butadiene copolymer rubber, (C) 5 to 80 parts by weight of an aromatic petroleum resin having an average molecular weight of 300 to 1500, a softening point of 50 to 160° C., and an iodine adsorption value of at least 20 g/100 g.

Further, according to a ninth aspect of the present invention, there is provided a pneumatic tire which constitutes the carcass coat rubber, belt coat rubber, and bead filler rubber; the carcass coat rubber, belt coat rubber, bead filler, and side wall rubber; or carcass coat rubber, belt coat rubber and bead filler, side wall, rim cushion, and chafer rubber by the rubber containing the hydrogenated NBR, and provides the bonding rubber layer between the parts of these groups and the adjoining diene-based rubber members.

Further, according to a 10th aspect of the present invention, there is provided a pneumatic tire which uses at least one type of rubber selected from the group consisting of a diene-based rubber and butyl-based rubber for the cap tread and uses at least one type of rubber selected from the group consisting of a diene-based rubber, chloroprene-based rubber, butyl-based rubber, ethylene-propylene-based rubber, nitrile-based rubber, and hydrin-based rubber for the bead insulation or uses at least one type of rubber selected from the group consisting of a diene-based rubber and butyl-based rubber for the cap tread, and constitutes the rubber of the other portions by the rubber containing the hydrogenated NBR, and provides the bonding rubber layer between the same.

Further, according to the inventions of the eighth to 10th aspects, there is provided a pneumatic tire characterized in that the thickness of the bonding rubber layer is 0.1 to 2.0 mm; the ratio of weight (A)/(B) of (A) and (B) in the bonding rubber layer is 90/10 to 10/90; and the bonding rubber layer further contains at least one co-cross-linking agent selected from the group consisting of a methacrylic acid higher ester, triallyl isocyanurate, metal salt of methacrylic acid or acrylic acid, diallyl phthalate ester, and 1,2-polybutadiene and is cross-linked by an organic peroxide.

Further, according to an 11th aspect of the present invention, there is provided a pneumatic tire constituting the bead insulation rubber by at least one type of rubber selected from the group consisting of a diene-based rubber, chloroprene-based rubber, butyl-based rubber, ethylene-propylene-based rubber, nitrile-based rubber, and hydrin-based rubber, and does not provide the bonding rubber layer between the bead insulation and the adjoining rubber composition containing the hydrogenated NBR.

Further, according to a 12th aspect of the present invention, there is provided a pneumatic tire wherein the rubber at portions other than the bead insulation rubber is comprised of rubber containing the hydrogenated NBR or a pneumatic tire wherein the rubber at all portions constituting the tire is comprised of rubber containing the hydrogenated NBR.

Further, according to a 13th aspect of the present invention, there is provided a pneumatic tire using rubber containing the hydrogenated NBR colored a color other than black at least at part of the inside and outside surface of the tire.

Further, according to a 14th aspect of the present invention, there is provided a pneumatic tire not having an inner liner layer when using rubber containing a hydrogenated NBR for the rubber for predetermined part members.

BRIEF DESCRIPTION OF THE DRAWINGS

FIG. 2(a) to FIG. 2(c) are partial semisectional views in the meridian direction of a tire showing the positional relationship of a reinforcing rubber member of a bead portion of a pneumatic tire of the present invention;

FIG. 3(a) to FIG. 3(g) are partial semisectional views in the meridian direction of a tire showing the positional relationship of various reinforcing layers in a side wall of a pneumatic tire of the present invention, wherein FIG. 3(a) is a view of the structure where the reinforcing layer is provided at the surface of the side wall, FIG. 3(b) is a view-of the structure where the side wall is completely reinforced by the reinforcing layer, FIG. 3(c) is a view of the structure where a side reinforcing layer is provided between the carcass and side wall, FIG. 3(d) is a view of the structure where a side reinforcing layer is provided only near the maximum width position, FIG. 3(e) is a view of the structure where a side reinforcing layer is provided only at the top of the side wall, FIG. 3(f) is a view of the structure where the side reinforcing layer is provided only at the bottom of the side wall, and FIG. 3(g) is a view of the structure where the side reinforcing layer is provided only at the top and bottom of the side wall;

FIG. 5(a) and FIG. 5(b) are partial semisectional views in the meridian direction of a tire showing the configuration of a toe rubber member in the bead portion structure of a pneumatic tire of the present invention, wherein FIG. 5(a) is a view of an embodiment with finishing and FIG. 5(b) is a view of an embodiment without finishing;

BEST MODE FOR WORKING THE INVENTION

Figure 1:
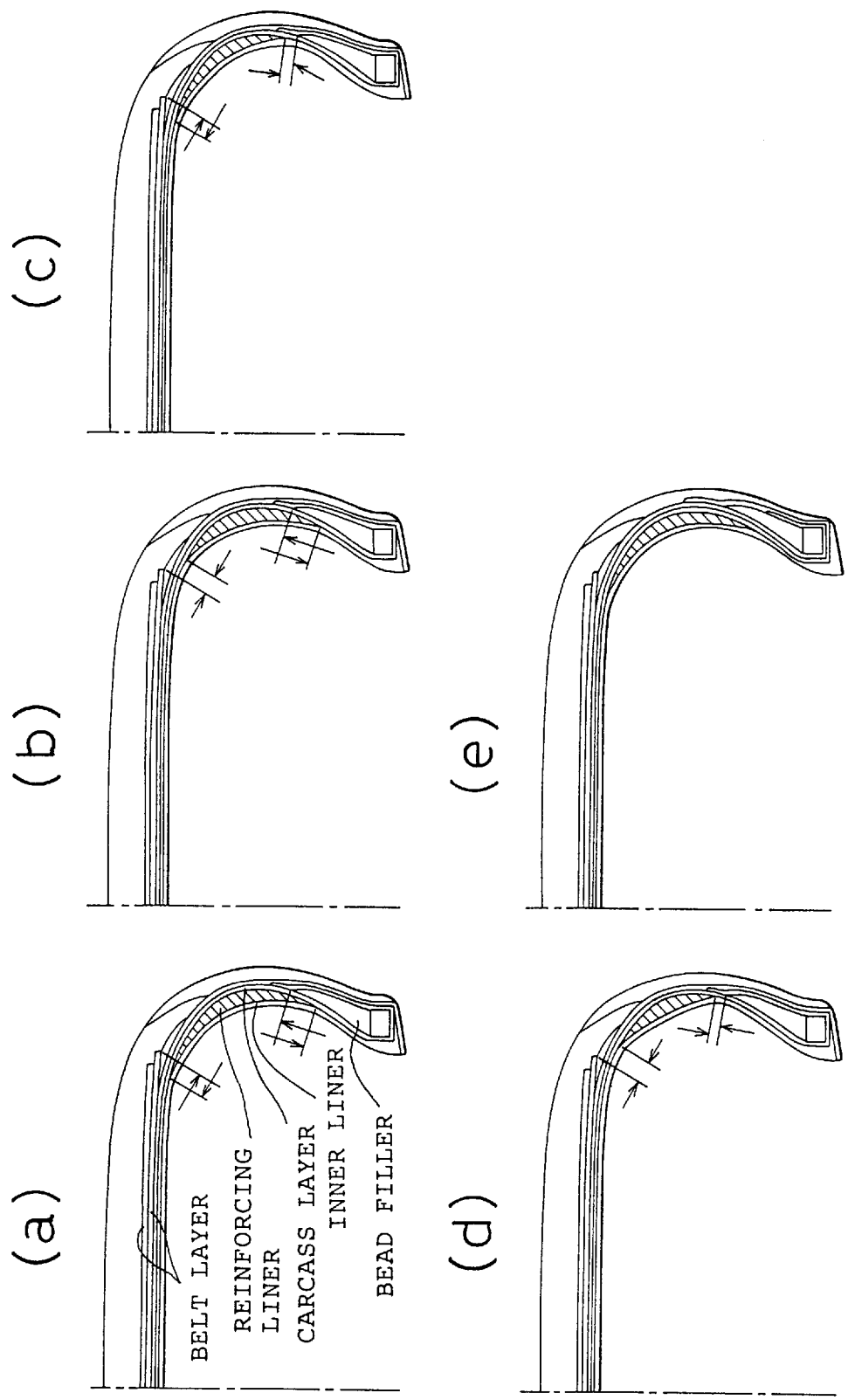
FIG. 1(a) to FIG. 1(e) are partial semisectional views in the meridian direction showing the positional relationship of a reinforcing liner layer in a run flat tire of the present invention.
Figure 3:
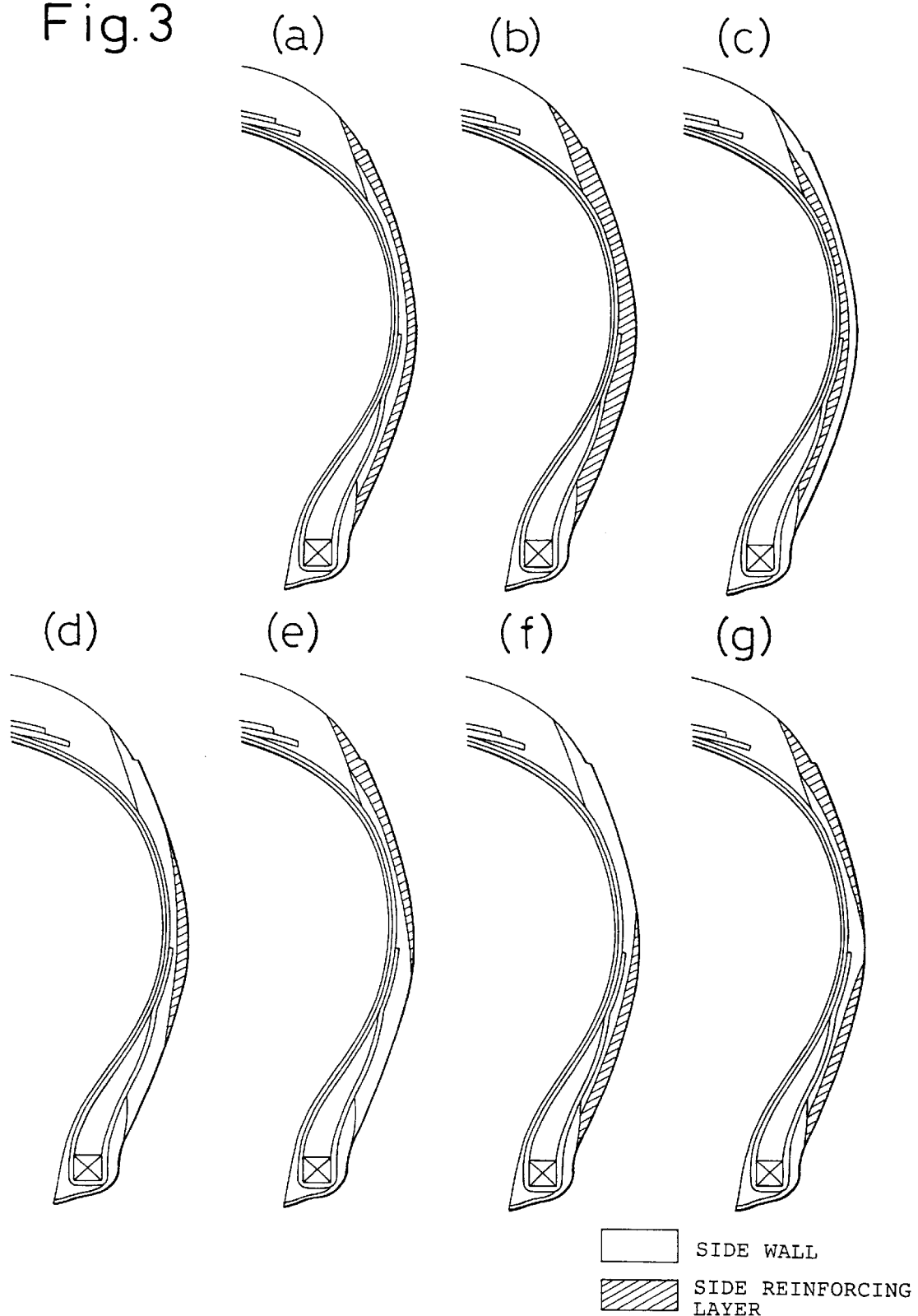

In the present invention, a rubber composition containing, based on a total 100 parts by weight of a rubber (rubber containing hydrogenated NBR) containing at least 30 parts by weight of an ethylenic unsaturated nitrile-conjugated diene-based highly saturated rubber (hydrogenated NBR) having a content of conjugated diene of not more than 30 percent by weight, preferably not more than 20 percent by weight, 0 to 120 parts by weight of zinc methacrylate and 0 to 60 parts by weight of carbon black and having a total of formulations of zinc methacrylate and carbon black of 10 to 120 parts by weight is used for part or all of the part members constituting the cap tread, under tread, reinforcing liner of the side wall portion, bead portion reinforcing layer, carcass, side wall reinforcing layer, air barrier layer, bead toe portion, carcass coat, belt coat, bead insulation, and colored layer of the pneumatic tire and, except when all of the part portions are comprised of the rubber containing hydrogenated NBR or when the bead insulation is comprised of a diene-based rubber and the adjoining part portions are comprised of rubber containing a hydrogenated NBR, providing between the part portions comprised of the rubber containing a hydrogenated NBR and the adjoining other part portions comprised of the diene-based rubber a bonding rubber layer comprised of a rubber composition containing, based on a total 100 parts by weight of (A) at least one diene-based rubber selected from the group consisting of a natural rubber, polyisoprene rubber, polybutadiene rubber, and conjugated diene-aromatic vinyl copolymer rubber and (B) an acrylonitrile-butadiene copolymer rubber, (C) 5 to 8 parts by weight of an aromatic petroleum resin having an average molecular weight of 300 to 1500, a softening point of 50 to 160° C., and an iodine adsorption value of at least 20 g/100 g so as to strongly bond the part portions comprised of the rubber containing a hydrogenated NBR and the part portions comprised of the diene-based rubber.

For the rubber containing a hydrogenated NBR used for the part portions in the present invention, a rubber composition containing, based on a total 100 parts by weight of rubber containing at least 30 parts by weight of the hydrogenated NBR, 0 to 120 parts by weight of zinc methacrylate and 0 to 60 parts by weight of carbon black and having a total amount of formulations of zinc methacrylate and carbon black of 10 to 120 parts by weight is used. In the rubber containing a hydrogenated NBR, if the hydrogenated NBR is legs than 30 parts by weight, the desired strength of the rubber cannot be obtained, and therefore the rubber is not desirable in use. Even if it is 100 parts by weight, there is no problem at all. Further, if the total amount of formulations of the zinc methacrylate and carbon black formed in the rubber containing the hydrogenated NBR is less than 10 parts by weight, the rubber is too soft and the driving stability etc. fall, while if over 120 parts by weight, the rubber is too hard and is inconvenient in use. Further, the rubber containing the hydrogenated NBR may be made an extremely high hardness compared with conventional diene-based rubbers by changing the formulations in the range of amounts of formulations of the predetermined components. At that time, the rubber is superior in durability, fatigue resistance, and cut resistance and has a low heat buildup and has a small drop in hardness at a high temperature, and therefore the rubber containing hydrogenated NBR can be effectively used for various tire part portions required for driving stability, low rolling resistance, and lightening in weight.

The hydrogenated NBR (ethylenic unsaturated nitrile-conjugated diene-based highly saturated copolymer rubber) is already known as a copolymer of an ethylenic unsaturated nitrile such as an acrylonitrile and methacrylonitrile and a conjugated diene such as a 1,3-butadiene, isopreno, 1,3-pentadiene, and the like or a terpolymer of the above two types of monomers and a monomer copolymerizable therewith, such as a vinyl aromatic compound, (meth)acrylic acid, alkyl (meth)acrylate, alkoxyalkyl (meth)acrylate, cyanoalkyl (meth)acrylate, and the like. Specifically, an acrylonitrile-butadiene copolymer rubber, acrylonitrile-isoprene copolymer rubber, acrylonitrile-butadiene-isoprene copolymer rubber, acrylonitrile-butadiene-acrylate copolymer rubber, acrylonitrile-butadiene-acrylate-methacrylate copolymer rubber, and the like may be mentioned. These rubbers contain 30 to 60 percent by weight of ethylenic unsaturated nitrile units and the conjugated diene units are made less than 30 percent by weight, preferably less than 20 percent by weight, by a means such as partial hydrogenation of conjugated diene units.

The method of mixing the above zinc methacrylate (including types in the form of zinc dimethacrylate) and/or carbon black with the hydrogenated NBR is not particularly limited, but it is possible to use a roll, bambury mixer, kneader, single-screw kneader, double-screw kneader, and other mixers usually used in the rubber industry.

Further, as the method of mixing the zinc methacrylate with the hydrogenated NBR, in addition to the method of mixing the zinc methacrylate directly with the hydrogenated NBR, it is also possible to use the method of first mixing a zinc compound such as zinc oxide and zinc carbonate with the hydrogenated NBR and causing it to sufficiently disperse, then mixing or making the methacrylic acid be absorbed to produce zinc methacrylate in the polymer. This method is preferable since it gives an extremely good dispersion of the zinc methacrylate. Further, it is preferable to use a composition comprised of the zinc methacrylate and zinc compounds dispersed in advance in the hydrogenated NBR. This may be obtained as the "ZSC" (trademark) series made by Nippon Zeon, for example, ZSC2295, ZSC2295N, ZSC2395, ZSC2298, etc.

Further, the rubber containing the hydrogenated NBR is preferably cross-linked by an organic peroxide. As the organic peroxide, one used for peroxide vulcanization of normal rubber may be used. For example, a dicumyl peroxide, di-t-butyl peroxide, t-butylcumyl peroxide, benzoyl peroxide, 2,5-dimethyl-2,5-di(t-butylperoxy)hexine-3, 2,5-dimethyl-2,5-di(benzoylperoxy)hexane, 2,5-dimethyl-2, 5-mono(t-butylperoxy)hexane, $\alpha,\alpha'$-bis(t-butylperoxy-m-isopropyl)benzene, etc. may be mentioned. These organic peroxides may be used alone or in combinations of two or more types and preferably are formulated in amounts of 0.2 to 10 parts by weight, preferably 0.2 to 6 parts by weight based on 100 parts by weight of the rubber.

The rubber containing a hydrogenated NBR may suitably contain other fillers, such as silica, calcium carbonate, talc, etc., cross-linking aids such as triallyl isocyanurate, methacrylic acid higher esters, diallyl phthalate esters, m-phenylene bismaleinimide, and 1,2-polybutadiene, other plasticizers generally used in the rubber industry, antioxidants, stabilizers, adhesives, resins, processing aids, coloring agents, etc.

According to the present invention, to improve the bonding between the part members comprised of the rubber containing the hydrogenated NBR and the diene-based rubber layers of other adjoining part members, it is necessary to bond them through a bonding rubber layer comprising (A) at least one type of diene-based rubber selected from the group consisting of a natural rubber, polyisoprene rubber, polybutadiene rubber, and conjugated diene-aromatic vinyl copolymers and (B) an acrylonitrile-butadiene copolymer rubber and comprising, based on a total 100 parts by weight of (A)+(B), 5 to 80 parts by weight of (C) an aromatic petroleum resin having an average molecular weight of 300 to 1500, a softening point of 50 to 160° C., and an iodine adsorption value of at least 20 g/100 g. If the amount of formulation of the (C) aromatic petroleum resin based on the total 100 parts by weight of the (A)+(B) is less than 5 parts by weight, the bonding force drops. Further, if over 80 parts by weight, the heat buildup is large. In both cases, this leads to tire breakage, and therefore it is not preferable to formulate outside the above amount of (C).

The ratio of formulation of the (A) diene-based rubber and (B) acrylonitrile-butadiene copolymer rubber contained in the bonding rubber layer is preferably A:B=10:90 to 90:10 from the viewpoint of the bonding force. If this range of the ratio of formulation is exceeded, the bonding force falls. Further, the thickness of the bonding rubber layer may be suitably determined by the bonding with the parts in the range of 0.1 to 4.0 mm, preferably 0.1 to 2.0 mm, more preferably 0.2 to 0.8 mm. If the thickness is less than 0.1 mm, the bonding rubber layer will break during production and the processing will become difficult, while when thicker than 4.0 mm, while there will not be a problem in ordinary driving, the bonding rubber layer will build up heat and the bonding layer will break with long driving or highly severe conditions, thus this is also not preferred.

The bonding rubber layer more preferably contains at least one co-cross-linking agent selected from the group consisting of a methacrylic acid higher ester, triallyl isocyanurate, metal salt of methacrylic acid or acrylic acid, diallyl phthalate ester, and 1,2-polybutadiene and is cross-linked by an organic peroxide.

Further, the rubber composition constituting the bonding rubber layer may suitably contain, in addition to the (C) aromatic oil resin, a blending agent generally formulated in rubbers, for example, fillers such as carbon, silica and talc, antioxidants, plasticizers, processing aids, resins, adhesives, cross-linking aids, vulcanization accelerators, tackifiers, etc.

The cap tread used in the first aspect of the invention must be comprised of a hydrogenated NBR composition containing, based on a total 100 parts by weight of rubber containing at least 70 parts by weight of the hydrogenated NBR, 0 to 80 parts by weight of zinc methacrylate and 0 to 40 parts by weight of carbon black and having a total amount of these of 10 to 120 parts by weight. If the hydrogenated NBR is less than 70 parts by weight in this hydrogenated NBR composition, the strength is insufficient, and therefore the abrasion of the members becomes too great and the tire is unsuitable for use, but with 100 parts by weight, the desired physical properties are rather excellent and the rubber is very convenient for use. Further, if the total of the zinc methacrylate and the carbon black is outside the above predetermined range, the abrasion becomes great and the result is inconvenient. The range is more preferably 30 to 100 parts by weight.

Further, the under tread used in the present invention must be comprised of a hydrogenated NBR composition containing, based on a total 100 parts by weight of rubber containing at least 40 parts by weight of the hydrogenated NBR, 0 to 120 parts by weight of zinc methacrylate and 0 to 40 parts by weight of carbon black and having a total amount of these of 10 to 120 parts by weight. If the hydrogenated NBR is less than 40 parts by weight in this hydrogenated NBR composition, it becomes difficult to obtain both of the effect of improvement of the driving stability and the reduction of the rolling resistance, but when using 100 parts by weight, the desired effects are improved. Further, the amounts of formulation of the zinc methacrylate and the carbon black and the total amount of formulations being in the above ranges of formulations is necessary from the viewpoint of the driving stability, high speed durability, etc. If outside of these ranges of formulation, the properties become poor, and therefore this is not preferable.

In the present invention, in order to strongly bond the cap tread and adjoining rubber layer and the under tread and adjoining rubber layer, it is necessary to bond them through a bonding rubber layer comprising a rubber composition containing, based on a total 100 parts by weight of (A) at least one type of diene-based rubber selected from the group consisting of a natural rubber, polyisoprene rubber, polybutadiene rubber, and conjugated diene-aromatic vinyl copolymer rubber and (B) an acrylonitrile-butadiene copolymer rubber (NBR), (C) 5 to 80 parts by weight of an aromatic petroleum resin having an average molecular weight of 300 to 1500, a softening point of 50 to 160° C., and an iodine adsorption value of at least 20 g/100 g. The composition of the bonding rubber is preferably one containing, based on a total 100 parts by weight of (A) a diene-based rubber and (B) NBR in a ratio of 90/10 to 10/90, (C) 5 to 80 parts by weight of an aromatic petroleum resin. If the ratio of (A)/(B) is not in the above range, the bonding force is poor and the durability is inferior. Further, if the ingredient (C) is less than 5 parts by weight, the bonding force is not satisfied, while if over 80 parts by weight, the rolling resistance becomes poor.

In constituting the pneumatic tire of the present invention, the cap tread and under tread of the present invention may be applied to only the cap tread portion or only the under tread portion of the tire. Further, the cap tread and under tread of the members of the present invention may be applied to both the cap tread and under tread of the tire. In the latter case, not only is the tire performance improved, but also the bonding rubber layer between the cap tread and under tread becomes unnecessary, which is more effective in terms of productivity. Further, when using the cap tread of the present invention, it is possible to use the cap tread of the present invention for only the tread shoulder part as a measure against shoulder wear or conversely to use the cap tread of the present invention for only the tread center part as a measure against center wear. In addition, it is possible to use a tread formed by laminating at least two compositions of different formulations in the thickness direction of the tread.

Further, regarding the thickness of the cap tread used in the tire configuration, the thickness must be at least the thickness from the wear indicator to the road surface. If not, the bonding rubber layer will end up becoming exposed before the wear indicator is exposed. Further, the thickness of the bonding rubber layer adjoining the cap tread must be at least 0.1 mm to sufficiently satisfy the bonding, but conversely if over 4 mm, the rolling resistance deteriorates, which is not preferable. If less than 0.1 mm, the processing becomes difficult in practice, and therefore the result is not practical industrially. The thickness of the bonding rubber layer is more preferably 0.2 mm to 2.0 mm.

Further, the thickness of the bonding rubber layer adjoining the under tread used for the tire configuration is preferably less than the thickness of the under tread itself. Preferably, it is 0.1 to 0.5 mm, more preferably 0.2 to 0.3 mm. If less than 0.1 mm, the actual processing becomes difficult, while if too thick, the effect in improving the driving stability is reduced and the weight ends up increasing as well.

In the second aspect of the present invention, when using a predetermined hydrogenated NBR composition for the material constituting a crescent sectional-shaped reinforcing liner layer inserted and positioned between the carcass layer of the side wall portion and inner liner layer in the pneumatic tire, it is possible to increase the elasticity of the reinforcing liner layer without increasing the heat buildup. Further, since the drop in modulus of elasticity at high temperatures is low, it is possible to improve the run flat property without causing an increase in the rolling resistance. Further, even if the elasticity of the material is raised, since the rubber has a higher durability compared with conventional rubber compositions, it is possible to achieve the same elasticity of the reinforcing liner layer as in the past even if reducing the sectional area of the reinforcing liner layer, and therefore it is possible to obtain a light weight run flat tire without reducing the run flat property.

The crescent sectional-shaped reinforcing liner layer used in the present invention must be comprised of a hydrogenated NBR rubber composition containing, based on a total 100 parts by weight of rubber containing 70 to 100 parts by weight of a hydrogenated NBR, 20 to 120 parts by weight of zinc methacrylate and 0 to 40 parts by weight of carbon black and having a total of the formulations of zinc methacrylate and carbon black of not more than 120 parts by weight. If the hydrogenated NBR is less than 70 parts by weight in this hydrogenated NBR composition, the rubber is too soft and is unsuitable for use, but there is no problem even if 100 parts by weight. Further, if the zinc methacrylate formulated in the hydrogenated NBR composition is less than 20 parts by weight, the rubber is too soft, while if over 120 parts by weight, it becomes too hard. Further, there is no problem even if no carbon black is formulated in the hydrogenated NBR composition, but even if formulated in an amount over 40 parts by weight, the rubber becomes brittle and will sometimes break, and therefore this is not preferable. Further, if the total of the carbon black and zinc methacrylate formulated in the hydrogenated NBR composition is over 120 parts by weight, the rubber becomes too hard and the riding comfort of the vehicle becomes poor, and therefore this is not preferred.

According to the present invention, in order to improve the bonding between the reinforcing liner layer and the adjoining rubber layer, it is necessary to bond them through a bonding rubber layer comprising (A) at least one type of diene-based rubber selected from the group consisting of a natural rubber, polyisoprene rubber, polybutadiene rubber, and conjugated diene-aromatic vinyl copolymers and (B) an acrylonitrile-butadiene copolymer rubber and comprising, based on a total 100 parts by weight of (A)+(B), (C) 5 to 80 parts by weight of an aromatic petroleum resin having an average molecular weight of 300 to 1500, a softening point of 50 to 160° C., and an iodine adsorption value of at least 20 g/100 g. If the amount of formulation of the (C) aromatic petroleum resin based on the total 100 parts by weight of the (A)+(B) is less than 5 parts by weight, the bonding force drops. Further, if over 80 parts by weight, the heat buildup is large. In both cases, this leads to tire breakage, and therefore it is not preferable to formulate outside the amount of (C).

The ratio of formulation of the (A) diene-based rubber and (B) acrylonitrile-butadiene copolymer rubber contained in the bonding rubber layer is preferably A:B=10;90 to 90:10 in view of the bonding force. If this range of the ratio of formulation is exceeded, the bonding force drops. Further, the thickness of the bonding rubber layer should be from 0.1 to 2.0 mm, more preferably 0.2 to 0.8 mm. If the thickness is less than 0.1 mm, breaks occur in the bonding rubber layer at the time of production and the processing becomes difficult. Further, if greater than 2.0 mm, while there will not be a problem in ordinary driving, the bonding rubber layer will build up heat and the bonding layer will break with long driving or highly severe conditions, and therefore this is also not preferred.

Below, an explanation will be made of the arrangement of the reinforcing liner layer in the pneumatic tire of the second aspect of the present invention referring to FIG. 1. FIGS. 1(*a*) to 1(*e*) are semisectional explanatory views along the meridian direction of the pneumatic tire of the present invention. These show the positional arrangement among the crescent sectional-shaped reinforcing liner layer, bonding rubber layer, and adjoining rubber layer in the side wall portion of the tire and the positional relationship between the belt layer of the reinforcing liner layer and the bead filler.

Positional Relationship of Reinforcing Liner (FIGS. 1(*a*) to 1(*e*)) and Merits Thereof (a) structure where the carcass layer is comprised of an inside and outside layer, the inside carcass layer is folded outward from the inside of the tire around the bead core, and the end is sandwiched between the inside carcass layer and the outside carcass layer, and a structure where the outside carcass layer is folded back at the bead core and the crescent sectional-shaped reinforcing liner layer has one end which overlaps the end of the belt layer of the tread portion and other end which overlaps the bead filler of the bead portion. However, the outside carcass layer need not be folded back at the bead core and may be turned down so that an end is positioned near the bead core.

A preferable structure where there is little local deformation of the side wall portion and the entirety deforms smoothly, and therefore the run flat property is most improved.

(b) A structure where, compared with (a), one end of the reinforcing liner layer is not overlapped with the end of the belt layer.

The local deformation of the side wall portion becomes larger than that of (a), and therefore the effect of improvement of the run flat property declines somewhat from the structure of (a), but the effect of improvement is sufficient compared with when not utilizing the present invention.

(c) A structure where, compared with (a), one end of the reinforcing liner layer does not overlap the bead filler.

The local deformation of the side wall portion becomes larger than that of (a), and therefore the effect of improvement of the run flat property declines somewhat from the structure of (a), but the effect of improvement is sufficient compared with when not utilizing the present invention.

(d) A structure where, compared with (a), both ends of the reinforcing liner layer do not overlap either the belt layer or the bead filler.

The local deformation of the side wall portion becomes larger than that of (a), and therefore the effect of improvement of the run flat property declines somewhat from the structure of (b) and (c), but the effect of improvement is sufficient compared with when not utilizing the present invention.

(e) A structure where the carcass layer is comprised of two layers and the two carcass layers are both folded back outward from the inside of the tire around the the bead core.

Compared with the structure of (a), it is possible to eliminate the step of folding back the outside carcass layer inside and the productivity is improved.

In the third aspect of the present invention, a hydrogenated NBR composition containing, based on a total 100 parts by weight of a rubber containing 20 to 100 parts by weight of the hydrogenated NBR, 40 to 120 parts by weight of zinc methacrylate and 0 to 40 parts by weight of carbon black and, when containing both ingredients of the zinc methacrylate and carbon black, having a total amount of formulations of not more than 120 parts by weight is used for the reinforcing rubber member of the bead portion in the tire (including solid tires). The hydrogenated NBR used in the base rubber member is an ethylenic unsaturated nitrile-conjugated diene-based highly saturated copolymer rubber having a content of conjugated diene units of not more than 30 percent by weight. For this hydrogenated NBR, one having a content of conjugated diene units of not more than 30 percent by weight, preferably not more than 20 percent by weight may be preferably used. If the content of the conjugated diene units is not more than 30 percent by weight, that is, if the partial hydrogenation rate is less than about 50 percent, the strength of the rubber composition becomes insufficient.

As the hydrogenated NBR used for the base rubber member, one containing 70 to 100 parts by weight of this is preferably used. If less than 70 parts by weight, the rubber becomes too soft and the desired effect cannot be achieved. Further, the zinc methacrylate formulated in the hydrogenated NBR is preferably used in a range of 40 to 120 parts by weight. If the amount formulated is less than 40 parts by weight, the rubber becomes too soft, while if over 120 parts by weight, the rubber becomes too hard and is unsuitable. Further, the carbon black need not be formulated, but may be included in an amount of formulation up to 40 parts by weight. If the amount of formulation of carbon black exceeds 40 parts by weight, the reinforcing rubber member becomes brittle and breaks, and therefore this is not preferable. Further, when the carbon black is used together with zinc methacrylate, if the total amount of formulations exceeds 120 parts by weight, the member will become too hard and the driving stability and riding comfort will become poor, and therefore it is necessary to keep the total amount to be not more than 120 parts by weight.

Here, the reinforcing rubber member of the bead portion, in the third aspect of the present invention, means the bead filler member, different bead filler member, and auxiliary bead filler member of the portions shown by the hatchings in FIGS. 2(*a*) to 2(*c*). That is, as shown in FIG. 2(*a*), basically the member of the present invention is used as a bead filler adjoining the carcass body and the turned up portion at the outside of the radial direction of the bead core. Further, as shown in FIG. 2(*b*), the bead filler can be comprised of a plurality of types of materials combined with other materials including the members of the present invention. In this case, it is a bead filler combining different types of members of the present invention, rubbers, etc. Further, as shown in FIG. 2(*c*), in addition to the bead filler, it is also possible to provide an auxiliary bead filler structure, a member of the present invention, at an adjoining location through the carcass layer. At this time, if the auxiliary bead filler is arranged to envelop the turned up end of the carcass, the durability is improved, and therefore this is preferred. Further, in all cases, the position of the turned up end of the carcass may be made higher than or lower than the upper end of the bead filler, including the different member and the auxiliary bead filler.

In the present invention, the reinforcing rubber member of the bead portion and the adjoining rubber layer are strongly bonded through a bonding rubber layer containing, based on a total 100 parts by weight of (A) at least one type of diene-based rubber selected from the group consisting of a natural rubber, polyisoprene rubber, polybutadiene rubber, and conjugated diene-aromatic vinyl copolymer rubber and (B) an acrylonitrile-butadiene copolymer rubber, (C) 5 to 80 parts by weight of an aromatic petroleum resin having an average molecular weight of 300 to 1500, a softening point of 50 to 160° C., and an iodine adsorption value of at least 20 g/100 g. If the amount of formulation of the (C) aromatic petroleum resin is less than 5 parts by weight based on the total 100 parts by weight of (A)+(B), the bonding force falls, while if over 80 parts by weight, the heat buildup becomes large and the rubber breaks when driving the tire at a high load, and therefore it is necessary to keep the above amount of formulation.

The ratio of (A):(B) contained in the bonding rubber layer is preferably a ratio by weight of 10:90 to 90:10 in terms of the bonding force. Further, the thickness of the bonding rubber layer is preferably 0.1 to 2.0 mm, more preferably 0.2 to 0.8 mm. If this is less than 0.1 mm, the bonding rubber layer may break at the time of laminar shaping by extrusion etc. and the processing will become difficult. If thicker than 2.0 mm, when the tire is run at a high load, the bonding rubber layer will build up heat, and therefore the durability will fall.

The carcass used for the pneumatic tire according to the fourth aspect of the present invention must be comprised by covering the reinforcing cord by a rubber composition containing, based on a total 100 parts by weight of a rubber containing at least 70 parts by weight of the hydrogenated NBR, 0 to 90 parts by weight of zinc methacrylate and 0 to 40 parts by weight of carbon black and having a total of formulations of zinc methacrylate and carbon black of 10 to 90 parts by weight and further using at least one carcass of $1.1\ d \leq T \leq 3.6\ d$ where the diameter of the reinforcing cord is d and the thickness of the reinforcing cord covering is T. Here, the reinforcing cord does not necessarily have to be positioned at the center in the thickness direction of the carcass. So long as the thickness of one of the rubber coverings satisfies the minimum thickness (0.05 d when the diameter of the cord is d), it may be positioned to one side. Further, the thickness of the rubber covering does not have to be constant in the cord direction. So long as the minimum thickness is 1.1 d and the average thickness does not exceed 3.6 d, it may be freely set. Further, when two or more layers of carcass are used, the bonding rubber layer need only be outside of the outermost carcass layer. When providing the air barrier layer of the butyl rubber at the innermost surface of the tire, the bonding rubber layer is not necessarily required between them.

The thickness of the carcass is made 1.1 to 3.6 times the reinforcing cord because it has to be made 1.1 times the minimum carcass cord diameter to effectively envelop the carcass cord and further if over 3.6 times, there is no longer any merit in weight even if eliminating the air barrier layer.

If the air barrier property is set the same as in a conventional tire, the weight can be reduced by the amount of the air barrier layer. Further, if desiring to make the air barrier property better than in the past, it is sufficient to increase the gauge of the carcass cord. By using this method, it is possible to provide a tire with little air leakage without increasing the manufacturing costs.

The hydrogenated NBR has a high polymer strength and enables a reduction in the amount of formulation of carbon, which is a cause of a high tan δ compared with general purpose rubber. Further, a rubber composition comprising the hydrogenated NBR of the present invention plus zinc methacrylate exhibits a high strength even without formulation of carbon and an extremely low tan δ. By using this for the carcass coat, it is possible to reduce the rolling resistance of the tire.

Further, the hydrogenated NBR is superior in air barrier property, and therefore a tire using the hydrogenated NBR for a carcass does not necessarily require an air barrier layer and therefore a large reduction in weight can be achieved. Here, by just removing the air barrier layer, the rigidity of the tire as a whole will end up falling while the weight is reduced. With the carcass coat of the present invention, however, it is possible to increase the amount of the zinc methacrylate so as to increase the modulus of the rubber without increasing the tan δ as with a carbon formulation and thereby make up for the insufficient rigidity due to the greater thinness.

According to the present invention, in order to increase the bonding between the carcass and adjoining rubber layer, it is necessary to bond them through a bonding rubber layer comprising (A) at least one type of diene-based rubber selected from the group consisting of a natural rubber, polyisoprene rubber, polybutadiene rubber, and conjugated diene-aromatic vinyl copolymers and (B) an acrylonitrile-butadiene copolymer rubber and comprising, based on a total 100 parts by weight of (A)+(B), 5 to 80 parts by weight of (C) an aromatic petroleum resin having an average molecular weight of 300 to 1500, a softening point of 50 to 160° C., and an iodine adsorption value of at least 20 g/100 g. If the amount of formulation of the (C) aromatic petroleum resin based on the total 100 parts by weight of the (A)+(B) is less than 5 parts by weight, the bonding force drops. Further, if over 80 parts by weight, the heat buildup is large. In both cases, this leads to tire breakage, and therefore it is not preferable to formulate outside the amount of (C).

Regarding the thickness of the bonding rubber layer used above, in the case of a carcass, one with a thickness in the range of 0.1 to 1.7 mm so as to be positioned at the outside of the carcass is preferably used. If the thickness of the bonding rubber layer is at least 0.1 mm, the bonding property is sufficiently satisfied, but as a practical range in industry, it is preferably at least 0.2 mm. Conversely, if the thickness exceeds 1.7 mm, the weight increases too much and the rolling resistance deteriorates, and therefore this is also not preferred.

The composition of the bonding rubber layer is preferably a total 100 parts by weight of (A) diene-based rubber and (B) acrylonitrile-butadiene copolymer rubber in a ratio by weight of 90/10 to 10/90 and 5 to 80 parts by weight of the (C) aromatic petroleum resin.

In the fifth aspect of the present invention, it is contemplated that a hydrogenated NBR rubber composition having rigidity and superior in weather resistance and durability is used for at least part of the side wall in a pneumatic tire or for the white or colored ribbon or letter portion placed at the surface part of the side wall. Using this hydrogenated NBR composition for the tire member, however, results in a problem of bonding of the material itself with the general purpose rubber used for the tire and is accompanied by a large amount of difficulty in practical use. In the present invention, however, a specific rubber adhesive extremely superior in terms of bonding between the members and general purpose rubber was discovered whereby the problem was eliminated all at once and the present invention realized.

According to one embodiment of the present invention, a reinforcing layer comprised of a rubber composition containing, based on a total 100 parts by weight of rubber containing at least 40 parts by weight of an ethylenic unsaturated nitrile-conjugated diene-based highly saturated copolymer rubber having a content of conjugated diene units of not more than 30 percent by weight (hydrogenated NBR), 0 to 120 parts by weight of zinc methacrylate and 0 to 30 parts by weight of carbon black and having a total of formulations of zinc methacrylate and carbon black of 10 to 120 parts by weight is used for at least part of the side wall portion of the pneumatic tire.

As the hydrogenated NBR contained in the rubber composition, one having a content of conjugated diene units of preferably not more than 30 percent by weight, preferably not more than 20 percent by weight is used. If the content of the conjugated diene units is more than 30 percent by weight, that is, the partial hydrogenation rate is not more than about 50 percent, the strength of the rubber composition becomes insufficient. Further, as the hydrogenated NBR used for the base rubber member used for the reinforcing layer, one containing 40 to 100 parts by weight of the same is used. If the amount is less than 40 parts by weight, the rubber becomes too soft and the desired effect as a reinforcing layer cannot be achieved. Further, the total amount of formulations of zinc methacrylate and/or carbon black acting as the reinforcing agent formulated in the hydrogenated NBR composition is preferably made 10 to 120 parts by weight. If the amount of formulation is less than 10 parts by weight, the rubber is too soft and the cut resistance deteriorates, while if over 120 parts by weight, it is too hard and the durability deteriorates, and therefore both cases are unsuitable.

Figure 4:
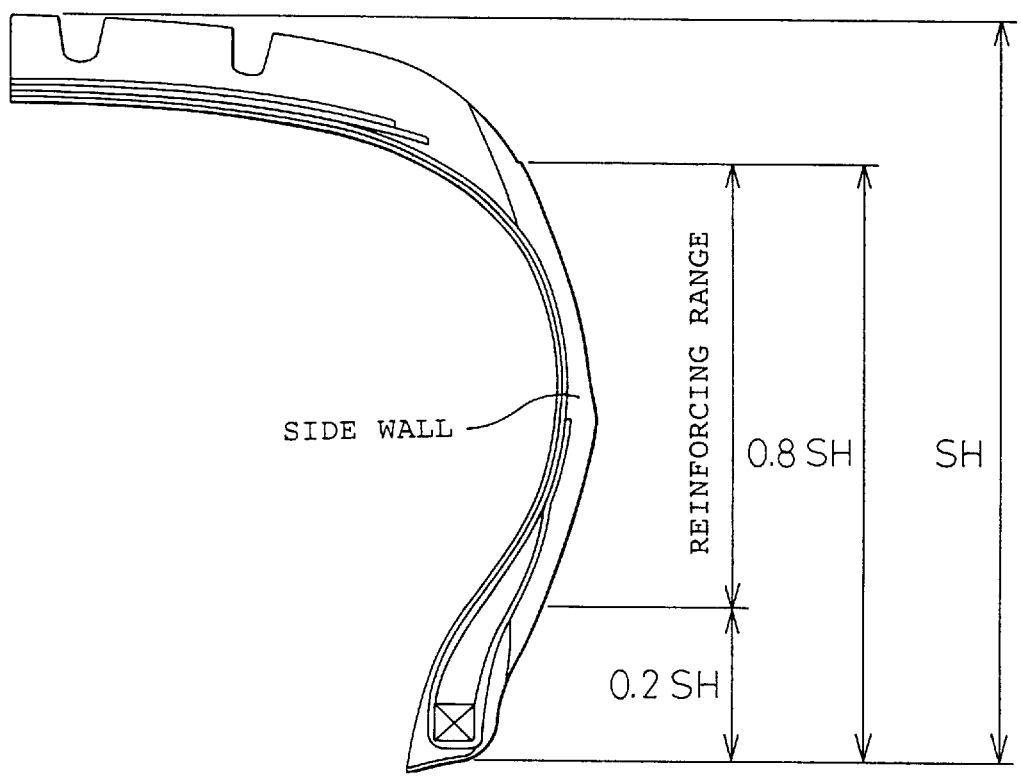
FIG. 4 is a view explaining the positional relationship of a reinforcing layer at a side part of the pneumatic tire of the present invention.

The reinforcing layer at the side wall portion in the present invention can be positioned in various arrangements. For example, it can be arranged as shown in FIGS. 3(a) to 3(g). Further, regarding the range of the reinforcing layer at the side wall portion, in all of the cages shown in FIG. 3, it is sufficient that at least part of the range of 20 to 80 percent of the sectional height SH of the tire be reinforced by the side part reinforcing layer as shown in FIG. 4.

According to another embodiment of the present invention, a rubber composition colored other than black containing, based on a total 100 parts by weight of a rubber containing at least 30 parts by weight of a hydrogenated NBR, 0 to 90 parts by weight of zinc methacrylate, is provided at the surface of the side wall portion of the pneumatic tire at a thickness of not less than 0.5 mm. According to this embodiment of the present invention, by providing a rubber composition comprised of the above predetermined composition at the surface of the side wall of the pneumatic tire to a predetermined thickness, it is possible to greatly improve the weather resistance and cut resistance of the tire and use the rubber composition provided as a white or colored ribbon or letters and thereby achieve an aesthetic effect of the tire.

The hydrogenated NBR contained in the rubber composition must be present in an amount of 30 to 100 parts by weight in the case of the above embodiment. Further, 0 to 90 parts by weight of zinc methacrylate is formulated in the rubber composition. The zinc methacrylate can give a sufficient cut resistance in formulations of 0 to 90 parts by weight. When formulated in an amount more than 90 parts by weight, the rubber becomes too hard and the durability becomes poor. Note that in the case of the above embodiment, in order to avoid the rubber composition becoming black, no carbon black is formulated. Further, the thickness of the rubber composition layer provided has to be at least 0.5 mm in order to be able to prevent the migration of the antioxidant, which is a cause of pollution, from the tire rubber composition. Therefore, by applying a rubber composition satisfying the above requirements to the surface of the side wall portion of the pneumatic tire, it is possible to greatly improve the weather resistance, cut resistance, and durability of the tire and reduce the thickness, and therefore the weight can be reduced. Further, no special mold like in the past is necessarily required. Further, since the hydrogenated NBR has a high polymer polarity, the polluting antioxidant does not easily migrate and therefore there is the effect that there is no discoloration even without providing a protective layer for the same.

In the present invention, further, the reinforcing layer used in the first and second embodiments and the rubber composition layers where they are provided are bonded with the adjoining rubber layers through a bonding rubber layer containing, based on a total 100 parts by weight of (A) at least one type of diene-based rubber selected from the group consisting of a natural rubber, polyisoprene rubber, polybutadiene rubber, and conjugated diene-aromatic vinyl copolymer rubber and (B) an acrylonitrile-butadiene copolymer rubber, (C) 5 to 80 parts by weight of an aromatic petroleum resin having an average molecular weight of 300 to 1500, a softening point of 50 to 160° C., and an iodine adsorption value of at least 20 g/100 g. If the amount of formulation value of the (C) aromatic petroleum resin based on the total 100 parts by weight of the (A)+(B) is less than 5 parts by weight, the bonding force drops and the durability deteriorates. Further, if over 80 parts by weight, the heat buildup is large and the rolling resistance deteriorates. Therefore, this amount of formulation is necessary.

Further, in the present invention, the thickness of the bonding rubber layers in the case of bonding with the reinforcing layer used in the first embodiment or rubber composition layer used in the second embodiment is 0.1 to 2.0 mm, preferably 0.2 to 1.5 mm. If less than 0.1 mm, the actual processing becomes difficult and the result is not industrially practical. Further, if thicker than 2.0 mm, the effect of reducing the weight is not obtained and the rolling resistance deteriorates.

The sixth aspect of the present invention is characterized by the use of a predetermined hydrogenated NBR composition for the material constituting the air barrier layer in the pneumatic tire and by the bonding of the air barrier layer and adjoining rubber layer through a bonding rubber layer comprising a specific diene-based rubber, acrylonitrile-butadiene copolymer rubber, and aromatic oil resin.

As the air barrier layer used in the pneumatic tire of the present invention, a hydrogenated NBR rubber composition containing, based on a total 100 parts by weight of a rubber containing at least 70 parts by weight of the hydrogenated NBR, 0 to 90 parts by weight of zinc methacrylate and 0 to 40 parts by weight of carbon black and having a total of formulations of these of 10 to 90 parts by weight is used. If the amount of formulation of the hydrogenated NBR is less than 70 parts by weight, the air barrier property deteriorates, but a sufficient air barrier property can be secured by 70 to 100 parts by weight. If the total of the zinc methacrylate and the carbon black is less than 10 parts by weight, the driving stability becomes poor, while if over 90 parts by weight, conversely the riding comfort deteriorates, and therefore these are not preferred. Further, the thickness of the air barrier layer is suitably 0.2 to 1.2 mm. If the thickness is at least 0.2 mm, the required air barrier property is sufficiently satisfied, while if over 1.2 mm, the weight unpreferably increases.

When using the hydrogenated NBR composition for the air barrier layer, since the energy loss of the hydrogenated NBR composition is small, there is no problem even if butyl rubber enters between the carcass cord at the time of vulcanization, i.e., so-called spectacle phenomenon occurs. Therefore, the tie rubber of the conventional buffer rubber sheet becomes unnecessary and the weight can be reduced by that amount. Further, the processability of the unvulcanized rubber is good and the liner can be hardened by the addition of the zinc methacrylate, and therefore it is possible to raise the rigidity of the tire and improve the driving stability.

According to the present invention, in order to improve the bonding between the air barrier layer and the adjoining rubber layer, it is necessary to bond them through a bonding rubber layer comprising (A) at least one type of diene-based rubber selected from the group consisting of a natural rubber, polyisoprene rubber, polybutadiene rubber, and conjugated diene-aromatic vinyl copolymer rubber and (B) an acrylonitrile-butadiene copolymer rubber and comprising, based on a total 100 parts by weight of (A)+(B), (C) 5 to 80 parts by weight of an aromatic petroleum resin having an average molecular weight of 300 to 1500, a softening point of 50 to 160° C., and an iodine adsorption value of at least 20 g/100 g. If the amount of formulation of the (C) aromatic petroleum resin based on the total 100 parts by weight of the (A)+(B) is less than 5 parts by weight, the bonding force drops. Further, if over 80 parts by weight, the heat buildup is large. In both cases, this leads to tire breakage, and therefore it is not preferable to formulate outside the amount of (C).

Regarding the thickness of the bonding rubber layer used, it is preferable to use a layer of a thickness of 0.1 to 1.1 mm. So long as the thickness of the bonding rubber layer is at least 0.1 mm, the bonding is sufficiently satisified, but an industrially practical range is preferably at least 0.2 mm. Conversely, if the thickness is over 1.1 mm, the weight increases too much and conversely the rolling resistance deteriorates, and therefore this is not preferred.

The composition of the bonding rubber layer is preferably a total 100 parts by weight of the (A) diene-based rubber and (B) acrylonitrile-butadiene copolymer rubber in a ratio of 90/10 to 10/90 and 5 to 80 parts by weight of (C) the aromatic petroleum resin.

The seventh aspect of the present invention is characterized mainly in that a predetermined hydrogenated NBR composition is used for the member constituting the bead toe portion of the pneumatic tire and that the bead toe portion and adjoining rubber layer are bonded through a bonding rubber layer comprised of a specific diene-based rubber, acrylonitrile-butadiene copolymer rubber, and aromatic petroleum resin.

The bead toe portion used in the present invention must be comprised of a hydrogenated NBR rubber composition containing, based on a total of 100 parts by weight of a rubber containing 70 to 100 parts by weight of the hydrogenated NBR, 20 to 120 parts by weight of zinc methacrylate. In this hydrogenated NBR rubber composition, if the hydrogenated NBR is less than 70 parts by weight, the rubber is too soft and the driving stability declines, and therefore the rubber is unsuitable for use, but there is no problem even if 100 parts by weight. Further, if the amount of zinc methacrylate formulated in the hydrogenated NBR composition is less than 20 parts by weight, the rubber is too soft and the driving stability declines, while if over 120 parts by weight, the rubber is too hard and the fit with the rim deteriorates. Further, the hydrogenated NBR composition may contain up to 40 parts by weight of carbon black. In this case, the total amount of formulations of the zinc methacrylate and the carbon black must be made not more than 120 parts by weight. If the amount of formulation of the carbon black exceeds 40 parts by weight, the rubber becomes brittle and breaks upon major deformation at the time of attachment to the tire rim. Further, if the total of the zinc methacrylate and the carbon black exceeds 120 parts by weight, the rubber becomes too hard and the fit with the rim deteriorates, and therefore this is also not preferred.

According to the present invention, in order to improve the bonding between the rubber members of the bead toe portion and the adjoining rubber layer, it is possible to bond them through a bonding rubber layer comprised of a rubber composition containing, based on a total 100 parts by weight of (A) at least one type of diene-based rubber selected from the group consisting of a natural rubber, polyisoprene rubber, polybutadiene rubber, and conjugated diene-aromatic vinyl copolymer rubber and (B) an acrylonitrile-butadiene copolymer rubber, (C) 5 to 80 parts by weight of an aromatic petroleum resin having an average molecular weight of 300 to 1500, a softening point of 50 to 160° C., and an iodine adsorption value of at least 20 g/100 g. If the amount of formulation of the (C) aromatic petroleum resin based on the total 100 parts by weight of (A)+(B) is less than 5 parts by weight, the processability of the bonding rubber deteriorates. Further, if over 80 parts by weight, the compression set deteriorates.

The ratio of formulation of the (A) diene-based rubber and the (B) acrylonitrile-butadiene copolymer rubber contained in the bonding rubber layer is preferably A:B=10:90 to 90:10 from the viewpoint of the bonding force. Further, the thickness of the bonding rubber layer should be 0.1 to 1.5 mm, more preferably 0.2 to 0.8 mm. If the thickness is less than 0.1 mm, the bonding rubber layer will break at the time of production and the processing will become difficult. Further, if thicker than 1.5 mm, the bead width becomes greater and the fit with the rim deteriorates, and therefore this is not preferred.

In the tire according to the present invention, the strain occurring at the bead toe portion at the time of general driving is small, and therefore there is no absolute need for the above bonding rubber layer, but since the strain becomes large at the bead toe portion in the case of highly severe driving (for example, circuit driving) etc., it is preferable to provide the bonding rubber layer.

Figure 6:
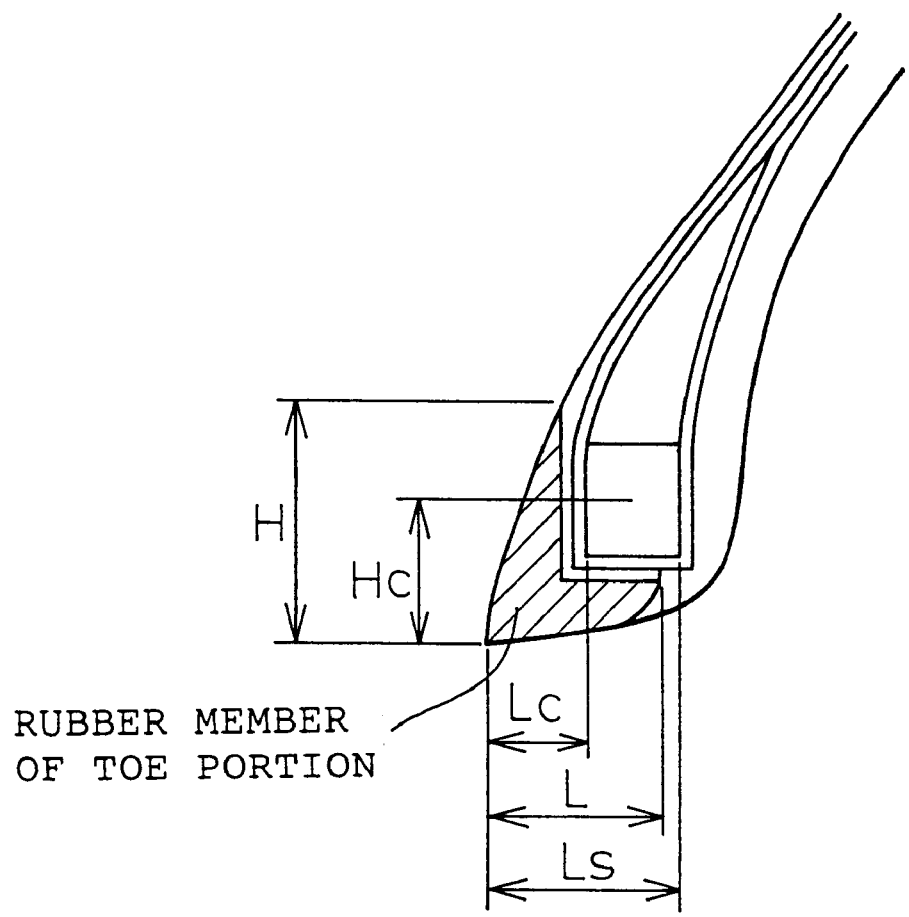
FIG. 6 is a view explaining the positional relationship of a rubber member of a toe portion in a bead toe portion of a pneumatic tire of the present invention.

The rubber members of the bead toe portion according to the present invention are actually used in the manners shown in the embodiments of FIGS. 5(a) and 5(b). Further, explaining the preferable positional relationship of the rubber members of the bead toe portion using FIG. 6, it is preferable that they be arranged to satisfy the relationship of:

$$Lc \leq L \leq Ls \text{ and } Hc \leq H \leq 2Hc$$

wherein

L: Distance in tire axial direction from bead toe to under bead core of rubber member of toe portion, Lc: Distance in tire axial direction from bead toe to inside bead core, Ls: Distance in tire axial direction from bead toe to outside bead core, H: Height in tire radial direction from bead toe of rubber member of bead portion to upper end of rubber member of toe portion, and Hc: Height in tire radial direction from bead toe of rubber member of bead portion to center of bead core.

Here, when the relationship L<Lc stands, since there is no portion facing the bottom side of the bead core, the rubber member of the toe portion is liable to detach during rim attachment. Further, when the relationship L>Ls stands, the fit of the tire and rim is liable to deteriorate. Further, when the relationship H<Hc stands, the bead portion will easily collapse during cornering and the effect of improvement of the driving stability is liable to become smaller. Further, when the relationship H>2Hc stands, the fit by the rim attachment is liable to decline somewhat.

In the eighth to 14th aspects of the present invention it is characterized in that a rubber composition containing, based on a total 100 parts by weight of a rubber containing at least 40 parts by weight of an ethylenic unsaturated nitrile-conjugated diene-based highly saturated rubber having a content of conjugated diene units of not more than 30 percent (hydrogenated NBR), 0 to 120 parts by weight of zinc methacrylate and 0 to 60 parts by weight of carbon black and having a total of formulations of zinc methacrylate and carbon black of 10 to 120 parts by weight (rubber containing hydrogenated NBR) is used for part or all of the part portions constituting the carcass coat, belt coat, bead filler, side wall, rim cushion, chafer, cap tread, and bead insulation in the pneumatic tire, and between the part portions constituted by the rubber containing the hydrogenated NBR and the adjoining other part portions constituted by a diene-based rubber, a bonding rubber layer comprised of a rubber composition containing, based on a total 100 parts by weight of (A) at least one type of diene-based rubber selected from the group consisting of a natural rubber, polyisoprene rubber, polybutadiene rubber, and conjugated diene-aromatic vinyl copolymer rubber and (B) an acrylonitrile-butadiene copolymer rubber, (C) 5 to 80 parts by weight of an aromatic petroleum resin having an average molecular weight of 300 to 1500, a softening point of 50 to 160° C., and an iodine adsorption value of at least 20 g/100 provided to strongly bond the part portions comprised of the rubber containing the hydrogenated NBR and the part portions comprised of the diene-based rubber.

For the rubber containing the hydrogenated NBR used for the part portions in the present invention, a rubber composition containing, based on a total 100 parts by weight of a rubber containing at least 40 parts by weight of the hydrogenated NBR, 0 to 120 parts by weight of zinc methacrylate and 0 to 60 parts by weight of carbon black and having a total amount of the formulations of zinc methacrylate and carbon black of 10 to 120 parts by weight is used. In this rubber containing hydrogenated NBR, if the amount of the hydrogenated NBR is less than 40 parts by weight, the desired strength of the rubber will not be obtained, and therefore this is not preferable in use. Even if 100 parts by weight, however, there is no problem at all. Further, if the total amount of formulations of the zinc methacrylate and carbon black formulated in the rubber containing hydrogenated NBR is less than 10 parts by weight, the rubber becomes too soft and the driving stability etc. fall, while if over 120 parts by weight, the rubber is too hard and is inconvenient for use. Further, the rubber containing hydrogenated NBR can be made an extremely high hardness compared with conventional diene-based rubbers by changing the formulations in the range of the amounts of formulations of the predetermined ingredients. At this time as well, the rubber is superior in durability, fatigue resistance, and cut resistance and low in heat buildup. Further, since the decline in hardness at high temperatures is small, the rubber containing the hydrogenated NBR can be effectively used for various tire part portions required for the driving stability, low rolling resistance, and lightening in weight.

According to the present invention, in order to improve the bonding between the part portions comprised of the rubber containing hydrogenated NBR and the diene-based rubber layer of the other adjoining part portions, it is necessary to bond them through a bonding rubber layer containing, based on (A) at least one type of diene-based rubber selected from the group consisting of a natural rubber, polyisoprene rubber, polybutadiene rubber, and conjugated diene-aromatic vinyl copolymer rubber and (B) an acrylonitrile-butadiene copolymer rubber and containing, based on a total 100 parts by weight of (A)+(B), (C) 5 to 80 parts by weight of an aromatic petroleum resin having an average molecular weight of 300 to 1500, a softening point of 50 to 160° C., and an iodine adsorption value of at least 20 g/100 g. If the amount of formulation of the (C) aromatic petroleum resin based on the total 100 parts by weight of (A)+(B) is less than 5 parts by weight, the bonding force declines. Further, if over 80 parts by weight, the heat buildup is large. In both cases, this leads to tire breakage, and therefore it is not preferable to formulate outside the amount of (C).

The ratio of formulating of the (A) diene-based rubber and (B) acrylonitrile-butadiene copolymer rubber contained in the bonding rubber layer is preferably A:B=10:90 to 90:10 from the viewpoint of the bonding force. If this range of the ratio of formulation is exceeded, the bonding force falls. Further, the thickness of the bonding rubber layer is preferably 0.1 to 2.0 mm, more preferably 0.2 to 0.8 mm. If the thickness is less than 0.1 mm, the bonding rubber layer will break during production and processing will become difficult, while when thicker than 2,0 mm, while there will not be a problem in ordinary driving, the bonding rubber layer will build up heat and the bonding layer will break with long driving or highly severe conditions, and therefore this is also not preferred.

Figure 7:
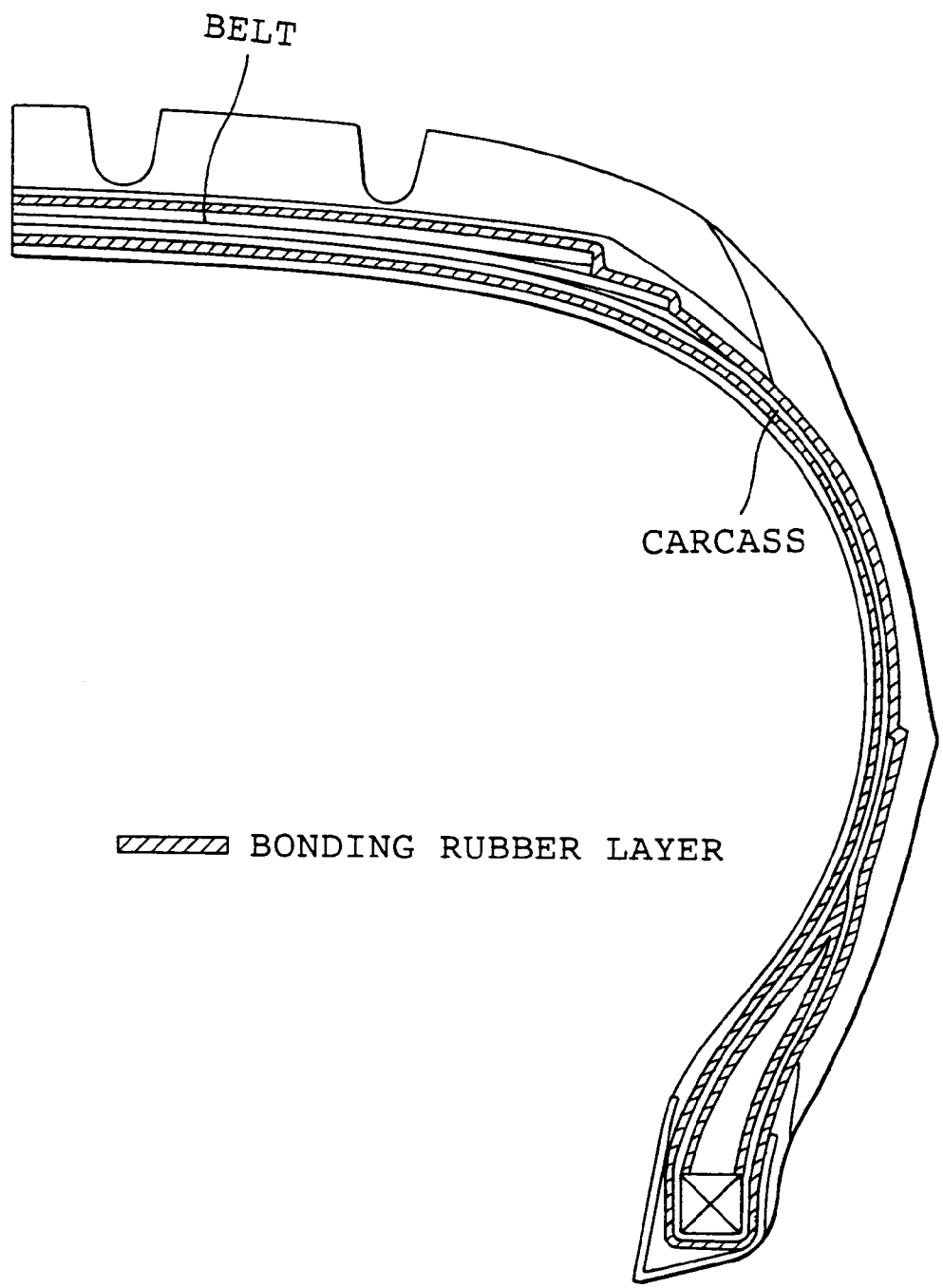
FIG. 7 is a partial semisectional view in the meridian direction of a structure where a rubber including hydrogenated NBR is positioned at a carcass coat and belt coat member of a pneumatic tire of the present invention.

According to the eighth aspect of the present invention, as shown in FIG. 7, the rubber coating the reinforcing cord of the carcass and th belt is comprised of the rubber containing hydrogenated NBR. In this case, the rubber containing hydrogenated NBR is reinforced by zinc methacrylate and/or carbon black. The other part portions may be comprised of a conventional diene-based rubber. In this case, the rubber containing hydrogenated NBR and diene-based rubber are bonded by interposing a predetermined bonding rubber layer with the rubber containing hydrogenated NBR comprising the carcass coat and belt coat.

When adopting this embodiment, since the rubber containing hydrogenated NBR is higher in hardness and lower in heat buildup and superior in cut resistance compared to a conventional diene-based rubber, the conventionally arranged under tread is not necessarily needed.

When there is no cover layer between the belt layer and tread layer and it is desired to secure the same thickness from the bottom of the tread grooves to the belt as in the past or when there is a cover layer between the belt layer and tread, the cover layer is comprised of reinforcing cord coated by a rubber composition containing hydrogenated NBR, and it is desired to secure the same thickness from the bottom of the tread grooves to the cover layer as in the past, that portion (portion where conventional under tread has been positioned) is preferably also comprised by a rubber containing the hydrogenated NBR.

Figure 8:
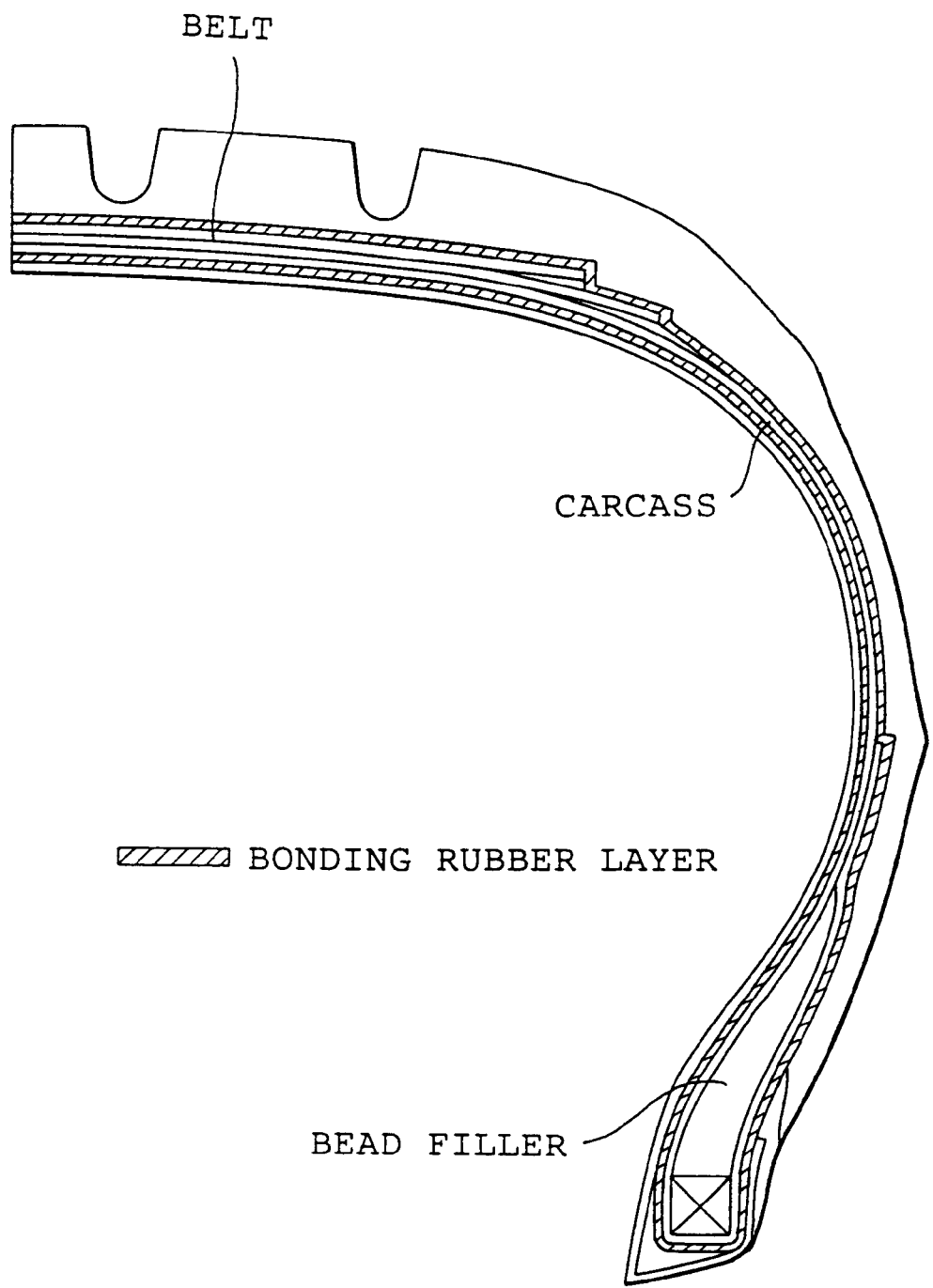
FIG. 8 is a partial semisectional view in the meridian direction of a structure where a rubber including hydrogenated NBR is positioned at a carcass coat, belt coat, and bead filler member of a pneumatic tire of the present invention.

According to a ninth aspect of the present invention, as a first aspect, as shown in FIG. 8, the rubbers of the carcass coat, belt coat, and bead filler are comprised a of rubber containing the hydrogenated NBR. In this case, since the rubber containing the hydrogenated NBR is high in strength, a tire lateral rigidity equal to that of the past can be obtained even if making the volume of the bead filler smaller and the driving stability will not decline. Further, since the heat buildup is small, the rolling resistance will not increase, and therefore the rubber can be preferably used for the bead filler rubber.

Further, if comprising the bead filler by the rubber containing hydrogenated NBR as well, since there is no need for a bonding rubber layer between the carcass coat and the bead filler, the rolling resistance can be further reduced and the productivity is improved, which is more preferable.

Figure 9:
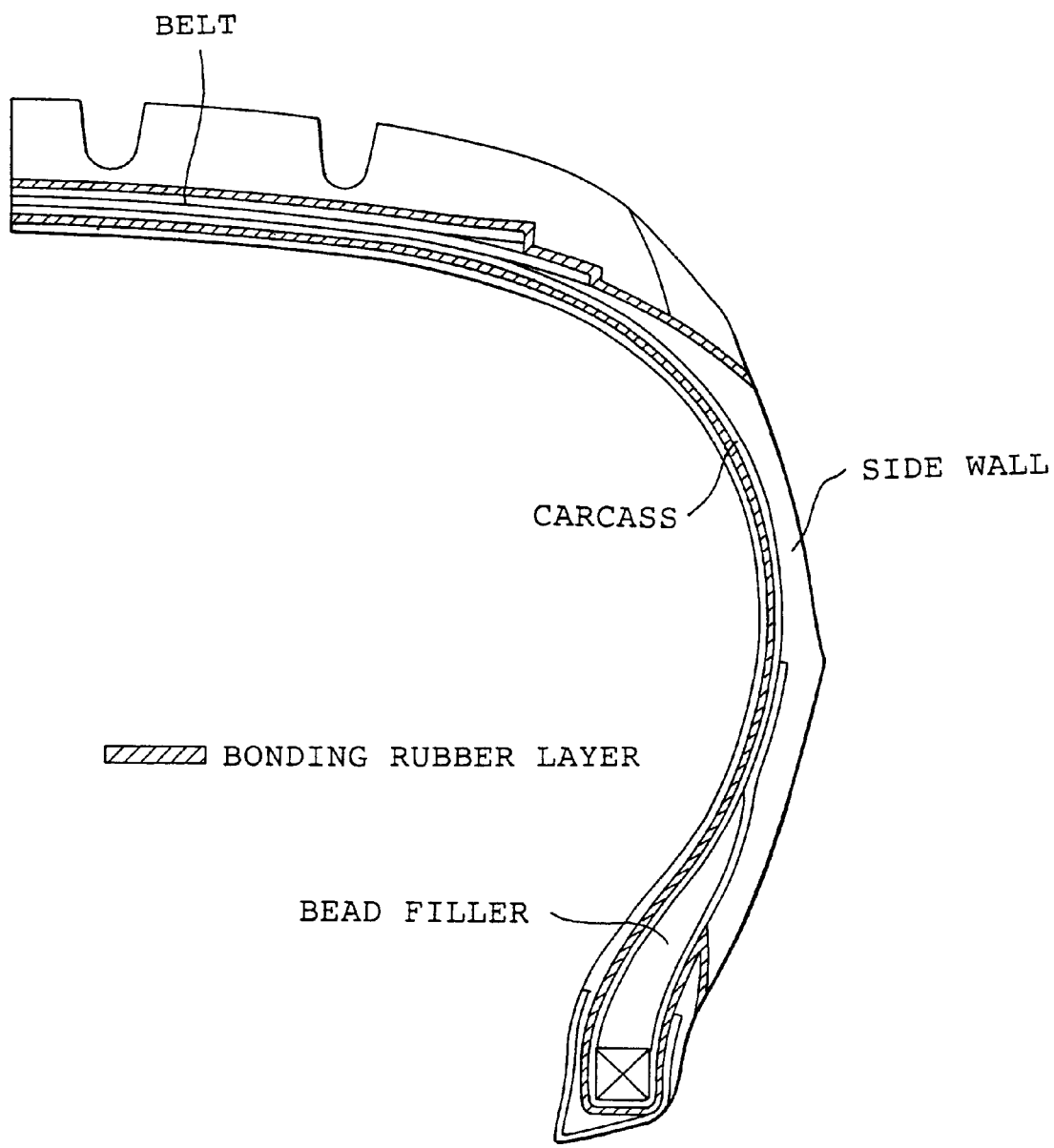
FIG. 9 is a partial semisectional view in the meridian direction of a structure where a rubber including hydrogenated NBR is positioned at a carcass coat, belt coat, bead filler, and side wall member of a pneumatic tire of the present invention.

According to the present invention, as a second embodiment, as shown in FIG. 9, the carcass coat and belt coat, bead filler, and side wall are comprised of the rubber containing the hydrogenated NBR. In this case, since the rubber containing the hydrogenated NBR is superior in resistance to ozone deterioration, pollution resistance, and cut resistance and further features low heat buildup, it is preferable as a side wall achieving both cut resistance and low rolling resistance with reduced weight. Since it is superior in cut resistance, if the carcass coat rubber is comprised of a rubber containing the hydrogenated NBR, the cut resistance will not decline even if making the side wall thinner. Further, since the heat buildup is small, there is the effect that the rolling resistance is reduced.

Further, if the side wall is comprised of the rubber containing the hydrogenated NBR, the bonding rubber layer with the carcass becomes unnecessary, and therefore the rolling resistance can be further reduced and the productivity is improved as well, which is more preferable.

Further, when making both the bead filler and the side wall a rubber containing the hydrogenated NBR, the bonding rubber layers among the carcass, bead filler, and side wall become unnecessary, which is further preferable.

Figure 10:
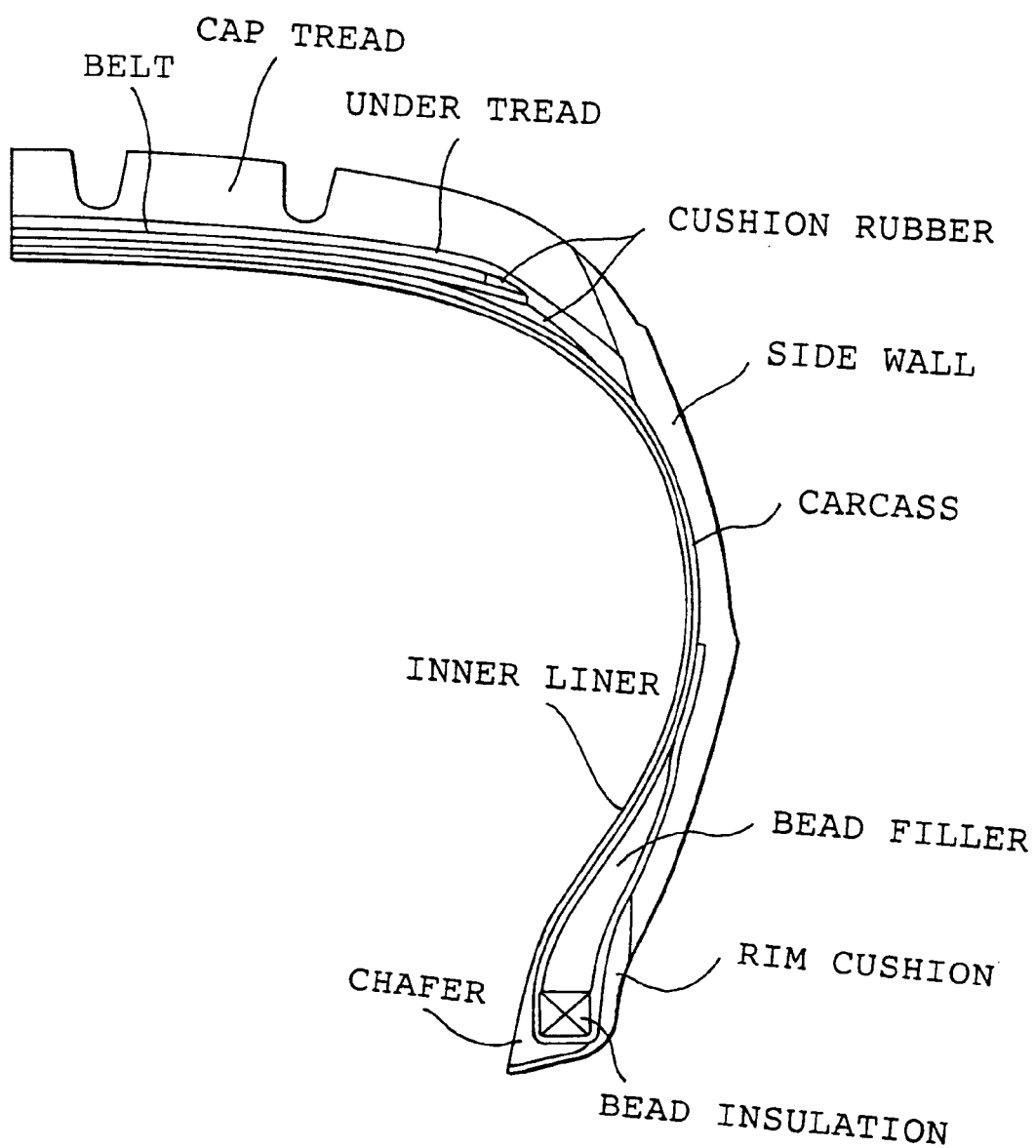
FIG. 10 is a partial semisectional view in the meridian direction of the positional relationship of part members of a pneumatic tire of the present invention.

According to the present invention, as a third embodiment, the carcass coat, belt coat, bead filler, side wall, rim cushion, and chafer shown in FIG. 10 are comprised of a rubber containing the hydrogenated NBR. In this case, since the rubber containing the hydrogenated NBR has a higher hardness, lower heat buildup, and higher strength compared with a conventional diene-based rubber, it is preferable as the chafer of the bead portion and rim cushion. Since it is high in hardness, the movement of the bead portion is suppressed and the driving stability is improved. Further, since the rubber is high in strength and superior in crack resistance, there is the effect that the bead toe portion will not easily break even with repeated rim attachment and rim detachment.

Further, if the chafer and rim cushion are also comprised of a rubber containing the hydrogenated NBR, the bonding rubber layer with the carcass becomes unnecessary and the productivity is improved, and therefore this is more preferable. Further, when the bead filler and side wall are also comprised of the rubber containing the hydrogenated NBR and further the chafer and rim cushion are comprised of the rubber containing the hydrogenated NBR, the bonding rubber layers among the carcass, bead filler, side wall, rim cushion, and chafer become unnecessary, and therefore this is further preferable.

Figure 11:
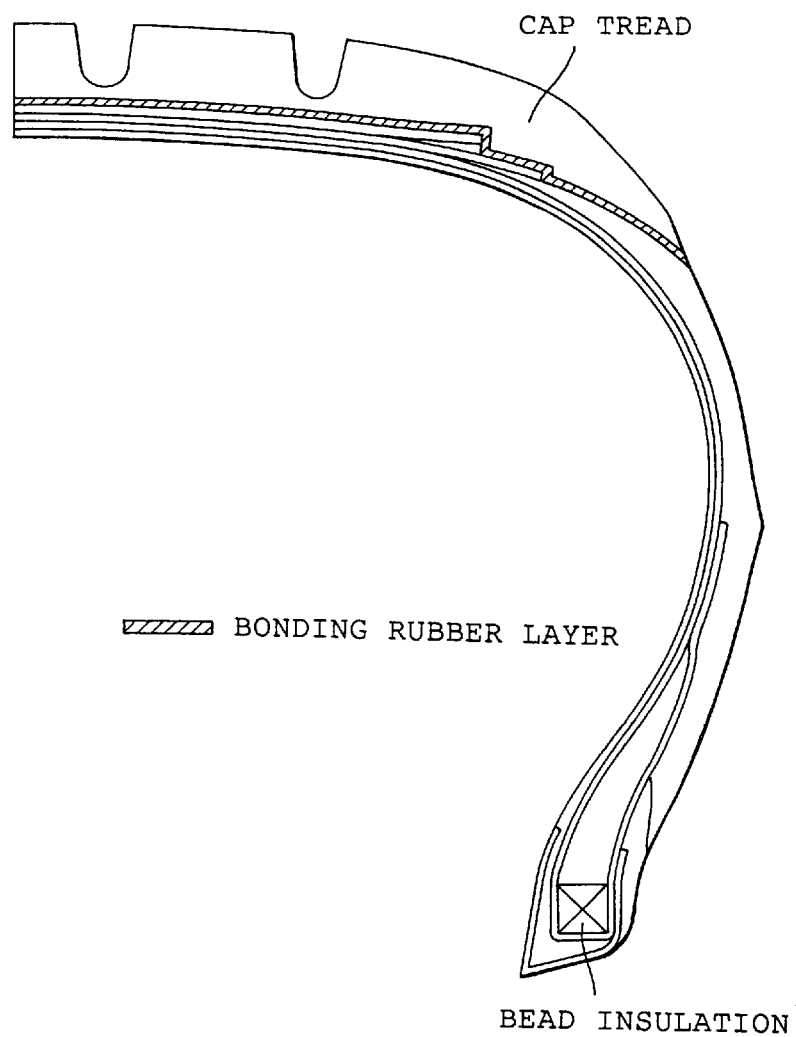
FIG. 11 is a partial semisectional view in the meridian direction of a structure where a rubber including hydrogenated NBR is positioned at all members other than the cap tread and bead insulation of a pneumatic tire of the present invention.

According to a 10th aspect of the present invention, as a first embodiment, a diene-based rubber or/and a butyl-based rubber is used for the cap tread shown in FIG. 11, at least one type of rubber selected from the group consisting of a diene-based rubber, chloroprene-based rubber, butyl-based rubber, ethylene-propylene-based rubber, nitrile-based rubber, and hydrin-based rubber is used for the bead insulation, and a rubber containing the hydrogenated NBR is used for the rubber of other portions, Further, as a second embodiment, a diene-based rubber or/and a butyl-based rubber is used for the cap tread shown in FIG. 11 and a rubber containing the hydrogenated NBR is used for the rubber of other portions. As in these cases, if all of the rubber except for the cap tread or all of the rubber except for the cap tread and the bead insulation is comprised by a rubber containing the hydrogenated NBR and a bonding rubber layer is provided with the cap tread, the bonding rubber layer becomes unnecessary other than with the cap tread. Therefore, it becomes possible to produce a green tire with no cap tread in advance by a better productivity since there is no bonding rubber layer, then attach the cap tread along with the bonding rubber layer to complete the green tire, and therefore it is possible to obtain a high performance tire with a low rolling resistance, reduced weight, superior cut-resistance, and good productivity.

Further, since the rubber containing the hydrogenated NBR has a good abrasion resistance and low heat buildup, it may be used as the cap tread as well, but it is preferable to use a cap tread of a conventional diene-based rubber formulation in order to achieve braking performance, wet performance, and other grip performance and abrasion resistance and low heat buildup with a good balance.

According to the 11th aspect of the present invention, the bead insulation rubber shown in FIG. 10 is comprised by at least one type of rubber selected from the group consisting of a diene-based rubber, chloroprene-based rubber, butyl-based rubber, ethylene-propylene-based rubber, nitrile-based rubber, and hydrin-based rubber, and the bonding rubber layer is not provided between the bead insulation and the adjoining rubber composition containing the hydrogenated NBR. In the case of this structure, the strain occurring when using the tire is extremely small in just the bead insulation rubber covering the bead wire. There is no problem in durability even if the bonding with the adjoining rubber is weak, and therefore the bonding rubber layer is not necessary.

According to a 12th aspect of the present invention, as a first embodiment, the bead insulation rubber shown in FIG. 10 is comprised by at least one type of rubber selected from the group consisting of a diene-based rubber, chloroprene-based rubber, butyl-based rubber, ethylene-propylene-based rubber, nitrile-based rubber, and hydrin-based rubber and the rubber at other portions is comprised of the rubber containing the hydrogenated NBR. In this case, the strain occurring when using the tire is extremely small in just the bead insulation rubber covering the bead wire. There is no problem in durability even if the bonding with the adjoining rubber is weak, and therefore the bonding rubber layer is not necessary between the bead insulation rubber and the adjoining rubber. In the end, therefore, it is possible to produce a tire not requiring bonding rubber layers.

According to the present invention, as a second embodiment, it is possible to comprise the rubber of all portions constituting the tire shown in FIG. 10 by a rubber containing hydrogenated NBR. In this case, since the rubber containing the hydrogenated NBR is superior in strength, low heat buildup, cut resistance, and other physical properties, there is no need to change the formulation for each member like with a conventional tire. Therefore, since the types of rubber formulations required for a single tire are reduced, it is possible to improve the productivity. Further, since it is possible to produce a green tire without a cap tread by extrusion, then attaching the cap tread together with the bonding rubber layer to complete the green tire, it is possible to further improve the productivity. Note that the thus obtained tire is also suitable as a high performance tire with a low rolling resistance and a base tire for retreading.

According to a 13th aspect of the present invention, it is possible to provide a pneumatic tire using a rubber containing the hydrogenated NBR colored a color other than black at least at part or all of the inside and outside surface of the tire. In this case, since the rubber containing the hydrogenated NBR is superior in strength, low heat buildup, cut resistance, and other physical properties and can improve the strength using only zinc methacrylate even if not containing carbon black, it is possible to color the rubber any color other than black without detracting from the above physical properties. By using a rubber containing the hydrogenated NBR colored a color other than black and positioning it at part or all of the inside or outside surface of the parts arranged at the inside and outside surfaces of the tire, it is possible to obtain an aesthetic effect for the tire while maintaining the above physical properties.

In a tire according to the 14th aspect of the present invention, since the rubber containing the hydrogenated NBR used here has a low air permeation coefficient, the conventionally provided inner liner is not necessarily required. Therefore, it is possible to reduce the weight by that amount.

Further, the cushion rubber shown in FIG. 10, which had in the past been arranged between layers of the belt ends and between the belt end and carcass, is preferably comprised by the rubber containing the hydrogenated NBR together with the carcass and belt. When comprising the carcass and belt by the rubber containing the hydrogenated NBR, however, there is leeway in the durability, and therefore the cushion rubber is not necessarily required.

EXAMPLES

The present invention will now be explained by Examples, but the present invention is of course not limited to these Examples.

The following commercial products were used for the ingredients of the formulations of the following Standard Examples 1 to 3, Examples 1 to 27, and Comparative Examples 1 to 16. Note that blending agents not changed in amount are not listed in the tables of the examples.

| 1) Ingredients of Formulations of Cap Treads | |
|---|---|
| SBR: Nipol NS-116 (made by Nippon Zeon) | variate |
| NR: RSS#3 | variate |
| HNBR (hydrogenated NBR): Zetpol 2020 (made by Nippon Zeon) | variate |
| Zinc methacrylate: R-20S (made by Asada Chemical Industry) | variate |
| Carbon black: N339 (made by Showa Cabot) | variate |
| Organic peroxide (40% diluted): Parkadox 14/40 (made by Kayaku Akzo) | 5 parts by weight |
| Antioxidant: Nauguard 445 (made by Uniroyal) | 1.5 parts by weight |
| 2) Ingredients of Formulations of Under Tread | |
| NR: RSS#3 | variate |
| BR: Nipol BR-1220 (made by Nippon Zeon) | variate |
| HNBR: Zetpol 2020 (made by Nippon Zeon) | variate |
| Zinc methacrylate: R-20S (made by Asada Chemical Industry) | variate |
| Carbon black (FEF grade): HTC-100 (made by Shinnikka Carbon) | variate |
| Organic peroxide (40% diluted): Parkadox 14/40 (made by Kayaku Akzo) | 5 parts by weight |
| Antioxidant: Nauguard 445 (made by Uniroyal) | 1.5 parts by weight |
| 3) Ingredients of Formulations of Bonding Rubber Layer | |
| NR: RSS#3 | variate |
| NBR: Nipol DN401 (made by Nippon Zeon) | variate |
| Carbon black: N339 (made by Showa Cabot) | 50 parts by weight |
| Aromatic petroleum resin: FR-120 (made by Fujikosan) | variate |
| Zinc oxide: Zinc White #3 (made by Seido Chemical Industry) | 5 parts by weight |
| Stearic acid: Beads Stearic Acid (made by Nippon Oil and Fat) | 1 part by weight |
| Antioxidant: Nocrac 224 (made by Ouchi Shinko Chemical) | 1 part by weight |

-continued

| | |
|---|---|
| Sulfur: Insoluble sulfur (case of sulfur vulcanization based formulation) | 2 parts by weight |
| Vulcanization accelerator: Nocceler CZ-G (made by Ouchi Shinko Chemical) (case of sulfur vulcanization based formulation) | 1 part by weight |
| Vulcanization accelerator: Nocceler TOT-N (made by Ouchi Shinko Chemical) (case of sulfur vulcanization based formulation) | 0.5 part by weight |
| Organic peroxide (40% diluted): Parkadox 14/40 (made by Kayaku Akzo) (case of organic peroxide cross-linking based formulation) | 3.5 parts by weight |
| Co-cross-linking agent: TAIC (made by Nippon Kasei Chemical) (case of organic peroxide cross-linking based formulation) | 3 parts by weight |

Fabrication of Test Tires

Test tires (size: 185/65R14) were fabricated in accordance with the tire configurations of the examples from the cap treads, under treads, and bonding rubber layers comprised of the compositions of the formulations shown in the Examples and were used for the following predetermined tests:

The test and evaluation methods in the examples were as follows:

1) High Speed Durability Test Method

A drum tester having a smooth drum surface, made of steel, and having an inside diameter of 1707 mm was used, the ambient temperature was controlled to 38±3° C., and the tires were run to warm up under conditions of a rim size of 14×5 1/2JJ, an internal pressure of 220 kPa, a load of 4.36 kN, and a speed of 81 km/h for 120 minutes. The tires were then allowed to cool for at least 3 hours, then were readjusted to the test air pressure and the main running was commenced.

The main running was started at a speed of 121 km/h. The speed was increased in steps of 8 km/h every 30 minutes of running and the tires were run until trouble occurred. The distance run until the trouble occurred in the tires was expressed indexed to the distance of occurrence of trouble of a conventional tire as 100 and used as the high speed durability. (The larger the value, the better.)

2) Abrasion Test Method

Test tires were mounted on the four wheels of a 1.6 liter engine displacement compact passenger car. This was driven 10,000 km on a predetermined course and the average amount of abrasion for the four tires was measured. The result was expressed indexed to the amount of abrasion of a conventional tire as 100. (The smaller the value, the more resistant to abrasion.)

3) Rolling Resistance Test Method

Tires were run under the following conditions to measure the rolling resistance at that time. The results were expressed indexed to the measured value for a conventional tire as 100. (The smaller the value, the better.)

Running conditions: A drum tester having a smooth drum surface, made of steel, and having an inside diameter of 1707 mm was used, the ambient temperature was controlled to 23±2° C., and the tires were run under conditions of a rim size of 14×5 1/2JJ, an internal pressure of 200 kPa, and a speed of 80 km/h.

4) Vehicular Driving Stability Test Method

Test tires mounted on 14×5 1/2JJ rims at an internal pressure of 200 kPa were mounted on a 1.6 liter engine displacement front engine front wheel drive compact passenger car. The car was driven over a test course by five trained drivers to evaluate the feeling. The results were ranked by a five-point system based on the following judgement criteria in relative comparison with reference tires. The average of the three drivers, not including the highest score and lowest score, was shown. (The larger the values, the better.)

Judgement criteria:

5: Excellent, 4; good, 3.5; somewhat good, 3: equal to reference, 2.5: somewhat poor (practical lower limit), 2: poor, 1: very poor 5) High Load Durability Test Method Tires were run under the following conditions and ranked as "no good" (poor) when trouble occurred and "OK" (good) when it did not.

Running conditions: A drum tester having a smooth drum surface, made of steel, and having an inside diameter of 1707 mm was used, the ambient temperature was controlled to 38±3° C., and the tires were run under conditions of a rim size of 14×5 1/2JJ, an internal pressure of 240 kPa, and a speed of 81 km/h. The initial load was made 4.57 kN, then the load was increased to a load of 7.28 kN in 0.68 kN increments every 2 hours. After this, the load was increased to a load of 14.0 kN in 0.68 kN increments every 4 hours. The test was ended when running at a load of 14.0 kN for 4 hours.

Standard Examples 1 to 2, Examples 1 to 8, and Comparative Examples 1 to 4

(Cap Tread)

The results of tests on the high speed durability, abrasion, and rolling resistance of test tires in the case of changing the ratio of ingredients in the formulations of the cap tread and leaving the composition of the bonding rubber layer and the tire configuration constant are shown in the following Table I.

TABLE I (Test Tire Size: 185/65R14)

| Cap tread formulation | Stand. Ex. 1 | Stand. Ex. 2 | Comp. Ex. 1 | Comp. Ex. 2 | Ex. 1 | Ex. 2 | Ex. 3 |
|---|---|---|---|---|---|---|---|
| SBR (phr) | 50 | 100 | | | | | |
| NR (phr) | 50 | | | 40 | 30 | 20 | |
| HBR (phr) | | | 100 | 60 | 70 | 80 | 100 |
| Rubber total (phr) | 100 | 100 | 100 | 100 | 100 | 100 | 100 |
| Zinc methacrylate (phr) | | | 60 | 60 | 60 | 60 | 60 |
| Carbon (phr) | 50 | 75 | 0 | 0 | 0 | 0 | 0 |
| Total of zinc methacrylate + carbon (phr) | 50 | 75 | 60 | 60 | 60 | 60 | 60 |
| Bonding rubber layer formulation *1 | | | | | | | |
| NR (phr) | — | — | | 60 | 60 | 60 | 60 |
| NBR (phr) | — | — | | 40 | 40 | 40 | 40 |
| Aromatic petroleum resin (phr) | — | — | | 40 | 40 | 40 | 40 |
| Sulfur (phr) | — | — | | 2 | 2 | 2 | 2 |
| Vulcanization accelerator (CZ) (phr) | — | — | | 1 | 1 | 1 | 1 |
| Vulcanization accelerator (TOT-N) (phr) | — | — | | 0.5 | 0.5 | 0.5 | 0.5 |
| Tire structure | | | | | | | |
| Cap tread thickness (mm) | 9.9 | 9.9 | 9.5 | 9.7 | 9.7 | 9.7 | 9.7 |
| Groove thickness (mm) | 8.6 | 8.6 | 8.6 | 8.6 | 8.6 | 8.6 | 8.6 |
| Bonding rubber layer thickness (mm) | — | — | 0.4 | 0.2 | 0.2 | 0.2 | 0.2 |
| Under tread thickness (mm) | 1 | 1 | 1 | 1 | 1 | 1 | 1 |
| Tread total thickness (mm) | 10.9 | 10.9 | 10.9 | 10.9 | 10.9 | 10.9 | 10.9 |
| Test results | | | | | | | |
| High speed durability (index) | 100 | 100 | 82 | 104 | 104 | 104 | 104 |
| Abrasion (index) | 102 | 100 | 70 | 102 | 93 | 80 | 70 |
| Rolling resistance (index) | 100 | 100 | 97 | 99 | 98 | 98 | 97 |

| Cap tread formulation | Comp. Ex. 3 | Ex. 4 | Ex. 5 | Ex. 6 | Ex. 7 | Ex. 8 | Comp. Ex. 4 |
|---|---|---|---|---|---|---|---|
| SBR (phr) | | | | | | | |
| NR (phr) | 30 | 30 | 30 | 30 | 30 | 30 | 30 |
| HBR (phr) | 70 | 70 | 70 | 70 | 70 | 70 | 70 |
| Rubber total (phr) | 100 | 100 | 100 | 100 | 100 | 100 | 100 |
| Zinc methacrylate (phr) | 5 | 10 | 10 | 0 | 80 | 80 | 85 |
| Carbon (phr) | | | 5 | 40 | 0 | 40 | 45 |
| Total of zinc methacrylate + carbon (phr) | 5 | 10 | 10 | 40 | 80 | 120 | 130 |
| Bonding rubber layer formulation | | | | | | | |
| NR (phr) | 60 | 60 | 60 | 60 | 60 | 60 | 60 |
| NBR (phr) | 40 | 40 | 40 | 40 | 40 | 40 | 40 |
| Aromatic petroleum resin (phr) | 40 | 40 | 40 | 40 | 40 | 40 | 40 |
| Sulfur (phr) | 2 | 2 | 2 | 2 | 2 | 2 | 2 |
| Vulcanization accelerator (CZ) (phr) | 1 | 1 | 1 | 1 | 1 | 1 | 1 |
| Vulcanization accelerator (TOT-N) (phr) | 0.5 | 0.5 | 0.5 | 0.5 | 0.5 | 0.5 | 0.5 |

TABLE I-continued (Test Tire Size: 185/65R14)

Tire structure

| | | | | | | | |
|---|---|---|---|---|---|---|---|
| Cap tread thickness (mm) | 9.7 | 9.7 | 9.7 | 9.7 | 9.7 | 9.7 | 9.7 |
| Groove thickness (mm) | 8.6 | 8.6 | 8.6 | 8.6 | 8.6 | 8.6 | 8.6 |
| Bonding rubber layer thickness (mm) | 0.2 | 0.2 | 0.2 | 0.2 | 0.2 | 0.2 | 0.2 |
| Under tread thickness (mm) | 1 | 1 | 1 | 1 | 1 | 1 | 1 |
| Tread total thickness (mm) | 10.9 | 10.9 | 10.9 | 10.9 | 10.9 | 10.9 | 10.9 |

Test results

| | | | | | | | |
|---|---|---|---|---|---|---|---|
| High speed durability (index) | 104 | 104 | 104 | 104 | 104 | 104 | 104 |
| Abrasion (index) | 101 | 99 | 98 | 95 | 92 | 99 | 102 |
| Rolling resistance (index) | 98 | 98 | 98 | 99 | 99 | 100 | 100 |

*1: Bonding layer is two-layer structure of isobutylene-isoprene copolymer (IIR) rubber layer and ultrahigh molecular weight polyethylene (UHMwPE) sheet.

From the results of Table I, the tires of the examples using the cap treads having the compositions of formulations in accordance with the present invention all exhibited the desired superior high speed durability, low abrasion, and low rolling resistance.

Examples 9 to 13 and Comparative Examples 5 to 8

(Cap Tread)

The results of tests on the high speed durability, abrasion, and rolling resistance of test tires in the case of changing the ratio of ingredients in the formulations of the bonding rubber layer and leaving the composition of the cap tread and the tire configuration constant are shown in the following Table II.

TABLE II (Test Tire Size: 185/65R14)

| Cap tread formulation | Comp. Ex. 5 | Ex. 9 | Ex. 10 | Ex. 11 | Comp. Ex. 6 | Comp. Ex. 7 | Ex. 12 | Ex. 13 | Comp. Ex. 8 |
|---|---|---|---|---|---|---|---|---|---|
| NR (phr) | 30 | 30 | 30 | 30 | 30 | 30 | 30 | 30 | 30 |
| HBR (phr) | 70 | 70 | 70 | 70 | 70 | 70 | 70 | 70 | 70 |
| Rubber total (phr) | 100 | 100 | 100 | 100 | 100 | 100 | 100 | 100 | 100 |
| Zinc methacrylate (phr) | 60 | 60 | 60 | 60 | 60 | 60 | 60 | 60 | 60 |
| Carbon (phr) | 0 | 0 | 0 | 0 | 0 | 0 | 0 | 0 | 0 |
| Total of zinc methacrylate + carbon (phr) | 60 | 60 | 60 | 60 | 60 | 60 | 60 | 60 | 60 |
| Bonding rubber layer formulation | | | | | | | | | |
| NR (phr) | 0 | 10 | 50 | 90 | 100 | 60 | 60 | 60 | 60 |
| NBR (phr) | 100 | 90 | 50 | 10 | 0 | 40 | 40 | 40 | 40 |
| Aromatic petroleum resin (phr) | 40 | 40 | 40 | 40 | 40 | 0 | 5 | 80 | 90 |
| Sulfur (phr) | 2 | 2 | 2 | 2 | 2 | 2 | 2 | 2 | 2 |
| Vulcanization accelerator (CZ) (phr) | 1 | 1 | 1 | 1 | 1 | 1 | 1 | 1 | 1 |
| Vulcanization accelerator (TOT-N) (phr) | 0.5 | 0.5 | 0.5 | 0.5 | 0.5 | 0.5 | 0.5 | 0.5 | 0.5 |
| Tire structure | | | | | | | | | |
| Cap tread thickness (mm) | 9.7 | 9.7 | 9.7 | 9.7 | 9.7 | 9.7 | 9.7 | 9.7 | 9.7 |
| Groove thickness (mm) | 8.6 | 8.6 | 8.6 | 8.6 | 8.6 | 8.6 | 8.6 | 8.6 | 8.6 |
| Bonding rubber layer thickness (mm) | 0.2 | 0.2 | 0.2 | 0.2 | 0.2 | 0.2 | 0.2 | 0.2 | 0.2 |
| Under tread thickness (mm) | 1 | 1 | 1 | 1 | 1 | 1 | 1 | 1 | 1 |
| Tread total thickness (mm) | 10.9 | 10.9 | 10.9 | 10.9 | 10.9 | 10.9 | 10.9 | 10.9 | 10.9 |

TABLE II-continued (Test Tire Size: 185/65R14)

| Cap tread formulation | Comp. Ex. 5 | Ex. 9 | Ex. 10 | Ex. 11 | Comp. Ex. 6 | Comp. Ex. 7 | Ex. 12 | Ex. 13 | Comp. Ex. 8 |
|---|---|---|---|---|---|---|---|---|---|
| Test results | | | | | | | | | |
| High speed durability (index) | 82 | 103 | 104 | 102 | 83 | 97 | 104 | 102 | 101 |
| Abrasion (index) | 93 | 93 | 93 | 93 | 93 | 93 | 93 | 93 | 93 |
| Rolling resistance (index) | 97 | 97 | 97 | 97 | 97 | 97 | 97 | 100 | 102 |

From the results of Table II, the tires of the examples bonding the cap treads using bonding rubber layers of compositions of formulations in accordance with the present invention all exhibited the desired superior high speed durability, low abrasion, and low rolling resistance.

Example 14 to 18 and Comparative Example 9
(Cap Tread)

The results of tests on the high speed durability, abrasion, and rolling resistance of test tires in the case of leaving the ingredients in the formulations of the cap tread and bonding rubber layer constant and changing the thicknesses of the cap tread and bonding rubber layer in the tire configurations are shown in the following Table III.

From the results of Table III, the tires of the examples having thicknesses of bonding rubber layers in accordance with the present invention and using cap treads of predetermined thicknesses (7 to 10.7 mm thickness) all exhibited the desired superior high speed durability, low abrasion, and low rolling resistance.

Standard Example 3, Examples 19 to 23, and Comparative Examples 10 to 15
(Under Tread)

The results of tests on the vehicular driving stability, high speed durability, and high load durability of test tires in the case of changing the ratio of ingredients in the formulations of the under tread and leaving the composition of the bonding rubber layer and the tire configuration constant are shown in the following Table IV.

TABLE III (Test Tire Size: 185/65R14)

| Cap tread formulation | Comp. Ex. 9 | Ex. 14 | Ex. 15 | Ex. 15 | Ex. 17 | Ex. 18 |
|---|---|---|---|---|---|---|
| NR (phr) | 30 | 30 | 30 | 30 | 30 | 30 |
| HBR (phr) | 70 | 70 | 70 | 70 | 70 | 70 |
| Rubber total (phr) | 100 | 100 | 100 | 100 | 100 | 100 |
| Zinc methacrylate (phr) | 60 | 60 | 60 | 60 | 60 | 60 |
| Carbon (phr) | 0 | 0 | 0 | 0 | 0 | 0 |
| Total of zinc methacrylate + carbon (phr) | 60 | 60 | 60 | 60 | 60 | 60 |
| Bonding rubber layer formulation | | | | | | |
| NR (phr) | 60 | 60 | 60 | 60 | 60 | 60 |
| NBR (phr) | 40 | 40 | 40 | 40 | 40 | 40 |
| Aromatic petroleum resin (phr) | 40 | 40 | 40 | 40 | 40 | 40 |
| Sulfur (phr) | 2 | 2 | 2 | 2 | 2 | 0 |
| Vulcanization accelerator (CZ) (phr) | 1 | 1 | 1 | 1 | 1 | |
| Vulcanization accelerator (TOT-N) (phr) | 0.5 | 0.5 | 0.5 | 0.5 | 0.5 | |
| Cross-linking agent (TAIC) (phr) | | | | | | 3 |
| Organic peroxide (phr) | | | | | | 1.4 |
| Tire structure | | | | | | |
| Cap tread thickness (mm) | 9.7 | 9.7 | 9.7 | 9.7 | 10.7 | 9.7 |
| Groove thickness (mm) | 8.6 | 8.6 | 8.6 | 8.6 | 8.6 | 8.6 |
| Bonding rubber layer thickness (mm) | 0 | 0.1 | 0.2 | 4 | 0.2 | 0.2 |
| Under tread thickness (mm) | 1 | 1 | 1 | 1 | 0 | 1 |
| Tread total thickness (mm) | 10.7 | 10.8 | 10.9 | 14.7 | 10.9 | 10.9 |
| Test results | | | | | | |
| High speed durability (index) | 80 | 104 | 104 | 101 | 106 | 110 |
| Abrasion (index) | 93 | 93 | 93 | 93 | 97 | 93 |
| Rolling resistance (index) | 99 | 99 | 99 | 100 | 96 | 97 |

TABLE IV (Test Tire Size: 185/65R14)

| Under tread formulation | Stand. Ex. 3 | Comp. Ex. 10 | Ex. 19 | Ex. 20 | Comp. Ex. 11 | Ex. 21 | Comp. Ex. 12 |
|---|---|---|---|---|---|---|---|
| NR (phr) | 70 | 70 | 60 | | 30 | 30 | 30 |
| BR (phr) | 30 | 30 | | | | | |
| HNBR (phr) | | | 40 | 100 | 70 | 70 | 70 |
| Zinc methacrylate (phr) | | | 0 | 0 | 0 | 0 | 0 |
| Carbon (EEF grade) (phr) | 60 | 80 | 40 | 40 | 5 | 10 | 45 |
| Bonding rubber layer formulation | | | | | | | |
| NR (phr) | — | — | 60 | 60 | 60 | 60 | 60 |
| NBR (phr) | — | — | 40 | 40 | 40 | 40 | 40 |
| Aromatic petroleum resin (phr) | — | — | 40 | 40 | 40 | 40 | 40 |
| Sulfur (phr) | — | — | 2 | 2 | 2 | 2 | 2 |
| Vulcanization accelerator (CZ) (phr) | — | — | 1 | 1 | 1 | 1 | 1 |
| Vulcanization accelerator (TOT-N) (phr) | — | — | 0.5 | 0.5 | 0.5 | 0.5 | 0.5 |
| Tire structure | | | | | | | |
| Under tread thickness (mm) | 1.5 | 1.5 | 1.1 | 1.1 | 1.1 | 1.1 | 1.1 |
| Bonding rubber layer thickness (mm) | — | — | 0.2 × 2 | 0.2 × 2 | 0.2 × 2 | 0.2 × 2 | 0.2 × 2 |
| Under tread total thickness (mm) | 1.5 | 1.5 | 1.5 | 1.5 | 1.5 | 1.5 | 1.5 |
| Test results | | | | | | | |
| Vehicular driving stability | 3 | 3.2 | 3.2 | 3.2 | 2.8 | 3 | 3.2 |
| High speed durability (index) | 100 | 97 | 103 | 104 | 106 | 105 | 98 |
| High load durability | Good | Good | Good | Good | Good | Good | Good |

| Under tread formulation | Comp. Ex. 13 | Ex. 22 | Ex. 23 | Comp. Ex. 14 | Comp. Ex. 15 |
|---|---|---|---|---|---|
| NR (phr) | 30 | 30 | 30 | 30 | 30 |
| BR (phr) | | | | | |
| NNBR (phr) | 70 | 70 | 70 | 70 | 70 |
| Zinc methacrylate (phr) | 5 | 10 | 120 | 130 | 100 |
| Carbon (FEF grade) (phr) | 0 | 0 | 0 | 0 | 30 |
| Bonding rubber layer formulation | | | | | |
| NR (phr) | 60 | 60 | 60 | 60 | 60 |
| NBR (phr) | 40 | 40 | 40 | 40 | 40 |
| Aromatic petroleum resin (phr) | 40 | 40 | 40 | 40 | 40 |
| Sulfur (phr) | 2 | 2 | 2 | 2 | 2 |
| Vulcanization accelerator (CZ) (phr) | 1 | 1 | 1 | 1 | 1 |
| Vulcanization accelerator (TOT-N) (phr) | 0.5 | 0.5 | 0.5 | 0.5 | 0.5 |
| Tire structure | | | | | |
| Under tread thickness (mm) | 1.1 | 1.1 | 1.1 | 1.1 | 1.1 |
| Bonding rubber layer thickness (mm) | 0.2 × 2 | 0.2 × 2 | 0.2 × 2 | 0.2 × 2 | 0.2 × 2 |
| Under tread total thickness (mm) | 1.5 | 1.5 | 1.5 | 1.5 | 1.5 |
| Test results | | | | | |
| Vehicular driving stability | 2.8 | 3 | 3.3 | 3.3 | 3.3 |
| High speed durability (index) | 108 | 108 | 106 | 104 | 102 |
| High load durability | Good | Good | Good | Poor | Poor |

From the results of Table IV, the tires of the examples using under treads having compositions of formulations in accordance with the present invention all exhibited the desired superior vehicular driving stability, high speed durability, and high load durability.

Examples 24 to 27 and Comparative Example 16 (Under Tread)

The results of tests on the vehicular driving stability, high speed durability, and high load durability of test tires in the case of leaving the composition of formulations in the under tread and bonding rubber layer constant and changing the thicknesses of the under tread and bonding rubber layer of the tire configuration are shown in the following Table V.

TABLE V (Test Tire Size: 185/65R14)

| Under tread formulation | Comp. Ex. 16 | Ex. 24 | Ex. 25 | Ex. 26 | Ex. 27 |
|---|---|---|---|---|---|
| NR (phr) | 30 | 30 | 30 | 30 | 30 |
| NNBR (phr) | 70 | 70 | 70 | 70 | 70 |
| Zinc methacrylate (phr) | 70 | 70 | 70 | 70 | 70 |
| Carbon (FEF grade) (phr) | 10 | 10 | 10 | 10 | 10 |
| *Bonding rubber layer formulation *1* | | | | | |
| NR (phr) | — | 60 | 60 | 60 | 60 |
| NBR (phr) | — | 40 | 40 | 40 | 40 |
| Aromatic petroleum resin (phr) | — | 40 | 40 | 40 | 40 |
| Sulfur (phr) | — | | 2 | 2 | 2 |
| Vulcanization accelerator (CZ) (phr) | — | 1 | 1 | 1 | 1 |
| Vulcanization accelerator (TOT-N) (phr) | — | 0.5 | 0.5 | 0.5 | 0.5 |
| Cross-linking agent (TAIC) (phr) | — | 3 | | | |
| Organic peroxide (phr) | — | 1.4 | | | |
| *Tire structure* | | | | | |
| Under tread thickness (mm) | 0.9 | 1.1 | 1.3 | 0.9 | 0.5 |
| Bonding rubber layer thickness (mm) | 0.3 × 2 | 0.2 × 2 | 0.1 × 2 | 0.3 × 2 | 0.5 × 2 |
| Under tread total thickness (mm) | 1.5 | 1.5 | 1.5 | 1.5 | 1.5 |
| *Test results* | | | | | |
| Vehicular driving stability | 3.2 | 3.2 | 3.3 | 3.2 | 3.2 |
| High speed durability (index) | 82 | 110 | 105 | 103 | 101 |
| High load durability | Poor | Good | Good | Good | Good |

From the results of Table V, the tires of the examples having the thicknesses of the under treads and bonding rubber layers in accordance with the present invention all exhibited the desired superior vehicular driving stability, high speed durability, and high load durability.

The following commercial products were used for the ingredients of the formulations used for the examples of the following Standard Example 4, Examples 28 to 49, and Comparative Examples 17 to 26. Note that blending agents not changed in amount are not listed in the tables of the examples.

1) Ingredients of Formulations of Reinforcing Liner Layer of Side Wall Portion

| | |
|---|---|
| Hydrogenated NBR: Zetpol 2020 (made by Nippon Zeon) | variate |
| Zinc methacrylate: R-20S (made by Asada Chemical Industry) | variate |
| Carbon black: N339 (made by Showa Cabot) | variate |
| Organic peroxide (40% diluted): Parkadox 14/40 (made by Kayaku Akzo) | 5 parts by weight |
| Antioxidant: Nauguard 445 (made by Uniroyal) | 1.5 parts by weight |

2) Ingredients of Formulation of Bonding Rubber Layer

| | |
|---|---|
| Diene-based rubber (NR): RSS#3 | variate |
| NBR: Nipol DN401 (made by Nippon Zeon) | variate |
| Carbon black: N339 (made by Showa Cabot) | 50 parts by weight |
| Aromatic petroleum resin: FR-120 (made by Fujikosan) | variate |
| Zinc oxide: Zinc White #3 (made by Seido Chemical Industry) | 5 parts by weight |
| Stearic acid: Beads Stearic Acid (made by Nippon Oil and Fat) | 1 part by weight |
| Antioxidant: Nocrac 224 (made by Ouchi Shinko Chemical) | 1 part by weight |
| Sulfur: Insoluble sulfur (sulfur vulcanization based) | 2 parts by weight |
| Vulcanization accelerator: Nocceler CZ-G (made by Ouchi Shinko Chemical) (sulfur vulcanization based) | 1 part by weight |
| Vulcanization accelerator: Nocceler TOT-N (made by Ouchi Shinko Chemical) (sulfer vulcanization based) | 0.5 part by weight |
| Organic peroxide (40% diluted): Parkadox 14/40 (made by Kayaku Akzo) (organic peroxide cross-linking based) | variate |
| Co-cross-linking agent: TAIC (made by Nippon Kasei Chemical) (organic peroxide cross-linking based) | variate |

Further, the rubber formulations A and B used in Standard Example 4 and Comparative Example 17 of Table VI were as follows;

| Conventional rubber formulation | A (Parts by weight) | B (Parts by weight) |
|---|---|---|
| NR: RSS#3 | 40 | 40 |
| BR: Nipol BR1220 (made by Nippon Zeon) | 60 | 60 |
| Carbon black: N326M (made by Showa Cabot) | 60 | 80 |
| Zinc oxide: Zinc White #3 (made by Seido Chemical Industry) | 5 | 5 |
| Stearic acid: Beads Stearic Acid (made by Nippon Oil and Fat) | 1 | 1 |
| Antioxidant: Nocrac 6C (made by Ouchi Shinko Chemical) | 2 | 2 |
| Phenol resin: Sumicanol 610 (made by Sumitomo Chemical) | 6 | 6 |

-continued

| Conventional rubber formulation | A (Parts by weight) | B (Parts by weight) |
|---|---|---|
| Sulfur: Insoluble sulfur | 5 | 5 |
| Vulcanization accelerator: Nocceler NS-F (made by Ouchi Shinko Chemical) | 2 | 2 |

Fabrication of Test Run Flat Tires

The reinforcing liner layers and bonding layers comprised of compositions of the formulations shown in the Examples were shaped by conventional techniques and arranged and bonded to give the predetermined positional relationships shown in FIGS. 1(a) to 1(e). Run flat tires of a size of 255/40R17 were fabricated and used for run flat durability tests, rolling resistance tests, and riding comfort tests.

The methods of measurement and evaluation in the Examples were as follows:

1) Run Flat Durability Test Method

Test tires were mounted on a vehicle given a load of 4.90 kN/tire at an air pressure of 0 kPa in a manner so that the tires would not detach from the rims. The distances until the tires broke were measured. The Examples show values indexed to a conventional tire as 100. The larger the index, the better the run flat durability shown.

2) Rolling Resistance Test Method

Tires were run under the following conditions to measure the rolling resistance at that time. The results were expressed indexed to the measured value for a conventional tire as 100. The smaller the value, the better.

Running conditions: A drum tester having a smooth drum surface, made of steel, and having an inside diameter of 1707 mm was used, the ambient temperature was controlled to 23±2° C., and the tires were run under conditions of a rim size of 17×9JJ, an internal pressure of 220 kPa, a load of 5.5 kN, and a speed of 80 km/h.

3) Riding Comfort Test Method

Test tires were mounted on 17×9JJ rims, filled at an internal pressure of 220 kPa, and mounted on a passenger car. The car was driven over a test course by five trained drivers to evaluate the feeling. The results were ranked by a five-point system based on the following judgement criteria in relative comparison with reference tires. The average of the three drivers, not including the highest score and lowest score, was classified as follows.

Judgement criteria

5: Excellent, 4: good, 3: equal to reference, 2: poor, 1: very poor

Classification

Average score larger than reference (3 points): Very good

Equal to reference: Good

Less than reference: Poor

Standard Example 4, Examples 28 to 49, and Comparative Examples 17 to 26

(Reinforcing Liner of Side Wall Portion)

The results of the measurement and evaluation of the run flat tires in the examples are shown in Table VI.

TABLE VI (Run Flat Tire: Tire Size: 255/40R17)

| | Standard Ex. 4 | Comp. Ex. 17 | Comp. Ex. 18 | Ex. 28 | Comp. Ex. 19 | Ex. 29 | Ex. 30 |
|---|---|---|---|---|---|---|---|
| <Reinforcing liner layer> | | | | | | | |
| Formulation | Conventional rubber formulation A | Conventional rubber formulation B | C | C | D | E | F |
| Hydrogenated NBR (parts by weight) | — | — | 100 (standard) | 100 (standard) | 60 (under low limit) | 70 (lower limit) | 100 |
| Zinc methacrylate (parts by weight) | — | — | 80 (standard) | 80 (standard) | 80 | 80 | 80 |
| Carbon black (parts by weight) | 60 | 80 | 0 | 0 | 0 | 0 | 0 |
| Zinc methacrylate and carbon black total (parts by weight) | 60 | 80 | 80 | 80 | 80 | 80 | 80 |
| Maximum thickness (mm) | 4.0 | 4.0 | 4.0 | 4.0 | 4.0 | 4.0 | 4.0 |
| Reinforcing liner layer and belt layer overlap | Yes | Yes | Yes | Yes | Yes | Yes | Yes |
| Reinforcing liner layer and bead filler overlap | Yes | Yes | Yes | Yes | Yes | Yes | Yes |
| <Bonding layer> | | | | | | | |
| Existance of bonding layer and its structure and formulation | — | — | 2-layer*1 | P | P | P | P |
| Ratio A:B of (A) diene-based rubber and (B) NBR | — | — | — | 50:50 | 50:50 | 50:50 | 50:50 |
| (C) Aromatic petroleum resin to 100 parts by weight of (A) + (B) (parts by weight) | — | — | — | 30 (standard) | 30 | 30 | 30 |
| Sulfur (parts by weight) | — | — | — | 2 | 2 | 2 | 2 |
| Vulcanization accelerator CZ (parts by weight) | — | — | — | 1 | 1 | 1 | 1 |
| Vulcanization accelerator TOT-N (parts by weight) | — | — | — | 0.5 | 0.5 | 0.5 | 0.5 |
| Cross-linking agent (TAIC) (parts by weight) | — | — | — | 0 | 0 | 0 | 0 |

TABLE VI-continued (Run Flat Tire: Tire Size: 255/40R17)

|  |  |  |  |  |  |  |  |
|---|---|---|---|---|---|---|---|
| Organic peroxide (parts by weight) | — | — | — | 0 | 0 | 0 | 0 |
| Thickness (mm) | — | — | IIR:0.4 UHMwPE:0.1 | 0.5 | 0.5 | 0.5 | 0.5 |
| Bead area structure | FIG. 1(a) | FIG. 1(a) | FIG. 1(a) | FIG. 1(a) | FIG. 1(a) | FIG. 1(a) | FIG. 1(a) |
| Bead filler height (mm) | 32 | 32 | 32 | 32 | 32 | 32 | 32 |
| Bead filler JIS (A) hardness | 75 | 75 | 75 | 75 | 75 | 75 | 75 |
| Run flat durability (index) -> larger, the better | 100 | 85 (breaks) | 87 (adhesion) | 110 | 82 (soft) | 103 | 117 |
| Rolling resistance (index) -> smaller, the better | 100 | 103 | 98 | 93 | 92 | 94 | 95 |
| Riding comfort | Good | Good | Good | Good | Very Good | Good | Good |

|  | Comp. Ex. 19 | Ex. 31 | Ex. 32 | Comp. Ex. 20 | Ex. 33 | Comp. Ex. 21 | Ex. 34 | Ex. 35 |
|---|---|---|---|---|---|---|---|---|
| <Reinforcing liner layer> |  |  |  |  |  |  |  |  |
| Formulation | G | H | I | J | E | L | C | C |
| Hydrogenated NBR (parts by weight) | 100 (stand.) | 100 | 100 | 100 | 100 | 100 | 100 (stand) | 100 |
| Zinc methacrylate (parts by weight) | 10 (<low limit) | 20 (low limit) | 120 (hi limit) | 130 (>hi limit) | 80 | 80 | 80 (stand) | 80 |
| Carbon black (parts by weight) | 0 | 0 | 0 | 0 | 40 (hi limit) | 45 (>hi limit) | 0 | 0 |
| Zinc methacrylate and carbon black total (parts by weight) | 10 | 20 | 120 | 130 (>hi limit) | 120 (hi limit) | 125 (>hi limit) | 80 | 80 |
| Maximum thickness (mm) | 4.0 | 4.0 | 4.0 | 4.0 | 4.0 | 4.0 | 4.0 | 4.0 |
| Reinforcing liner layer and belt layer overlap | Yes | Yes | Yes | Yes | Yes | Yes | Yes | Yes |
| Reinforcing liner layer and bead filler overlap | Yes | Yes | Yes | Yes | Yes | Yes | Yes | Yes |
| <Bonding layer> |  |  |  |  |  |  |  |  |
| Existence of bonding layer and its structure and formulation | P | P | P | P | P | P | Q | R |
| Ratio A:B of (A) diene-based rubber and (B) NBR | 50:50 | 50:50 | 50:50 | 50:50 | 50:50 | 50:50 | 10:90 | 90:10 |
| (C) Aromatic petroleum resin to 100 parts by weight of (A) + (B) (parts by weight) | 30 (stand.) | 30 | 30 | 30 | 30 (stand.) | 30 | 30 (stand) | 30 |
| Sulfur (parts by weight) | 2 | 2 | 2 | 2 | 2 | 2 | 2 | 2 |
| Vulcanization accelerator CZ (parts by weight) | 1 | 1 | 1 | 1 | 1 | 1 | 1 | 1 |
| Vulcanization accelerator TOT-N (parts by weight) | 0.5 | 0.5 | 0.5 | 0.5 | 0.5 | 0.5 | 0.5 | 0.5 |
| Cross-linking agent (TAIC) (parts by weight) | 0 | 0 | 0 | 0 | 0 | 0 | 0 | 0 |
| Organic peroxide (parts by weight) | 0 | 0 | 0 | 0 | 0 | 0 | 0 | 0 |
| Thickness (mm) | 0.5 | 0.5 | 0.5 | 0.5 | 0.5 | 0.5 | 0.5 | 0.5 |
| Bead area structure | FIG. 1(a) | FIG. 1(a) | FIG. 1(a) | FIG. 1(a) | FIG. 1(a) | FIG. 1(a) | FIG. 1(a) | FIG. 1(a) |
| Bead filler height (mm) | 32 | 32 | 32 | 32 | 32 | 32 | 32 | 32 |
| Bead filler JIS (A) hardness | 75 | 75 | 75 | 75 | 75 | 75 | 75 | 75 |
| Run flat durability (index) -> larger, the better | 87 (soft) | 107 | 105 | 89 (hard) | 105 | 90 (brittle) | 108 | 104 |
| Rolling resistance (index) -> smaller, the better | 94 | 94 | 96 | 95 | 94 | 94 | 95 | 96 |
| Riding comfort | Very Good | Good | Good | Poor | Good | Poor | Good | Good |

|  | Comp. Ex. 22 | Ex. 36 | Ex. 37 | Comp. Ex. 23 | Comp. Ex. 24 | Ex. 38 | Ex. 39 | Ex. 40 | Ex. 41 | Comp. Ex. 25 |
|---|---|---|---|---|---|---|---|---|---|---|
| <Reinforcing liner layer> |  |  |  |  |  |  |  |  |  |  |
| Formulation | C | C | C | C | C | C | C | C | C | C |
| Hydrogenated NBR (parts by weight) | 100 (stand) | 100 | 100 | 100 | 100 (stand) | 100 | 100 | 100 | 100 | 100 |
| Zinc methacrylate (parts by weight) | 80 (stand) | 80 | 80 | 80 | 80 (stand) | 80 | 80 | 80 | 80 | 80 |
| Carbon black (parts by weight) | 0 | 0 | 0 | 0 | 0 | 0 | 0 | 0 | 0 | 0 |
| Zinc methacrylate and carbon black total (parts by weight) | 80 | 80 | 80 | 80 | 80 | 80 | 80 | 80 | 80 | 80 |
| Maximum thickness (mm) | 4.0 | 4.0 | 4.0 | 4.0 | 4.0 | 4.0 | 4.0 | 4.0 | 4.0 | 4.0 |
| Reinforcing liner layer and belt layer overlap | Yes | Yes | Yes | Yes | Yes | Yes | Yes | Yes | Yes | Yes |

TABLE VI-continued (Run Flat Tire: Tire Size: 255/40R17)

| | | | | | | | | | | |
|---|---|---|---|---|---|---|---|---|---|---|
| Reinforcing liner layer and bead filler overlap | Yes | Yes | Yes | Yes | Yes | Yes | Yes | Yes | Yes | Yes |
| <Bonding layer> | | | | | | | | | | |
| Existence of bonding layer and its structure and formulation | S | T | U | V | P | P | P | P | P | P |
| Ratio A:B of (A) diene-based rubber and (B) NBR | 50:50 | 50:50 | 50:50 | 50:50 | 50:50 | 50:50 | 50:50 | 50:50 | 50:50 | 50:50 |
| (C) Aromatic petroleum resin to 100 parts by weight of (A) + (B) (parts by weight) | 3 | 5 (low limit) | 80 (hi limit) | 85 | 30 (stand) | 30 | 30 | 30 | 30 | 30 |
| Sulfur (parts by weight) | 2 | 2 | 2 | 2 | 2 | 2 | 2 | 2 | 2 | 2 |
| Vulcanization accelerator CZ (parts by weight) | 1 | 1 | 1 | 1 | 1 | 1 | 1 | 1 | 1 | 1 |
| Vulcanization accelerator TOT-N (parts by weight) | 0.5 | 0.5 | 0.5 | 0.5 | 0.5 | 0.5 | 0.5 | 0.5 | 0.5 | 0.5 |
| Cross-linking agent (TAIC) (parts by weight) | 0 | 0 | 0 | 0 | 0 | 0 | 0 | 0 | 0 | 0 |
| Organic peroxide (parts by weight) | 0 | 0 | 0 | 0 | 0 | 0 | 0 | 0 | 0 | 0 |
| Thickness (mm) | 0.5 | 0.5 | 0.5 | 0.5 | 0.05 | 0.1 (low limit) | 0.2 | 0.8 | 2.0 (hi limit) | 2.5 |
| Bead area structure | FIG. 1(a) | FIG. 1(a) | FIG. 1(a) | FIG. 1(a) | FIG. 1(a) | FIG. 1(a) | FIG. 1(a) | FIG. 1(a) | FIG. 1(a) | FIG. 1(a) |
| Bead filler height (mm) | 32 | 32 | 32 | 32 | 32 | 32 | 32 | 32 | 32 | 32 |
| Bead filler JIS (A) hardness | 75 | 75 | 75 | 75 | 75 | 75 | 75 | 75 | 75 | 75 |
| Run flat durability (index) -> larger, the better | 95 (adhesion) | 127 | 117 | 92 (heat) | 95 | 103 | 104 | 121 | 111 | 94 (heat) |
| Rolling resistance (index) -> smaller, the better | 96 | 95 | 96 | 94 | 94 | 94 | 95 | 95 | 96 | 97 |
| Riding comfort | Good | Good | Good | Good | Good | Good | Good | Good | Good | Good |

| | Ex. 42 | Ex. 43 | Ex. 44 | Ex. 45 | Ex. 46 | Ex. 47 | Comp. Ex. 26 | Ex. 48 | Ex. 49 |
|---|---|---|---|---|---|---|---|---|---|
| <Reinforcing liner layer> | | | | | | | | | |
| Formulation | C | C | C | C | C | C | C | C | C |
| Hydrogenated NBR (parts by weight) | 100 (stand) | 100 (stand) | 100 | 100 | 100 | 100 | 100 | 100 | 100 |
| Zinc methacrylate (parts by weight) | 80 (stand) | 80 (stand) | 80 | 80 | 80 | 80 | 80 | 80 | 80 |
| Carbon black (parts by weight) | 0 | 0 | 0 | 0 | 0 | 0 | 0 | 0 | 0 |
| Zinc methacrylate and carbon black total (parts by weight) | 80 | 80 | 80 | 80 | 80 | 80 | 80 | 80 | 80 |
| Maximum thickness (mm) | 4.0 | 3.0 | 8.0 | 4.0 | 4.0 | 4.0 | 4.0 | 4.0 | 4.0 |
| Reinforcing liner layer and belt layer overlap | Yes | Yes | Yes | No | Yes | No | Yes | Yes | Yes |
| Reinforcing liner layer and bead filler overlap | Yes | Yes | Yes | Yes | No | No | Yes | Yes | Yes |
| <Bonding layer> | | | | | | | | | |
| Existence of bonding layer and its structure and formulation | U | P | P | P | P | P | P | P | P |
| Ratio A:B of (A) diene-based rubber and (B) NBR | 50:50 | 50:50 | 50:50 | 50:50 | 50:50 | 50:50 | 50:50 | 50:50 | 50:50 |
| (C) Aromatic petroleum resin to 100 parts by weight of (A) + (B) (parts by weight) | 30 (stand) | 30 (stand) | 30 | 30 | 30 | 30 | 30 | 30 | 30 |
| Sulfur (parts by weight) | 0 | 2 | 2 | 2 | 2 | 2 | 2 | 2 | 2 |
| Vulcanization accelerator CZ (parts by weight) | 0 | 1 | 1 | 1 | 1 | 1 | 1 | 1 | 1 |
| Vulcanization accelerator TOT-N (parts by weight) | 0 | 0.5 | 0.5 | 0.5 | 0.5 | 0.5 | 0.5 | 0.5 | 0.5 |
| Crosslinking agent (TAIC) (parts by weight) | 3 | 0 | 0 | 0 | 0 | 0 | 0 | 0 | 0 |
| Organic peroxide (parts by weight) | 2 | 0 | 0 | 0 | 0 | 0 | 0 | 0 | 0 |
| Thickness (mm) | 0.5 | 0.5 | 0.5 | 0.5 | 0.5 | 0.5 | 0.5 | | |
| Bead area structure | FIG. 1(a) | FIG. 1(a) | FIG. 1(a) | FIG. 1(b) | FIG. 1(c) | FIG. 1(d) | FIG. 1(a) | FIG. 1(a) | FIG. 1(e) |
| Bead filler height (mm) | 32 | 32 | 32 | 32 | 32 | 32 | 45 | 35 | 32 |
| Bead filler JIS (A) hardness | 75 | 75 | 75 | 75 | 75 | 75 | 75 | 75 | 75 |
| Run flat durability (index) -> larger, the better | 147 | 108 | 135 | 107 | 105 | 102 | 100 | 108 | 115 |

TABLE VI-continued (Run Flat Tire: Tire Size: 255/40R17)

| Rolling resistance (index) -> smaller, the better | 96 | 92 | 99 | 93 | 94 | 94 | 97 | 98 | 96 |
|---|---|---|---|---|---|---|---|---|---|
| Riding comfort | Good | Good | Good | Good | Good | Good | Good | Good | Good |

*1: Two-layer structure of isobutylene-isoprene copolymer (IIR) rubber layer and ultrahigh molecular weight polyethylene (UHMwPE) sheet.

As is seen from the results of Table VI, pneumatic tires configured by bonding the reinforcing liner layers of the compositions according to the present invention with the adjoining rubber layers in predetermined positional relationships through bonding rubber layers comprised of predetermined compositions are excellent in all of the run flat durability, rolling resistance, and riding comfort and give excellent run flat tires.

The following commercial products were used for the ingredients of the formulations used in the following Standard Example 5, Examples 50 to 66, and Comparative Examples 27 to 36. Note that blending agents not changed in amounts are not listed in the tables of the examples.

1) Ingredients of Formulations of Bead Portion Reinforcing Rubber Members

| | |
|---|---|
| Hydrogenated NBR: Zetpol 2020 (made by Nippon Zeon) | variate |
| Zinc methacrylate: R-20S (made by Asada Chemical Industry) | variate |
| Carbon black: N339 (made by Showa Cabot) | variate |
| Organic peroxide (40% diluted): Parkadox 14/40 (made by Kayaku Akzo) | 5 parts by weight |
| Antioxidant: Nauguard 445 (made by Uniroyal) | 1.5 parts by weight |

2) Ingredients of Formulations of Bonding Rubber Layer

| | |
|---|---|
| Diene-based rubber (NR): RSS#3 | variate |
| NBR: Nipol DN401 (made by Nippon Zeon) | variate |
| Carbon black: N339 (made by Showa Cabot) | 50 parts by weight |
| Aromatic petroleum resin: FR-120 (made by Fujikosan) | variate |
| Zinc oxide: Zinc White #3 (made by Seido Chemical Industry) | 5 parts by weight |
| Stearic acid: Beads Stearic Acid (made by Nippon Oil and Fat) | 1 part by weight |
| Antioxidant: Nocrac 224 (made by Ouchi Shinko Chemical) | 1 part by weight |
| Sulfur: Insoluble sulfur (sulfur vulcanization based) | 2 parts by weight |
| Vulcanization accelerator: Nocceler CZ-G (made by Ouchi Shinko Chemical) (sulfur vulcanization based) | 1 part by weight |
| Vulcanization accelerator: Nocceler TOT-N (made by Ouchi Shinko Chemical) (sulfur vulcanization based) | 0.5 part by weight |
| Organic peroxide (40% diluted): Parkadox 14/40 (made by Kayaku Akzo) (organic peroxide cross-linking based) | 5 parts by weight |
| Co-cross-linking agent: TAIC (made by Nippon Kasei Chemical) (organic peroxide cross-linking based) | 3 parts by weight |

The rubber formulations A and B used in Standard Example 5 and Comparative Example 27 in Table VII were as follows:

| Conventional rubber formulation | A (parts by weight) | B (parts by weight) |
|---|---|---|
| NR: RSS#3 | 75 | 75 |
| SBR: Nipol 1502 (made by Nippon Zeon) | 25 | 25 |
| Carbon black: B326M (made by Showa Cabot) | 70 | 65 |
| Zinc oxide: Zinc White #3 (made by Seido Chemical Industry) | 5 | 5 |
| Stearic acid: Beads Stearic Acid (made by Nippon Oil and Fat) | 1 | 1 |
| Antioxidant: Nocrac 224 (made by Ouchi Shinko Chemical) | 1 | 1 |
| Novolak type phenol resin: PR-YR-36F (made by Sumitomo Durez) | 5 | 20 |
| Sulfur: Insoluble sulfur | 5 | 5 |
| Vulcanization accelerator: Nocceler NS-F (made by Ouchi Shinko Chemical) | 2.5 | 2.5 |
| Nocceler H (made by Ouchi Shinko Chemical) | 1 | 1 |

Fabrication of Test Tires

Reinforcing rubber members of the bead portion comprised of compositions of the formulations shown in the Examples were extruded into different shapes and wrapped around by the bonding rubber layers shown in the examples, then shaped by conventional techniques and arranged and bonded to give the predetermined positional relationships shown in FIGS. 2(a) to 2(c) to fabricate tires of a size of 185/65 R14 which were used for durability tests, driving stability tests, and riding comfort tests.

Note that FIGS. 2(a) to 2(c) show the reinforcing rubber members of the bead portions and the bonding rubber layers together.

The methods of measurement and evaluation in the examples were as follows:

1) Durability Test

Tires were run under the following conditions and the distances at which trouble occurred were expressed as indexes, (The larger the index, the better.)

Running conditions: A drum tester having a smooth drum surface, made of steel, and having an inside diameter of 1707 mm was used, the ambient temperature was controlled to 38±3° C., and the tires were run under conditions of a rim size of 14×5.5-J, an internal pressure of 240 kPa, and a speed of 81 km/h. The load was started from an initial 4.5 kN and increased to a load of 7.28 kN in 0.68 kN increments every 2 hours. After this, the load was increased to a load of 14.0 kN in 0.68 kN increments every 4 hours. The test was ended when running at a load of 14.0 kN for 4 hours.

2) Vehicular Driving Stability/Riding Comfort Test

Test tires mounted on 14×5.5-J rims at an internal pressure of 200 kPa were mounted on a 1.6 liter engine displacement front engine front wheel drive passenger car. The car was driven over a test course by five trained drivers to evaluate the feeling. The results were ranked by a five-point system based on the following judgement criteria in relative comparison with reference tires. The average of the three drivers, not including the highest score and lowest score, was classified as follows.

Judgement criteria
5: Excellent, 4: good, 3: equal to reference, 2: poor, 1: very poor Classification
Average score larger than reference (3 points): Very good
Equal to reference: Good
Less than reference: Poor Standard Example 5, Examples 50 to 66, and Comparative Examples 27 to 36
(Reinforcing Rubber of Bead Portion)

The results of tests on the durability, driving stability, and riding comfort of the test tires in the examples are shown in the following Table VII.

TABLE VII (Tire Size: 185/65R14)

|  | Stand. Ex. 5 | Comp. Ex. 27 | Comp. Ex. 28 | Ex. 50 | Comp. Ex. 29 | Ex. 51 | Ex. 52 |
|---|---|---|---|---|---|---|---|
| <Bead reinforcing rubber member> | | | | | | | |
| Formulation | Conv. Rubber form. A | Conv. rubber form. B | C | C | D | B | F |
| Hydrogenated NBR (parts by weight) | — | — | 100 (stand.) | 100 (stand.) | 60 (<low limit) | 70 (low limit) | 100 |
| Zinc methacrylate (parts by weight) | — | — | 80 (stand.) | 80 (stand.) | 80 | 80 | 80 |
| Carbon black (parts by weight) | (70) | (65) | 0 | 0 | 0 | 0 | 0 |
| Zinc methacrylate and carbon black total (parts by weight) | | | 80 | 80 | 80 | 80 | 80 |
| Novolak-type phenol resin (parts by weight) | 5 | 20 | | | | | |
| <Bonding layer> | | | | | | | |
| Existence and no. of bonding layers | — | — | 2-layer*1 | 1-layer | 1-layer | 1-layer | 1-layer |
| Formulation | — | — | — | N | N | N | N |
| Ratio A:B of (A) diene-based rubber and (B) NBR | — | — | — | 50:50 | 50:50 | 50:50 | 50:50 |
| (C) Aromatic petroleum resin to 100 parts by weight of (A) + (B) (parts by weight) | — | — | — | 30 (stand) | 30 | 30 | 30 |
| Sulfur (parts by weight) | — | — | — | 2 | 2 | 2 | 2 |
| Vulcanization accelerator CZ (parts by weight) | — | — | — | 1 | 1 | 1 | 1 |
| Vulcanization accelerator TOT-N (parts by weight) | — | — | — | 0.5 | 0.5 | 0.5 | 0.5 |
| Cross-linking agent (TAIC) (parts by weight) | — | — | — | 0 | 0 | 0 | 0 |
| Organic peroxide (parts by weight) | — | — | — | 0 | 0 | 0 | 0 |
| Thickness of bonding layer (mm) | — | — | 11R:0.2 UHMwPE:0.2 | 0.5 | 0.5 | 0.5 | 0.5 |
| Bead area structure | FIG. 2(a) | FIG. 2(a) | FIG. 2(a) | FIG. 2(a) | FIG. 2(a) | FIG. 2(a) | FIG. 2(a) |
| Bead filler height (mm) | 45 | 45 | 45 | as | 45 | 45 | 45 |
| Bead filler JIS (A) hardness | 65 | 95 | 95 | 95 | 85 | 93 | 95 |
| Durability (index of running distance) –> larger, the better | 100 | 97 (break) | 87 (adhesion) | 120 | 127 | 125 | 122 |
| Driving stability | Poor | Good | Good | Good | Poor | Good | Good |
| Riding comfort | V. Good | Good | Good | Good | V. Good | Good | Good |

|  | Comp. Ex. 30 | Ex. 53 | Ex. 54 | Comp. Ex. 31 | Ex. 55 | Comp. Ex. 32 |
|---|---|---|---|---|---|---|
| <Bead reinforcing rubber member> | | | | | | |
| Formulation | G | H | I | J | K | L |
| Hydrogenated NBR (parts by weight) | 100 (stand.) | 100 | 100 | 100 | 100 (stand.) | 100 |
| Zinc methacrylate (parts by weight) | 20 (<low limit) | 40 (low limit) | 120 (hi limit) | 130 (>hi limit) | 80 (stand.) | 80 |
| Carbon black (parts by weight) | 0 | 0 | 0 | 0 | 40 (hi limit) | 50 (>hi limit) |
| Zinc methacrylate and carbon black total (parts by weight) | 20 | 40 | 120 | 130 | 120 (hi limit) | 130 (>hi limit) |
| <Bonding layer> | | | | | | |
| Existence and no. of bonding layers | 1-layer | 1-layer | 1-layer | 1-layer | 1-layer | 1-layer |
| Formulation | N | N | N | N | N | N |
| Ratio A:B of (A) diene-based rubber and (B) NBR | 50:50 | 50:50 | 50:50 | 50:50 | 50:50 | 50:50 |

TABLE VII-continued (Tire Size: 185/65R14)

| | | | | | | |
|---|---|---|---|---|---|---|
| (C) Aromatic petroleum resin to 100 parts by weight of (A) + (B) (parts by weight) | 30 (stand.) | 30 | 30 | 30 | 30 (stand.) | 30 |
| Sulfur (parts by weight) | 2 | 2 | 2 | 2 | 2 | 2 |
| Vulcanization accelerator CZ (parts by weight) | 1 | 1 | 1 | 1 | 1 | 1 |
| Vulcanization accelerator TOT-N (parts by weight) | 0.5 | 0.5 | 0.5 | 0.5 | 0.5 | 0.5 |
| Cross-linking agent (TAIC) (parts by weight) | 0 | 0 | 0 | 0 | 0 | 0 |
| Organic peroxide (parts by weight) | 0 | 0 | 0 | 0 | 0 | 0 |
| Thickness of bonding layer (mm) | 0.5 | 0.5 | 0.5 | 0.5 | 0.5 | 0.5 |
| Bead area structure | FIG. 2(a) | FIG. 2(e) | FIG. 2(a) | FIG. 2(a) | FIG. 2(a) | FIG. 2(a) |
| Bead filler height (mm) | 45 | 45 | 45 | 45 | 45 | 45 |
| Bead filler JIS (A) hardness | 82 (soft) | 94 | 95 | 97 | 95 | 97 |
| Durability (index of running distance) -> larger, the better | 131 | 121 | 120 | 115 | 106 | 95 (brittle) |
| Driving stability | Poor | Good | Good | V. Good | Good | Good |
| Riding comfort | V. Good | Good | Good | Poor | Good | Poor |

| | Ex. 56 | Ex. 57 | Comp. Ex. 33 | Ex. 58 | Ex. 59 | Comp. Ex. 34 |
|---|---|---|---|---|---|---|
| <Bead reinforcing rubber member> | | | | | | |
| Formulation | C | C | C | C | C | C |
| Hydrogenated NBR (parts by weight) | 100 (stand.) | 100 | 100 (stand.) | 100 | 100 | 100 |
| Zinc methacrylate (parts by weight) | 80 (stand.) | 80 | 80 (stand.) | 80 | 80 | 80 |
| Carbon black (parts by weight) | 0 | 0 | 0 | 0 | 0 | 0 |
| Zinc methacrylate and carbon black total (parts by weight) | 80 | 80 | 80 | 80 | 80 | 80 |
| <Bonding layer> | | | | | | |
| Existence and no. of bonding layers | 1-layer | 1-layer | 1-layer | 1-layer | 1-layer | 1-layer |
| Formulation | O | P | Q | R | S | T |
| Ratio A:B of (A) diene-based rubber and (B) NBR | 10:90 | 90:10 | 50:50 | 50:50 | 50:50 | 50:50 |
| (C) Aromatic petroleum resin to 100 parts by weight of (A) + (B) (parts by weight) | 30 (stand.) | 30 | 3 | 5 | 80 | 85 |
| Sulfur (parts by weight) | 2 | 2 | 2 | 2 | 2 | 2 |
| Vulcanization accelerator CZ (parts by weight) | 1 | 1 | 1 | 1 | 1 | 1 |
| Vulcanization accelerator TOT-N (parts by weight) | 0.5 | 0.5 | 0.5 | 0.5 | 0.5 | 0.5 |
| Cross-linking agent (TAIC) (parts by weight) | 0 | 0 | 0 | 0 | 0 | 0 |
| Organic peroxide (parts by weight) | 0 | 0 | 0 | 0 | 0 | 0 |
| Thickness of bonding layer (mm) | 0.5 | 0.5 | 0.5 | 0.5 | 0.5 | 0.5 |
| Bead area structure | FIG. 2(a) | FIG. 2(a) | FIG. 2(a) | FIG. 2(a) | FIG. 2(a) | FIG. 2(a) |
| Bead filler height (mm) | 45 | 45 | 45 | as | 45 | 45 |
| Bead filler JIS (A) hardness | 95 | 95 | 95 | 95 | 95 | 95 |
| Durability (index of running distance) -> larger, the better | 125 | 123 | 96 (adhesion) | 115 | 117 | 93 (heat) |
| Driving stability | Good | Good | Good | Good | Good | Good |
| Riding comfort | Good | Good | Good | Good | Good | Good |

| | Comp. Ex. 35 | Ex. 60 | Ex. 61 | Ex. 62 | Ex. 63 | Comp. Ex. 36 |
|---|---|---|---|---|---|---|
| <Bead reinforcing rubber member> | | | | | | |
| Formulation | C | C | C | C | C | C |
| Hydrogenated NBR (parts by weight) | 100 (stand.) | 100 | 100 | 100 | 100 | 100 |
| Zinc methacrylate (parts by weight) | 80 (stand.) | 80 | 80 | 80 | 80 | 80 |
| Carbon black (parts by weight) | 0 | 0 | 0 | 0 | 0 | 0 |
| Zinc methacrylate and carbon black total (parts by weight) | 80 | 80 | 80 | 80 | 80 | 80 |
| <Bonding layer> | | | | | | |
| Existence and no. of bonding layers | 1-layer | 1-layer | 1-layer | 1-layer | 1-layer | 1-layer |
| Formulation | N | N | N | N | N | N |
| Ratio A:B of (A) diene-based rubber and (B) NBR | 50:50 | 50:50 | 50:50 | 50:50 | 50:50 | 50:50 |
| (C) Aromatic petroleum resin to 100 parts by weight of (A) + (B) (parts by weight) | 30 (stand.) | 30 | 30 | 30 | 30 | 30 |

TABLE VII-continued (Tire Size: 185/65R14)

| | | | | | | |
|---|---|---|---|---|---|---|
| Sulfur (parts by weight) | 2 | 2 | 2 | 2 | 2 | 2 |
| Vulcanization accelerator CZ (parts by weight) | 1 | 1 | 1 | 1 | 1 | 1 |
| Vulcanization accelerator TOT-N (parts by weight) | 0.5 | 0.5 | 0.5 | 0.5 | 0.5 | 0.5 |
| Cross-linking agent (TAIC) (parts by weight) | 0 | 0 | 0 | 0 | 0 | 0 |
| Organic peroxide (parts by weight) | 0 | 0 | 0 | 0 | 0 | 0 |
| Thickness of bonding layer (mat) | 0.05 | 0.1 | 0.2 | 0.8 | 2.0 | 2.5 |
| Bead area structure | FIG. 2(a) | FIG. 2(a) | FIG. 2(a) | FIG. 2(a) | FIG. 2(a) | FIG. 2(a) |
| Bead filler height (mm) | 45 | 45 | 45 | 45 | 45 | 45 |
| Bead filler JIS (A) hardness | 95 | 95 | 95 | 95 | 95 | 95 |
| Durability (index of running distance) -> larger, the better | 115 | 117 | 115 | 116 | 110 | 97 (heat) |
| Driving stability | Good | Good | Good | Good | Good | Good |
| Riding comfort | Good | Good | Good | Good | Good | Good |

| | Ex. 64 | Ex. 65 | Ex. 66 |
|---|---|---|---|
| <Bead reinforcing rubber member> | | | |
| Formulation | C | C | C |
| Hydrogenated NBR (parts by weight) | 100 (stand.) | 100 (stand.) | 100 |
| Zinc methacrylate (parts by weight) | 80 (stand.) | 80 (stand.) | 80 |
| Carbon black (parts by weight) | 0 | 0 | 0 |
| Zinc methacrylate and carbon black total (parts by weight) | 80 | 80 | 80 |
| <Bonding layer> | | | |
| Existence and no. of bonding layers | 1-layer | 1-layer | 1-layer |
| Formulation | U | N | N |
| Ratio A:B of (A) diene-based rubber and (B) NBR | 50:50 | 50:50 | 50:50 |
| (C) Aromatic petroleum resin to 100 parts by weight of (A) + (B) (parts by weight) | 30 (stand.) | 30 (stand.) | 30 |
| Sulfur (parts by weight) | 0 | 2 | 2 |
| Vulcanization accelerator CZ (parts by weight) | 0 | 1 | 1 |
| Vulcanization accelerator TOT-N (parts by weight) | 0 | 0.5 | 0.5 |
| Cross-linking agent (TAIC) (parts by weight) | 3 | 0 | 0 |
| Organic peroxide (parts by weight) | 2 | 0 | 0 |
| Thickness of bonding layer (mm) | 0.5 | 0.5 | 0.5 |
| Bead area structure | FIG. 2(a) | FIG. 2(b) | FIG. 2(c) |
| Bead filler height (mm) | 45 | 45 | 45 |
| Bead filler JIS (A) hardness | 95 | 95 | 95 |
| Durability (index of running distance) -> larger, the better | 118 | 124 | 122 |
| Driving stability | Good | Good | Good |
| Riding comfort | Good | Good | Good |

*1: Two-layer structure of isobutylene-isoprene copolymer (IIR) rubber layer and ultrahigh molecular weight polyethylene (UHMwPE) sheet.

As seen from the results of Table VII, the tires obtained by arranging and bonding the reinforcing rubber members of the bead portions according to the present invention at predetermined locations are superior in durability and greatly improved in driving stability and riding comfort.

In the following Standard Example 6, Example 67 to 82, and Comparative Examples 37 to 44, test tires of a tire size of 185/65R14 were prepared using the ingredients of the formulations listed in the tables to give the tire configurations listed in the tables and the results of tests on them were shown.

The following commercial products were used for the ingredients of the formulations used in the examples. Note that blending agents not changed in amount are not listed in the tables of the examples.

1) Ingredients of Formulations of Carcass Coat

| | |
|---|---|
| NR: RSS#3 | variate |
| HNBR (hydrogenated NBR): Zetpol 2020 (made by Nippon Zeon) | variate |
| Zinc methacrylate: R-20S (made by Asada Chemical Industry) | variate |
| Carbon black (FEF grade): HTC-100 (made by Shinnikka Carbon) | variate |
| Zinc oxide: Zinc White #3 (made by Seido Chemical Industry) | 5 parts by weight |
| Antioxidant: Nauguard 445 (made by Uniroyal) | 1.5 parts by weight |
| Organic peroxide: Parkadox 14/40 (made by Kayaku Akzo) | 5 parts by weight |

-continued

2) Ingredients of Formulations of Bonding Rubber Layer

| | |
|---|---|
| Diene-based rubber (NR): RSS#3 | variate |
| NBR: Nipol DN401 (made by Nippon Zeon) | variate |
| Carbon black: N339 (made by Showa Cabot) | variate |
| Aromatic petroleum resin: FR-120 (made by Fujikosan) | variate |
| Zinc oxide: Zinc White #3 (made by Seido Chemical Industry) | 5 part by weight |
| Stearic acid: Beads Stearic Acid (made by Nippon Oil and Fat) | 1 part by weight |
| Antioxidant: Nocrac 224 (made by Ouchi Shinko Chemical) | 1 part by weight |
| Sulfur: Insoluble sulfur (sulfur vulcanization based) | 2 parts by weight |
| Vulcanization accelerator: Nocceler CZ-G (made by Ouchi Shinko Chemical) (sulfur vulcanization based) | 1 part by weight |
| Vulcanization accelerator: Nocceler TOT-N (made by Ouchi Shinko Chemical) (sulfur vulcanization based) | 0.5 part by weight |
| Organic peroxide (40% diluted): Parkadox 14/40 (made by Kayaku Akzo) (organic peroxide cross-linking based) | 3.5 parts by weight |
| Co-cross-linking agent: TAIC (made by Nippon Kasei Chemical) (organic peroxide cross-linking based) | 3 parts by weight |

The following commercial products were used for the ingredients for the formulations in the standard examples in Tables VIII to X. Note that the blending agents of the standard examples include ingredients not listed in the tables.

| Ingredients of Formulation in Carcass Coat in Standard Example | |
|---|---|
| NR: RSS#3 | 70 parts by weight |
| SBR: Nipol 1502 (made by Nippon Zeon) | 30 parts by weight |
| Carbon black (FEF grade): HTC-100 (made by Shinnikka Carbon) | 50 parts by weight |
| Zinc oxide: Zinc White #3 (made by Seido Chemical Industry) | 5 parts by weight |
| Stearic acid: Beads Stearic Acid (made by Nippon Oil and Fat) | 1 part by weight |
| Aromatic oil: Komorex 300 (made by Nippon Oil) | 8 parts by weight |
| Antioxidant: Nocrac 224 (made by Ouchi Shinko Chemical) | 1.5 parts by weight |
| Sulfur: Insoluble sulfur | 2.5 parts by weight |
| Vulcanization accelerator: Nocceler CZ-G (made by Ouchi Shinko Chemical) | 1 part by weight |
| Vulcanization accelerator: Nocceler NS-F (made by Ouchi Shinka Chemical) | 1.5 parts by weight |

The methods of measurement and evaluation in the Examples were as follows;

1) Rolling Resistance Test

Tires were run under the following conditions to measure the rolling resistance at that time. The results were expressed indexed to the measured value for a conventional tire as 100. (The smaller the value, the better.)

Running conditions: A drum tester having a smooth drum surface, made of steel, and having an inside diameter of 1707 mm was used, the ambient temperature was controlled to 23±2° C., and the tires were run under conditions of a rim size of 14×5.5-J, an internal pressure of 200 kPa, a load of 4.1 kN, and a speed of 80 km/h.

2) Driving Stability Peeling Test

Test tires mounted on 14×5.5-J rims at an internal pressure of 200 kPa were mounted on a 1.6 liter engine displacement front engine front wheel drive compact passenger car. The car was driven over a test course by five trained drivers to evaluate the feeling. The results were ranked by a five-point system based on the following judgement criteria in relative comparison with reference tires. The average of the three drivers, not including the highest score and lowest score, was shown.

Judgement criteria:

5: Excellent, 4: good, 3.5: somewhat good, 3: equal to reference, 2.5: somewhat poor (practical lower limit), 2: poor, 1: very poor 3) Indoor Durability Test A drum tester having a smooth drum surface, made of steel, and having an inside diameter of 1707 mm was used, the ambient temperature was controlled to 38±3° C., and the tires were run at a rim size of 14×5.5-J, an internal pressure of 140 kPa, a load of 6.0 kN, and a speed of 140 km/h until trouble occurred. The running distances until trouble occurred in the tires was expressed indexed to the distance where trouble occurred in a standard tire as 100. (The larger the value, the better.)

4) Air Leakage Test

The tire was allowed to stand at an initial pressure of 200 kPa, room temperature of 20° C., and no load conditions for three months, The internal pressure was measured at intervals of four days. The $\alpha$ value was found by recurrence to the following equation where the measurement pressure was $P_t$, the initial pressure was $P_0$, and the number of days elapsed was t:

$$P_t/P_0 = exp(-\alpha t)$$

Using the $\alpha$ obtained and substituting 30 (days) for t, the following wag obtained:

$$\beta = [1 - exp(-\alpha t)] \times 100$$

$\beta$ was made the pressure drop (%/month) per month.

Standard Example 6, Examples 67 to 71, and Comparative Examples 37 to 41

(Carcass Coat)

The results of tests in the case of changing the compound of the carcass coat are shown in Table VIII.

TABLE VIII

<Examples of Changing Carcass Coat Compound>

| Carcass coat | Stand. Ex. 6 | Comp. Ex. 37 | Comp. Ex. 38 | Comp. Ex. 39 | Ex. 67 | Ex. 68 | Ex. 69 |
|---|---|---|---|---|---|---|---|
| NR (phr) | 70 | 70 | 40 | 30 | 30 | 30 | 30 |
| SBR (phr) | 30 | 30 | | | | | |
| HNBR (phr) | | | 60 | 70 | 70 | 70 | 70 |
| Zinc methacrylate (phr) | 0 | 0 | 0 | 0 | 20 | 20 | 40 |
| Carbon (FEF grade) (phr) | 50 | 50 | 45 | 45 | 35 | 35 | 10 |
| Bonding rubber layer | | | | | | | |
| NR (phr) | — | — | — | — | — | 70 | 70 |
| NBR (phr) | — | — | — | — | — | 30 | 30 |
| Aromatic petroleum resin (phr) | — | — | — | — | — | 40 | 40 |
| Sulfur (phr) | — | — | — | — | — | 2 | 2 |
| Vulcanization accelerator (CZ) (phr) | — | — | — | — | — | 1 | 1 |
| Vulcanization accelerator (TOT-N) (phr) | — | — | — | — | — | 0.5 | 0.5 |
| Tire structure | | | | | | | |
| Bonding rubber layer thickness (mm) | — | — | — | — | — | 0.3 | 0.3 |
| Air barrier layer | Yes | No | No | No | No | No | No |
| Carcass coat thickness (mm) | 1.2 | 1.2 | 1.0 | 1.0 | 1.0 | 1.0 | 1.0 |
| Air barrier layer thickness (mm) | 1.2 | — | — | — | — | — | — |
| Tire mass (g) | 7300 | 6850 | 6770 | 6770 | 6765 | 6885 | 6890 |
| Test results | | | | | | | |
| Rolling resistance (index) | 100 | 100 | 101 | 101 | 99 | 99 | 98 |
| Driving stability feeling (score) | 3 | 2 | 3 | 3.5 | 3 | 3 | 3.5 |
| Indoor durability test (index) | 100 | 104 | 96 | 99 | 102 | 114 | 120 |
| Air leakage test (%/month) | 2.8 | 8.9 | 3.0 | 2.7 | 2.7 | 2.7 | 2.6 |

| Carcass coat | Ex. 70 | Ex. 71 | Comp. Ex. 40 | Comp. Ex. 41 |
|---|---|---|---|---|
| NR (phr) | 30 | | 30 | 30 |
| SBR (phr) | | | | |
| HNBR (phr) | 70 | 100 | 70 | 70 |
| Zinc methacrylate (phr) | 80 | 40 | 100 | 70 |
| Carbon (FEF grade) (phr) | 5 | 10 | 0 | 25 |
| Bonding rubber layer | | | | |
| NR (phr) | 70 | 70 | 70 | 70 |
| NBR (phr) | 30 | 30 | 30 | 30 |
| Aromatic petroleum resin (phr) | 40 | 40 | 40 | 40 |
| Sulfur (phr) | 2 | 2 | 2 | 2 |
| Vulcanization accelerator (CZ) (phr) | 1 | 1 | 1 | 1 |
| Vulcanization accelerator (TOT-N) (phr) | 0.5 | 0.5 | 0.5 | 0.5 |
| Tire structure | | | | |
| Bonding rubber layer thickness (mm) | 0.3 | 0.3 | 0.3 | 0.3 |
| Air barrier layer | No | No | No | No |
| Carcass coat thickness (mm) | 1.0 | 1.0 | 1.0 | 1.0 |
| Air barrier layer thickness (mm) | — | — | — | — |
| Tire mass (g) | 6890 | 6890 | 6900 | 6900 |
| Test results | | | | |
| Rolling resistance (index) | 98 | 98 | 97 | 99 |
| Driving stability feeling (score) | 4 | 3.5 | 3.5 | 3.5 |
| Indoor durability test (index) | 127 | 118 | 97 | 93 |
| Air leakage test (%/month) | 2.5 | 2.3 | 2.5 | 2.4 |

The tires of Examples 37 to 71 using carcass coats satisfying the various conditions defined in the present invention exhibited good results in all of the rolling resistance, driving stability feeling, indoor durability test, and air leakage test. As opposed to this, with the tire using a conventional carcass coat and omitting the air barrier layer of Comparative Example 37, the air leakage became worse and the driving stability feeling declined. Further, in Comparative Example 38 where the amount of HNBR was less than the lower limit, there was a large air leakage, while in Comparative Example 39 where the amount of HNBR was sufficient and there was too much carbon black, it was seen that the rolling resistance became worse. Further, in Comparative Example 40 where there was too much zinc methacrylate, the carcass coat became too hard and the tire failed in durability, while in Comparative Example 41 where the total of the zinc methacrylate and the carbon black exceeded 90 parts by weight, the tire also failed. In Example 68 with the bonding rubber layer, the durability was further improved compared with Example 67 without the same. In Examples 69 and 70 where the amounts of zinc methacrylate were increased, it was seen that the hardness of the rubber was improved and the driving stability feeling was further improved while maintaining the rolling resistance. In Example 71 where the HNBR was made 100 phr, it was seen that the air barrier performance was further improved.

Standard Example 6, Examples 72 to 77, and
Comparative Example 42
(Carcass Coat)

The results of tests in the case of leaving the formulation of the carcass coat constant and changing the compound of the bonding rubber compound are shown in Table IX.

The tires of Example 72 to 77 having carcass coats using the bonding rubber layer defined in the present invention exhibited good results in all of the rolling resistance, driving stability feeling, indoor durability test, and air leakage test. As opposed to this, with tires like in Comparative Example 42 where the aromatic oil resin ingredient was formulated in over the upper limit, the bonding rubber layer broke and the durability became pool. It was seen that the tire of Example 75 which suitably increased the amount of the aromatic oil resin in the range of the predetermined amount of formulation was further improved in the durability. Further, in Example 77 which was formulated a co-cross-linking agent in the bonding rubber layer and was cross-linked by an organic peroxide, it was seen that the durability was further improved.

Standard Example 6, Examples 78 to 82, and
Comparative Examples 43 to 44
(Carcass Coat)

The results of tests in the case of leaving the formulations of the carcass coat and bonding rubber layer constant and changing the thicknesses are shown in Table X.

TABLE IX

<Examples of Changing Bonding Rubber Compound>

| Bonding rubber layer | Stand. Ex. 6 | Ex. 72 | Ex. 73 | Ex. 74 | Ex. 75 | Ex. 76 | Comp. Ex. 42 | Ex. 77 |
|---|---|---|---|---|---|---|---|---|
| NR (phr) | — | 20 | 80 | 60 | 60 | 60 | 60 | 60 |
| NBR (phr) | — | 80 | 20 | 40 | 40 | 40 | 40 | 40 |
| Aromatic petroleum resin (phr) | — | 40 | 40 | 5 | 40 | 80 | 100 | 30 |
| Sulfur (phr) | — | 2 | 2 | 2 | 2 | 2 | 2 | |
| Vulcanization accelerator (CZ) (phr) | | 1 | 1 | 1 | 1 | 1 | 1 | |
| Vulcanization accelerator (TOT-N) (phr) | | 0.5 | 0.5 | 0.5 | 0.5 | 0.5 | 0.5 | |
| Cross-linking agent (TAIC) (phr) | — | | | | | | | 3 |
| Organic peroxide (phr) | — | | | | | | | 1.4 |
| Carcass coat | | | | | | | | |
| NR (phr) | 70 | | | | | | | |
| SBR (phr) | 30 | | | | | | | |
| HNBR (phr) | | 100 | 100 | 100 | 100 | 100 | 100 | 100 |
| Zinc methacrylate (phr) | 0 | 60 | 60 | 60 | 60 | 60 | 60 | 60 |
| Carbon (FEF grade) (phr) | 50 | 0 | 0 | 0 | 0 | 0 | 0 | 0 |
| Tire structure | | | | | | | | |
| Bonding rubber layer thickness (mm) | — | 0.5 | 0.5 | 0.5 | 0.5 | 0.5 | 0.5 | 0.5 |
| Air barrier layer | Yes | No | No | No | No | No | No | No |
| Carcass coat thickness (mm) | 1.2 | 1.0 | 1.0 | 1.0 | 1.0 | 1.0 | 1.0 | 1.0 |
| Air barrier layer thickness (mm) | 1.2 | — | — | — | — | — | — | — |
| Tire mass (g) | 7300 | 6970 | 6970 | 6970 | 6970 | 6970 | 6970 | 6970 |
| Test results | | | | | | | | |
| Rolling resistance (index) | 100 | 97 | 97 | 97 | 97 | 97 | 97 | 97 |
| Driving stability feeling (score) | 3 | 3.5 | 3.5 | 3.5 | 3.5 | 3.5 | 3.5 | 3.5 |
| Indoor durability test (index) | 100 | 112 | 114 | 102 | 122 | 100 | 95 | 143 |
| Air leakage test (%/month) | 2.8 | 2.2 | 2.3 | 2.2 | 2.3 | 2.3 | 2.4 | 2.3 |

TABLE X

<Examples of Changing Thickness of Carcass and Bonding Rubber Composition Layers>

| Carcass coat | Stand. Ex. 6 | Ex. 78 | Ex. 79 | Comp. Ex. 43 | Ex. 80 | Ex. 81 | Comp. Ex. 44 | Ex. 82 |
|---|---|---|---|---|---|---|---|---|
| NR (phr) | 70 | | | | | | | |
| SBR (phr) | 30 | | | | | | | |
| HNBR (phr) | | 100 | 100 | 100 | 100 | 100 | 100 | 100 |
| Zinc methacrylate (phr) | 0 | 60 | 60 | 60 | 60 | 60 | 60 | 60 |
| Carbon (FEF grade) (phr) | 58 | 0 | 0 | 0 | 0 | 0 | 0 | 0 |
| Bonding rubber layer | | | | | | | | |
| NR (phr) | — | 70 | 70 | 70 | | 70 | 70 | 70 |
| NBR (phr) | — | 30 | 30 | 30 | 30 | 30 | 30 | |
| IIR (HNBR side)* (phr) | — | | | | 100 | | | |
| Aromatic petroleum resin (phr) | — | 40 | 40 | 40 | | 40 | 40 | 40 |
| Sulfur (phr) | — | 2 | 2 | 2 | 2 | 2 | 2 | 2 |
| Vulcanization accelerator (CZ) (phr) | — | 1 | 1 | 1 | | 1 | 1 | 1 |
| Vulcanization accelerator (TOT-N) (phr) | — | 0.5 | 0.5 | 0.5 | | 0.5 | 0.5 | 0.5 |
| Ultrahigh molecular weight PE layer* (mm) | — | — | — | — | 0.1 mm | — | — | — |
| Tire structure | | | | | | | | |
| Bonding rubber layer thickness (mm) | — | 0.3 | 0.1 | 0.1 | 0.6 | 1.6 | 1.8 | 0.3 |
| Two-layer bonding treated* air barrier layer | Yes | No | No | No | No | No | No | Yes |
| Carcass coat thickness (mm) | 1.2 | 0.7 | 2.3 | 2.4 | 1.0 | 0.7 | 0.7 | 0.7 |
| T/d | 1.85 | 1.10 | 3.60 | 3.70 | 1.55 | 1.10 | 1.10 | 1.10 |
| Air barrier layer thickness (mm) | 1.2 | — | — | — | — | — | — | 0.3 |
| Tire mass (g) | 7300 | 6760 | 7290 | 7330 | 6990 | 7280 | 7360 | 6890 |
| Test results | | | | | | | | |
| Rolling resistance (index) | 100 | 100 | 98 | 98 | 100 | 100 | 101 | 96 |
| Driving stability feeling (score) | 3 | 3 | 4 | 4 | 3 | 3 | 3 | 3.5 |
| Indoor durability test (index) | 100 | 110 | 109 | 115 | 105 | 117 | 113 | 106 |
| Air leakage test (%/month) | 2.8 | 2.7 | 1.4 | 1.3 | 2.7 | 2.7 | 2.7 | 2.1 |

*Japanese Unexamined Patent Publication (Kokai) No. 5-185805

The tires of Examples 79 to 82 using the thicknesses of the carcass coats defined in the present invention exhibited good effects in all of the rolling resistance, driving stability feeling, indoor durability test, and air leakage test. As opposed to this, in Comparative Example 43 with a thickness of the carcass coat exceeding the upper limit, the air barrier property and the driving stability feeling were improved, but the weight ended up exceeding the standard example. Further, even in the case of Comparative Example 44 where the thickness of the bonding rubber layer was too great, the weight of the tire ended up exceeding the standard example. In Example 80 using a bonding rubber layer comprised of two layers of the method of a conventional example (Japanese Unexamined Patent Publication (Kokai) No. 5-185805), the tire was insufficient in terms of the durability etc., but the shaping was troublesome. According to Example 82, it was seen that it was also possible to provide an ordinary air barrier layer instead of making the carcass coat thicker.

As shown in the above examples, by using a predetermined hydrogenated NBR composition for the material constituting the carcass coat in the pneumatic tire according to the present invention or by bonding the carcass coat and adjoining rubber layer through a bonding rubber layer comprised of a predetermined rubber composition, it was seen that a pneumatic tire were superior in the rolling resistance, driving stability feeling, indoor durability, and air barrier property and lightening in weight could be obtained.

The following commercial products were used for the ingredients of the formulations of the following Standard Examples 7 to 8, Examples 83 to 111, and Comparative Examples 45 to 61. Note that blending agents not changed in amount are not listed in the tables of the examples.

1) Ingredients of Formulations of Side Reinforcing Layer and Side Ribbon Portion

| | |
|---|---|
| NR: RSS#3 | variate |
| HNBR: Zetpol 2020 (made by Nippon Zeon) | variate |
| Zinc methacrylate: R-20S (made by Asada Chemical Industry) | variate |
| Carbon black (FEF grade): HTC-100 (made by Shinnikka Carbon) | variate |
| (case of only side reinforcing layer) | |
| Titanium dioxide: A-100 (made by Ishihara Sangyo) | 10 parts by weight |
| (case of only white ribbon) | |
| Zinc oxide: Zinc White #3 (made by Seido Chemical Industry) | 5 parts by weight |
| Antioxidant: Nauguard 445 (made by Uniroyal) | 1.5 parts by weight |
| Organic peroxide: Parkadox 14/40 (made by Kayaku Akzo) | 5 parts by weight |

2) Ingredients of Formulations of Bonding Rubber Layer

| | |
|---|---|
| Diene-based rubber (NR): RSS#3 | variate |
| NBR: Nipol DN401 (made by Nippon Zeon) | variate |
| Carbon black: N339 (made by Showa Cabot) | variate |

-continued

| | |
|---|---|
| Aromatic petroleum resin: FR-120 (made by Fujikosan) | variate |
| Zinc oxide: Zinc White #3 (made by Seido Chemical Industry) | 5 parts by weight |
| Stearic acid: Beads Stearic Acid (made by Nippon Oil and Fat) | 1 part by weight |
| Antioxidant: Nocrac 224 (made by Ouchi Shinko Chemical) | 1 part by weight |
| Sulfur: Sanfer (made by Sanshin Chemical) (case of sulfur vulcanization based formulation) | 2 parts by weight |
| Vulcanization accelerator: Nocceler CZ-G (made by Ouchi Shinko Chemical) (case of sulfur vulcanization based formulation) | 1 part by weight |
| Vulcanization accelerator: Nocceler TOT-N (made by Ouchi Shinko Chemical) (case of sulfur vulcanization based formulation) | 0.5 part by weight |
| Organic peroxide (40% diluted): Parkadox 14/40 (made by Kayaku Akzo) (case of organic peroxide cross-linking based formulation) | 3.5 parts by weight |
| Co-cross-linking agent: TAIC (made by Nippon Kasei Chemical) (case of organic peroxide cross-linking based formulation) | 3 parts by weight |

Further, the formulations of the standard examples of the side reinforcing layer and white side were as follows:

| Ingredients of Formulation of Standard Example of Side Reinforcing Layer (Table XI to Table XIII) | |
|---|---|
| NR: RSS#3 | 60 parts by weight |
| BR: Nipol BR-1220 (made by Nippon Zeon) | 40 parts by weight |
| Carbon black (FEF grade): HTC-100 (made by Shinnikka Carbon) | 50 parts by weight |
| Zinc oxide: Zinc White #3 (made by Seido Chemical Industry) | 5 parts by weight |
| Stearic acid: Beads Stearic Acid (made by Nippon Oil and Fat) | 1 part by weight |
| Aromatic oil: Komorex 300 (made by Nippon Oil) | 8 parts by weight |
| Antioxidant: Nocrac 6C (made by Ouchi Shinko Chemical) | 1.0 part by weight |
| Antioxidant: Nocrac 224 (made by Ouchi Shinko Chemical) | 0.5 part by weight |
| Wax: Sunnoc (made by Ouchi Shinko Chemical) | 1.0 part by weight |
| Sulfur: Sanfer (made by Sanshin Chemical) | 2.0 parts by weight |
| Vulcanization accelerator: Nocceler NS-F (made by Ouchi Shinko Chemical) | 1.0 part by weight |
| Ingredients of Formulation of Standard Example of White Ribbon Portion (Table XIV to Table XV) | |
| NR: RSS#3 | 50 parts by weight |
| Cl-IIR: Exxon Chlorobutyl 106 (made by Japan Butyl) | 25 parts by weight |
| EPDM: Esprene 505A (made by Sumitomo Chemical) | 25 parts by weight |
| Titanium dioxide: A-100 (made by Ishihara Sangyo) | 20 parts by weight |
| Clay: Suprex Clay (made by Huber) | 50 parts by weight |
| Zinc oxide: Zinc White #3 (made by Seido Chemical Industry) | 6 parts by weight |
| Stearic acid: Beads Stearic Acid (made by Nippon Oil and Fat) | 1 part by weight |
| Antioxidant: Nauguard 445 (made by Uniroyal) | 1.5 parts by weight |
| Petroleum resin: Hiletz G-100X (made by Mitsui Petrochemical) | 2 parts by weight |
| Sulfur: Sanfer (made by Sanshin Chemical) | 1 part by weight |
| Vulcanization accelerator: Nocceler NS-F (made by Ouchi Shinko Chemical) | 1 part by weight |

Fabrication of Test Tires

An inner layer and carcass were successively wrapped on a shaping drum, beads were given, the carcass was turned up, the bonding rubber layer of the composition and thickness shown in each of the examples was adhered, then the side reinforcing layer and side ribbon portion were adhered. A steel belt layer comprised of two layers and a cap tread were superposed to shape a green tire. In the case of a side reinforcing layer, tires of a size of 185/65R14 were fabricated by arranging and bonding members to give the predetermined positional relationships of FIGS. 3(a) to 3(g). Further, in the case of a side ribbon, tires of 185/65R14 obtained by arranging and bonding members at the predetermined positions of the examples were fabricated. These were used for predetermined tests.

The methods of tests and evaluation in the Examples of the side reinforcing layers (Tables XI to XIII) and side ribbon portions (Tables XIV to XV) were as follows:

1) Cut Resistance Test Method

Tires were run under the following conditions to find the average value of the critical speed at which tires do not burst. When the average value of the critical speed was less than that of a conventional tire (Comparative Example 1), the tire was rated "no good" (Poor), while when it was the same as or higher than that of a conventional tire, it was rated "OK" (Good). Further, when the average value of the critical speed was more than 2 km/h higher than that of the conventional tire, it was rated "very good" (V.Good).

Running conditions; Test tires were mounted on a 1.6 liter engine displacement front engine front wheel drive compact passenger car with a rim size of 14×5 1/2JJ and an internal pressure of 200 kPa and were driven over a steel rail of a height of 100 mm as shown below at an angle of 30°. The speed at this time was changed from 10 km/h in steps of 1.0 km/h. The critical speed at which the tires would not burst was investigated by n=3 and the cut resistance was evaluated from that average value.

2) Durability Test Method

Tires were run under the following conditions and ranked as "no good" (poor) when trouble occurred and "OK" (good) when it did not.

Running conditions: A drum tester having a smooth drum surface, made of steel, and having an inside diameter of 1707 mm was used, the ambient temperature was controlled to 38±3° C., and the tires were run under conditions of a rim size of 14×5 1/2JJ, an internal pressure of 240 kPa, and a speed of 81 km/h. The initial load was made 4.57 kN, then the load was increased to a load of 7.28 kN in 0.68 kN increments every 2 hours. After this, the load was increased to a load of 14.0 kN in 0.68 kN increments every 4 hours. The test was ended when running at a load of 14.0 kN for 4 hours.

3) Rolling Resistance Test Method

Tires were run under the following conditions to measure the rolling resistance at that time. The results were expressed indexed to the measured value for a conventional tire (Comparative Example 1) as 100. (The smaller the value, the better.)

Running conditions: A drum tester having a smooth drum surface, made of steel, and having an inside diameter of 1707 mm was used, the ambient temperature was controlled to 23±2° C., and the tires were run under conditions of a rim size of 14×5 1/2JJ, an internal pressure of 200 kPa, and a speed of 80 km/h.

4) Ozone Crack Test Method

Stretch test pieces were exposed in an atmosphere containing a low concentration of artificially generated ozone to promote deterioration and examine the ozone resistance. The test pieces were evaluated by a combination of alphabet letters and numerals by evaluating the number of cracks by A (small number), B (large number), and C (innumerable) and evaluating the sizes and depths of the cracks by 1 (cracks not visible to the naked eye, but observable under a 10× magnifying glass), 2 (cracks visible to the naked eye), 3 (cracks deep and relatively large but less than 1 mm), 4 (cracks deep and large 1 to 3 mm), and 5 (cracks over 3 mm or likely to cause breaks). In these examples, the conventional tire (standard example) was evaluated as "good", good tires as "very good", and poor tires as "poor".

Test conditions: Test pieces (strip of length 60 mm, width 10 mm, and thickness 2 mm) were stretched 20±2%, exposed in an atmosphere of an ozone concentration of 50±5 pphm, and taken out after 72 hours.

5) Deterioration Test Method

Test tires mounted on rims of 14×5 1/2JJ and filled with air to an air pressure of 200 kPa were exposed in an atmosphere of an ozone concentration of 100 pphm for 24 hours, then the discoloration of the ribbon portions were evaluated visually. The degree of discoloration of a conventional tire was evaluated as "good", tires with greater discoloration than the conventional tire (standard tire) as "poor", and tires with less discoloration as "very good".

Standard Example 7, Examples 83 to 88, and Comparative Examples 45 to 51

(Side Reinforcing Layer)

The results of tests on the cut resistance, durability, and rolling resistance of test tires in the case of changing the ratio of ingredients in the formulations of the side reinforcing layer and leaving the composition of the bonding rubber layer and the tire configuration constant are shown in the following Table XI.

TABLE XI (Tire Size: 185/65R14)

| Side reinforcing layer formulation | Stand. Ex. 7 | Comp. Ex. 45 | Comp. Ex. 46 | Ex. 83 | Ex. 84 | Comp. Ex. 47 | Ex. 85 | Comp. Ex. 48 |
|---|---|---|---|---|---|---|---|---|
| NR (phr) | — | — | 70 | 60 | — | 30 | 30 | 30 |
| HNBR (phr) | — | — | 30 | 40 | 100 | 70 | 70 | 70 |
| Zinc methacrylate (phr) | — | — | 0 | 0 | 0 | 0 | 0 | 0 |
| Carbon (FEF grade) (phr) | — | — | 30 | 30 | 30 | 5 | 10 | 35 |
| Bonding rubber layer formulation | | | | | | | | |
| NR (phr) | — | — | 60 | 60 | 60 | 60 | 60 | 60 |
| NBR (phr) | — | — | 40 | 40 | 40 | 40 | 40 | 40 |
| Aromatic petroleum resin (phr) | — | — | 40 | 40 | 40 | 40 | 40 | 40 |
| Sulfur (phr) | — | — | 2 | 2 | 2 | 2 | 2 | 2 |
| Vulcanization accelerator (CZ) (phr) | — | — | 1 | 1 | 1 | 1 | 1 | 1 |
| Vulcanization accelerator (TOT-N) (phr) | — | — | 0.5 | 0.5 | 0.5 | 0.5 | 0.5 | 0.5 |
| Cross-linking agent (TAIC) (phr) | — | — | | | | | | |
| Organic peroxide (phr) | — | — | | | | | | |
| Tire structure | | | | | | | | |
| Side reinforcing layer | No | No | FIG. 3(a) | FIG. 3(a) | FIG. 3(a) | FIG. 3(a) | FIG. 3(a) | FIG. 3(a) |
| Side reinforcing layer thickness (mm) | 0 | 0 | 1 | 1 | 1 | 1 | 1 | 1 |
| Bonding rubber layer thickness (mm) | — | — | 0.5 | 0.5 | 0.5 | 0.5 | 0.5 | 0.5 |
| Side wall thickness (mm) | 3 | 2.5 | 1 | 1 | 1 | 1 | 1 | 1 |
| Side wall total thickness (mm) | 3 | 2.5 | 2.5 | 2.5 | 2.5 | 2.5 | 2.5 | 2.5 |
| Tire mass (g) | 7300 | 7150 | 7160 | 7160 | 7160 | 7160 | 7160 | 7160 |
| Test results | | | | | | | | |
| Cut resistance | Good | Poor | Poor | Good | Good | Poor | Good | Good |
| Durability | Good | Good | Good | Good | Good | Good | Good | Good |
| Rolling resistance (index) | 100 | 98 | 100 | 100 | 99 | 97 | 97 | 100 |

| Side reinforcing layer formulation | Comp. Ex. 49 | Ex. 86 | Ex. 87 | Comp. Ex. 50 | Ex. 88 | Comp. Ex. 51 |
|---|---|---|---|---|---|---|
| NR (phr) | 30 | 30 | 30 | 30 | 30 | 30 |
| HNBR (phr) | 70 | 70 | 70 | 70 | 70 | 70 |
| Zinc methacrylate (phr) | 5 | 10 | 120 | 130 | 60 | 100 |
| Carbon (FEF grade) (phr) | 0 | 0 | 0 | 0 | 10 | 30 |
| Bonding rubber layer formulation | | | | | | |
| NR (phr) | 60 | 60 | 60 | 60 | 60 | 60 |
| NBR (phr) | 40 | 40 | 40 | 40 | 40 | 40 |
| Aromatic petroleum resin (phr) | 40 | 40 | 40 | 40 | 40 | 40 |
| Sulfur (phr) | 2 | 2 | 2 | 2 | 2 | 2 |
| Vulcanization accelerator (CZ) (phr) | 1 | 1 | 1 | 1 | 1 | 1 |
| Vulcanization accelerator (TOTN) (phr) | 0.5 | 0.5 | 0.5 | 0.5 | 0.5 | 0.5 |
| Crosslinking agent (TAIC) (phr) | | | | | | |
| Organic peroxide (phr) | | | | | | |

TABLE XI-continued (Tire Size: 185/65R14)

| Tire structure | | | | | | |
|---|---|---|---|---|---|---|
| Side reinforcing layer | FIG. 3(a) | FIG. 3(a) | FIG. 3(a) | FIG. 3(a) | FIG. 3(a) | FIG. 3(a) |
| Side reinforcing layer thickness (mm) | 1 | 1 | 1 | 1 | 1 | 1 |
| Bonding rubber layer thickness (mm) | 0.5 | 0.5 | 0.5 | 0.5 | 0.5 | 0.2 |
| Side wall thickness (mm) | 1 | 1 | 1 | 1 | 1 | 1 |
| Side wall total thickness (mm) | 2.5 | 2.5 | 2.5 | 2.5 | 2.5 | 2.5 |
| Tire mass (g) | 7160 | 7160 | 7160 | 7160 | 7160 | 7160 |
| Test results | | | | | | |
| Cut resistance | Poor | Good | Good | Good | Good | Good |
| Durability | Good | Good | Good | Poor | Good | Poor |
| Rolling resistance (index) | 96 | 96 | 97 | 97 | 98 | 100 |

From the results of Table XI, it is seen that the tires of examples using side reinforcing layers having the compositions in accordance with the present invention all exhibited superior cut resistance, durability, and rolling resistance compared with tires of Comparative Examples 52, 53, and 54.

Examples 89 to 93 and Comparative Examples 52 to 54

(Side Reinforcing Layer)

The results of tests on the cut resistance, durability, and rolling resistance of test tires in the case of changing the ratio of ingredients in the formulations of the bonding rubber layer and leaving the composition of the side reinforcing layer and the tire configuration constant are shown in the following Table XII.

Examples 94 to 102 and Comparative Example 55

(Side Reinforcing Layer)

The results of tests on the cut resistance, durability and rolling resistance of test tires in the case of leaving the compositions of the side reinforcing layer and bonding rubber layer constant and changing the arrangement of the side reinforcing layer in the tire configuration and the thicknesses of the side reinforcing layer and bonding rubber layer are shown in the following Table XIII.

TABLE XII (Tire Size: 185/65R14)

| Side reinforcing layer formulation | Comp. Ex. 52 | Ex. 89 | Ex. 90 | Comp. Ex. 53 | Ex. 91 | Ex. 92 | Comp. Ex. 54 | Ex. 93 |
|---|---|---|---|---|---|---|---|---|
| NR (phr) | 30 | 30 | 30 | 30 | 30 | 30 | 30 | 30 |
| HNBR (phr) | 70 | 70 | 70 | 70 | 70 | 70 | 70 | 70 |
| Zinc methacrylate (phr) | 60 | 60 | 60 | 60 | 60 | 60 | 60 | 60 |
| Carbon (FEF grade) (phr) | 10 | 10 | 10 | 10 | 10 | 10 | 10 | 10 |
| Bonding rubber layer formulation *1 | | | | | | | | |
| NR (phr) | — | 10 | 90 | 60 | 60 | 60 | 60 | 60 |
| NBR (phr) | — | 90 | 10 | 40 | 40 | 40 | 40 | 40 |
| Aromatic petroleum resin (phr) | — | 40 | 40 | 3 | 5 | 80 | 85 | 40 |
| Sulfur (phr) | — | 2 | 2 | 2 | 2 | 2 | 2 | |
| Vulcanization accelerator (CZ) (phr) | — | 1 | 1 | 1 | 1 | 1 | 1 | |
| Vulcanization accelerator (TOT-N) (phr) | — | 0.5 | 0.5 | 0.5 | 0.5 | 0.5 | 0.5 | |
| Cross-linking agent (TAIC) (phr) | — | | | | | | | 3 |
| Organic peroxide (phr) | — | | | | | | | 1.4 |
| Tire structure | | | | | | | | |
| Side reinforcing layer | FIG. 3(a) | FIG. 3(a) | FIG. 3(a) | FIG. 3(a) | FIG. 3(a) | FIG. 3(a) | FIG. 3(a) | FIG. 3(a) |
| Side reinforcing layer thickness (mm) | 1 | 1 | 1 | 1 | 1 | 1 | 1 | 1 |
| Bonding rubber layer thickness (mm) | 0.5 | 0.5 | 0.5 | 0.5 | 0.5 | 0.5 | 0.5 | 0.5 |
| Side wall thickness (mm) | 1 | 1 | 1 | 1 | 1 | 1 | 1 | 1 |
| Side wall total thickness (mm) | 2.5 | 2.5 | 2.5 | 2.5 | 2.5 | 2.5 | 2.5 | 2.5 |
| Tire mass (g) | 7160 | 7160 | 7160 | 7160 | 7160 | 7160 | 7160 | 7160 |
| Test results | | | | | | | | |
| Cut resistance | Good | Good | Good | Good | Good | Good | Good | Good |
| Durability | Poor | Good | Good | Poor | Good | Good | Poor | Good |
| Rolling resistance (index) | 98 | 98 | 98 | 98 | 98 | 98 | 98 | 98 |

*1: Example of bonding layer made a two-layer structure of IIR of a thickness of 0.4 mm and UHMwPE (ultrahigh molecular weight polyethylene) of a thickness of 0.1 mm.

From the results of Table XII, it is seen that the tires of examples using bonding rubber layers having the compositions in accordance with the present invention all exhibited

TABLE XIII (Tire Size: 185/65R14)

| Side reinforcing layer formulation | Ex. 94 | Ex. 95 | Ex. 96 | Ex. 97 | Comp. Ex. 55 |
|---|---|---|---|---|---|
| NR (phr) | 30 | 30 | 30 | 30 | 30 |
| HNBR (phr) | 70 | 70 | 70 | 70 | 70 |
| Zinc methacrylate (phr) | 60 | 60 | 60 | 60 | 60 |
| Carbon (FEF grade) (phr) | 10 | 10 | 10 | 10 | 10 |
| Bonding rubber layer formulation *1 | | | | | |
| NR (phr) | 60 | 60 | 60 | 60 | 60 |
| NBR (phr) | 40 | 40 | 40 | 40 | 40 |
| Aromatic petroleum resin (phr) | 40 | 40 | 40 | 40 | 40 |
| Sulfur (phr) | 2 | 2 | 2 | 2 | 2 |
| Vulcanization accelerator (CZ) (phr) | 1 | 1 | 1 | 1 | 1 |
| Vulcanization accelerator (TOT-N) (phr) | 0.5 | 0.5 | 0.5 | 0.5 | 0.5 |
| Cross-linking agent (TAIC) (phr) | | | | | |
| Organic peroxide (phr) | | | | | |
| Tire structure | | | | | |
| Side reinforcing layer | FIG. 3(a) | FIG. 3(a) | FIG. 3(b) | FIG. 3(b) | FIG. 3(b) |
| Side reinforcing layer thickness (mm) | 1 | 1 | 1 | 1 | 0.5 |
| Bonding rubber layer thickness (mm) | 0.1 | 0.2 | 1.5 | 2 | 2.5 |
| Side wall thickness (mm) | 1 | 1 | 0 | 0 | 0 |
| Side wall total thickness (mm) | 2.1 | 2.2 | 2.5 | 3 | 3 |
| Tire mass (g) | 7020 | 7050 | 7160 | 7300 | 7300 |
| Test results | | | | | |
| Cut resistance | Good | Good | Good | V. Good | V. Good |
| Durability | Good | Good | Good | Good | Good |
| Rolling resistance (index) | 95 | 96 | 99 | 100 | 102 |

| Side reinforcing layer formulation | Ex. 98 | Ex. 99 | Ex. 100 | Ex. 101 | Ex. 102 |
|---|---|---|---|---|---|
| NR (phr) | 30 | 30 | 30 | 30 | 30 |
| HNBR (phr) | 70 | 70 | 70 | 70 | 70 |
| Zinc methacrylate (phr) | 60 | 60 | 60 | 60 | 60 |
| Carbon (FEF grade) (phr) | 10 | 10 | 10 | 10 | 10 |
| Bonding rubber layer formulation | | | | | |
| NR (phr) | 60 | 60 | 60 | 60 | 60 |
| NBR (phr) | 40 | 40 | 40 | 40 | 40 |
| Aromatic petroleum resin (phr) | 40 | 40 | 40 | 40 | 40 |
| Sulfur (phr) | 2 | 2 | 2 | 2 | 2 |
| Vulcanization accelerator (CZ) (phr) | 1 | 1 | 1 | 1 | 1 |
| Vulcanization accelerator (TOT-N) (phr) | 0.5 | 0.5 | 0.5 | 0.5 | 0.5 |
| Cross-linking agent (TAIC) (phr) | | | | | |
| Organic peroxide (phr) | | | | | |
| Tire structure | | | | | |
| Side reinforcing layer | FIG. 3(c) | FIG. 3(d) | FIG. 3(e) | FIG. 3(f) | FIG. 3(g) |
| Side reinforcing layer range (SH ratio) | 20–80 | 30–70 | 40–80 | 20–60 | 20–45 55–80 |
| Side reinforcing layer thickness (mm) | 1 | 1 | 1 | 1 | 1 |
| Bonding rubber layer thickness (mm) | 0.5 × 2 | 0.5 | 0.5 | 0.5 | 0.5 |
| Side wall thickness | | | | | |
| (Reinforced part) (mm) | 1 | 1.5 | 1.5 | 1.5 | 1.5 |
| (Nonreinforced part) (mm) | 3 | 3 | 3 | 3 | 3 |
| Side wall total thickness (mm) | 3 | 3 | 3 | 3 | 3 |
| Tire mass (g) | 7300 | 7300 | 7300 | 7300 | 7300 |
| Test results | | | | | |
| Cut resistance | Good | Good | Good | Good | Good |
| Durability | Good | Good | Good | Good | Good |
| Rolling resistance (index) | 98 | 99 | 99 | 99 | 99 |

From the results of Table XIII, it is seen that the tires of examples configured with the arrangements of side reinforcing layers and thicknesses of side reinforcing layers and bonding rubber layers in accordance with the present invention all exhibited superior cut resistance, durability, and rolling resistance.

Standard Example 8, Examples 103 to 106, and Comparative Examples 56 to 58

(Side Ribbon)

The results of tests on the ozone crack resistance, deterioration resistance, cut resistance, and durability of test tires in the case of changing the ratio of ingredients in the formulations of the side ribbon portion and leaving the composition of the bonding rubber layer and the tire configuration constant are shown in the following Table XIV.

side ribbon portions in accordance with the present invention all exhibited superior ozone crack resistance, deterioration resistance, cut resistance, and durability.

Standard Example 8, Examples 107 to 111, and Comparative Examples 60 to 61

(Side Ribbon)

The results of tests on the ozone crack resistance, deterioration resistance, cut resistance, and durability of test tires in the case of leaving the compositions of the side ribbon portions and the bonding rubber layers constant and changing the thicknesses of the side ribbon portions and bonding

TABLE XIV (Tire Size: 185/65R14)

| Side ribbon part formulation | Stand. Ex. 8 | Comp. Ex. 56 | Comp. Ex. 57 | Ex. 103 | Ex. 104 | Ex. 105 | Ex. 106 | Comp. Ex. 58 |
|---|---|---|---|---|---|---|---|---|
| C1-IIR (phr) | 25 | | | | | | | |
| EPDM (phr) | 25 | | | | | | | |
| NR (phr) | 50 | 0 | 80 | 70 | 0 | 0 | 0 | 0 |
| HNBR (phr) | | 100 | 20 | 30 | 100 | 100 | 100 | 100 |
| Rubber total (phr) | 100 | 100 | 100 | 100 | 100 | 100 | 100 | 100 |
| Zinc methacrylate (phr) | | 40 | 40 | 40 | 40 | 0 | 90 | 100 |
| Bonding rubber layer formulation *1 | | | | | | | | |
| NR (phr) | — | | 60 | 60 | 60 | 60 | 60 | 60 |
| NBR (phr) | — | | 40 | 40 | 40 | 40 | 40 | 40 |
| Aromatic petroleum resin (phr) | — | | 40 | 40 | 40 | 40 | 40 | 40 |
| Sulfur (phr) | — | | 2 | 2 | 2 | 2 | 2 | 2 |
| Vulcanization accelerator (CZ) (phr) | — | | 1 | 1 | 1 | 1 | 1 | 1 |
| Vulcanization accelerator (TOT-N) (phr) | — | | 0.5 | 0.5 | 0.5 | 0.5 | 0.5 | 0.5 |
| Cross-linking agent (TAIC) (phr) | — | | | | | | | |
| Organic peroxide (phr) | | | | | | | | |
| Tire structure | | | | | | | | |
| Need for special mold | Yes | No | No | No | No | No | No | No |
| Ribbon part thickness (mm) | 3.5 | 1.0 | 1.0 | 1.0 | 1.0 | 1.0 | 1.0 | 1.0 |
| Existence of protective layer | Yes | No | No | No | No | No | No | No |
| Bonding rubber layer thickness (mm) | — | 0.2 | 0.2 | 0.2 | 0.2 | 0.2 | 0.2 | 0.2 |
| Total thickness (mm) | 4 | 1.2 | 1.2 | 1.2 | 1.2 | 1.2 | 1.2 | 1.2 |
| Tire mass (g) | 7470 | 7300 | 7300 | 7300 | 7300 | 7300 | 7300 | 7300 |
| Test results | | | | | | | | |
| Ozone crack | Good | V. Good | Poor | Good | V. Good | V. Good | V. Good | V. Good |
| Deterioration resistance | Good | V. Good | V. Good | .V. Good | V. Good | V. Good | V. Good | V. Good |
| Cut resistance | Good | V. Good | Poor | Good | V. Good | Good | V. Good | V. Good |
| Durability | Good | Poor | Good | Good | Good | Good | Good | Poor |

*1: Bonding layer is two-layer structure of isobutylene-isoprene copolymer (IIR) rubber layer and ultrahigh molecular weight UHMwPE) sheet.

From the results of Table XIV, it is learned that the tires of examples using side ribbons having the compositions of rubber layers in the tire configuration are shown in the following Table XV.

TABLE XV (Tire Size: 185/65R14)

| Side ribbon part formulation | Stand. Ex. 8 | Comp. Ex. 59 | Comp. Ex. 60 | Ex. 107 | Comp. Ex. 61 | Ex. 108 | Ex. 109 | Ex. 110 | Ex. 111 |
|---|---|---|---|---|---|---|---|---|---|
| C1-IIR (phr) | 25 | | | | | | | | |
| EPDM (phr) | 25 | | | | | | | | |
| NR (phr) | 50 | 0 | 0 | 0 | 0 | 0 | 0 | 0 | 0 |
| HNBR (phr) | | 100 | 100 | 100 | 100 | 100 | 100 | 100 | 100 |

TABLE XV-continued (Tire Size: 185/65R14)

| Side ribbon part formulation | Stand. Ex. 8 | Comp. Ex. 59 | Comp. Ex. 60 | Ex. 107 | Comp. Ex. 61 | Ex. 108 | Ex. 109 | Ex. 110 | Ex. 111 |
|---|---|---|---|---|---|---|---|---|---|
| Rubber total (phr) | 100 | 100 | 100 | 100 | 100 | 100 | 100 | 100 | 100 |
| Zinc methacrylate (phr) | — | 40 | 40 | 40 | 40 | 40 | 40 | 40 | 40 |
| Bonding rubber layer formulation *1 | | | | | | | | | |
| NR (phr) | — | — | 60 | 60 | 60 | 60 | 60 | 60 | 60 |
| NBR (phr) | — | — | 40 | 40 | 40 | 40 | 40 | 40 | 40 |
| Aromatic petroleum resin (phr) | — | — | 40 | 40 | 40 | 40 | 40 | 40 | 40 |
| Sulfur (phr) | — | — | 2 | 2 | 2 | 2 | 2 | 2 | 0 |
| Vulcanization accelerator (CZ) (phr) | — | — | 1 | 1 | 3 | 3 | 3 | 3 | |
| Vulcanization accelerator (TOT-N) (phr) | — | — | 0.5 | 0.5 | 4 | 4 | 4 | 4 | |
| Cross-linking agent (TAIC) (phr) | — | | | | | | | | 3 |
| Organic peroxide (phr) | — | | | | | | | | 1.4 |
| Tire structure | | | | | | | | | |
| Need for special mold | Yes | No | No | No | No | No | No | No | No |
| Ribbon part thickness (mm) | 3.5 | 1.0 | 0.2 | 0.5 | 1.0 | 1.0 | 1.0 | 1.0 | 1.0 |
| Exist. of protective layer | Yes | No | No | No | No | No | No | No | No |
| Bonding rubber layer thickness (mm) | — | 0.2 | 0.2 | 0.2 | 0 | 0.1 | 0.2 | 1 | 0.2 |
| Total thickness (mm) | 4 | 1.2 | 0.4 | 0.7 | 1.0 | 1.1 | 1.2 | 2.0 | 1.2 |
| Tire mass (g) | 7470 | 7300 | 7300 | 7300 | 7300 | 7300 | 7300 | 7300 | 7300 |
| Test results | | | | | | | | | |
| Ozone crack | Good | V. Good | V. Good | V. Good | V. Good | V. Good | V. Good | V. Good | V. Good |
| Deterioration resistance | Good | Good | Poor | Good | Good | Good | Good | Good | Good |
| Cut resistance | Good | V. Good | V. Good | V. Good | V. Good | V. Good | V. Good | V. Good | V. Good |
| Durability | Good | Poor | Good | Good | Poor | Good | Good | Good | V. Good |

From the results of Table XV, it is seen that the tires of examples configured with the thicknesses of side ribbon portions and bonding rubber layers in accordance with the present invention all exhibited superior ozone crack resistance, deterioration resistance, cut resistance, and durability.

In the following Standard Example 9, Examples 112 to 128, and Comparative Examples 62 to 75, test tires of the tire size: 185/65R14 were fabricated using the ingredients of the formulations shown in the tables and giving the tire configurations listed in the tables and the results of tests on these were shown.

The following commercial products were used for the ingredients for the formulations used in the examples. Note that the blending agents not changed in amount are not listed in the tables of the examples.

1) Ingredients of Formulations of Air Barrier Layers

| | |
|---|---|
| NR: RSS#3 | variate |
| HNBR: Zetpol 2020 (made by Nippon Zeon) | variate |
| Zinc methacrylate: R-20S (made by Asada Chemical Industry) | variate |
| Carbon black (FEF grade): HTC-100 (made by Shinnikka Carbon) | variate |
| Zinc oxide: Zinc White #3 (made by Seido Chemical Industry) | 5 parts by weight |
| Antioxidant: Nauguard 445 (made by Uniroyal) | 1.5 parts by weight |
| Organic peroxide: Parkadox 14/40 (made by Kayaku Akzo) | 5 parts by weight |

2) Ingredients of Formulations of Bonding Rubber Layers

| | |
|---|---|
| Diene-based rubber (NR): RSS#3 | variate |
| NBR: Nipol DN401 (made by Nippon Zeon) | variate |
| Carbon black: N339 (made by Showa Cabot) | variate |
| Aromatic petroleum resin: FR-120 (made by Fujikosan) | variate |
| Zinc oxide: Zinc White #3 (made by Seido Chemical Industry) | 5 parts by weight |
| Stearic acid: Beads Stearic Acid (made by Nippon Oil and Fat) | 1 part by weight |
| Antioxidant: Nocrac 224 (made by Ouchi Shinko Chemical) | 1 part by weight |
| Sulfur: Insoluble sulfur (sulfur vulcanization based) | 2 parts by weight |
| Vulcanization accelerator: Nocceler CZ-G (made by Ouchi Shinko Chemical) (sulfur vulcanization based) | 1 part by weight |
| Vulcanization accelerator: Nocceler TOT-N (made by Ouchi Shinko Chemical) (sulfur vulcanization based) | 0.5 part by weight |
| Organic peroxide (40% diluted): Parkadox 14/40 (made by Kayaku Akzo) (organic peroxide cross-linking based) | 3.5 parts by weight |
| Co-cross-linking agent (TAIC): TAIC (made by Nippon Kasei Chemical) (organic peroxide cross-linking based) | 3 parts by weight |

Further, the following commercial products were used for the ingredients of the formulation in the standard example in Tables XVI to XVIII. Note that the formulations of the standard example include ingredients not listed in the tables.

| Ingredients of Formulation in Air Barrier Layer in Standard Example | |
|---|---|
| Br-IIR: Exxon Bromobutyl 2244 (made by Japan Butyl) | 80 parts by weight |
| NR: RSS#3 | 30 parts by weight |
| Carbon black (FEF grade): HTC-100 (made by Shinnikka Carbon) | 60 parts by weight |
| Zinc oxide: Zinc White #3 (made by Seido Chemical Industry) | 5 parts by weight |
| Stearic acid: Beads Stearic Acid (made by Nippon Oil and Fat) | 0.5 part by weight |
| Antioxidant: Nauguard 445 (made by Uniroyal) | 1.5 parts by weight |
| Petroleum resin: Hiletz G-100X (made by Mitsui Petrochemical) | 5 parts by weight |
| Sulfur: Insoluble sulfur | 0.5 part by weight |
| Vulcanization accelerator: Nocceler DM (made by Ouchi Shinko Chemical) | 1 part by weight |

The methods of measurement and tests in the examples were as follows:

1) High Load Durability Test

Tires were run under the following conditions and ranked as "no good" (poor) when trouble occurred and "OK" (good) when it did not.

Running conditions: A drum tester having a smooth drum surface, made of steel, and having an inside diameter of 1707 mm was used, the ambient temperature was controlled to 38±3° C., and the tires were run under conditions of a rim size of 14×5.5-J, an internal pressure of 240 kPa, and a speed of 81 km/h. The initial load was made 4.6 kN, then the load was increased to a load of 7.3 kN in 0.7 kN increments every 2 hours. After this, the load was increased to a load of 14.0 kN in 0.7 kN increments every 4 hours. The test was ended when running at a load of 14.0 kN for 4 hours.

2) Riding Comfort and Driving Stability Test

Test tires mounted on 14×5.5-J rims at an internal pressure of 200 kPa were mounted on a 1.6 liter engine displacement front engine front wheel drive passenger car. The car was driven over a test course by five trained drivers to evaluate the feeling. The results were ranked by a five-point system based on the following judgement criteria in relative comparison with reference tires. The average of the three drivers, not including the highest score and lowest score, was shown. The larger the values, the better.

5: Excellent, 4: good, 3.5: somewhat good, 3: equal to reference, 2.5: somewhat poor (practical lower limit), 2: poor, 1: very poor 3) Air Leakage Test The tire was allowed to stand at an initial pressure of 200 kPa, room temperature of 20° C., and no load conditions for three months. The internal pressure was measured at intervals of four days. The $\alpha$ value was found by recurrence to the following equation where the measurement pressure was $P_t$, the initial pressure was $P_0$, and the number of days elapsed was t:

$$P_t/P_0 = exp(-\alpha t)$$

Using the $\alpha$ obtained and substituting 30 (days) for t, the following was obtained:

$$\beta = [1 - exp(-\alpha t)] \times 100$$

$\beta$ was made the pressure drop (%/month) per month.

4) Rolling Resistance Test

Tires were run under the following conditions to measure the rolling resistance at that time. The results were expressed indexed to the measured value for a tire of a standard example as 100. (The smaller the value, the better.)

Running conditions: A drum tester having a smooth drum surface, made of steel, and having an inside diameter of 1707 mm was used, the ambient temperature was controlled to 23±2° C., and the tires were run under conditions of a rim size of 14×5.5-J, a test internal pressure of 200 kPa, a load of 4.1 kN, and a speed of 80 km/h.

Standard Example 9, Examples 112 to 118, and Comparative Exam-ples 62 to 65

(Air Barrier Layer)

The results of tests in the case of changing the compound of the air barrier layer are shown in Table XVI.

TABLE XVI

<Examples of Changing Air Barrier Layer Compound>

| Air barrier layer formulation | Stand. Ex. 9 | Comp. Ex. 62 | Comp. Ex. 63 | Ex. 112 | Ex. 113 | Comp. Ex. 64 | Ex. 114 | Ex. 115 | Ex. 116 | Ex. 117 | Ex. 118 | Comp. Ex. 65 |
|---|---|---|---|---|---|---|---|---|---|---|---|---|
| IIR (phr) | 80 | | | | | | | | | | | |
| NR (phr) | 20 | | 40 | 30 | 0 | 30 | 30 | 30 | 30 | 30 | 30 | 30 |
| HNBR (phr) | | 100 | 60 | 70 | 100 | 70 | 70 | 70 | 70 | 70 | 70 | 70 |
| Rubber total (phr) | 100 | 100 | 100 | 100 | 100 | 100 | 100 | 100 | 100 | 100 | 100 | 100 |
| Zinc methacrylate (phr) | | 80 | 60 | 60 | 60 | 5 | 10 | 10 | 0 | 60 | 50 | 50 |
| Carbon (phr) | 60 | 0 | 0 | 0 | 0 | 0 | 0 | 5 | 30 | 0 | 40 | 45 |
| Zinc methacrylate + carbon total (phr) | 60 | 80 | 60 | 60 | 60 | 5 | 10 | 15 | 30 | 60 | 90 | 95 |
| Bonding rubber formulation *1 | | | | | | | | | | | | |
| NR (phr) | — | | 60 | 60 | 60 | 60 | 60 | 60 | 60 | 60 | 60 | 60 |
| NBR (phr) | — | | 40 | 40 | 40 | 40 | 40 | 40 | 40 | 40 | 40 | 40 |
| Aromatic petroleum resin (phr) | — | | 40 | 40 | 40 | 40 | 40 | 40 | 40 | 40 | 40 | 40 |
| Sulfur (phr) | — | | 2 | 2 | 2 | 2 | 2 | 2 | 2 | 2 | 2 | 2 |
| Vulcanization accelerator (CZ) (phr) | — | | 1 | 1 | 1 | 1 | 1 | 1 | 1 | 1 | 1 | 1 |
| Vulcanization accelerator (TOT-N) | — | | 0.5 | 0.5 | 0.5 | 0.5 | 0.5 | 0.5 | 0.5 | 0.5 | 0.5 | 0.5 |

TABLE XVI-continued

<Examples of Changing Air Barrier Layer Compound>

| Air barrier layer formulation | Stand. Ex. 9 | Comp. Ex. 62 | Comp. Ex. 63 | Ex. 112 | Ex. 113 | Comp. Ex. 64 | Ex. 114 | Ex. 115 | Ex. 116 | Ex. 117 | Ex. 118 | Comp. Ex. 65 |
|---|---|---|---|---|---|---|---|---|---|---|---|---|
| (phr) | | | | | | | | | | | | |
| Cross-linking agent (TAIC) (phr) | — | | 0 | 0 | 0 | 0 | 0 | 0 | 0 | 0 | 0 | 0 |
| Organic peroxide (phr) | — | | 0 | 0 | 0 | 0 | 0 | 0 | 0 | 0 | 0 | 0 |
| Tire structure | | | | | | | | | | | | |
| Air barrier layer thickness (mm) | 0.5 | 0.5 | 1.1 | 1.1 | 1.1 | 1.1 | 1.1 | 1.1 | 1.1 | 1.1 | 1.1 | 1.1 |
| Tie rubber thickness (mm) | 0.8 | | | | | | | | | | | |
| Bonding rubber thickness (mm) | | 0.4 | 0.2 | 0.2 | 0.2 | 0.2 | 0.2 | 0.2 | 0.2 | 0.2 | 0.2 | 0.2 |
| Total thickness (mm) | 1.3 | 0.9 | 1.3 | 1.3 | 1.3 | 1.3 | 1.3 | 1.3 | 1.3 | 1.3 | 1.3 | 1.3 |
| Tire mass (g) | 7300 | 7110 | 7300 | 7300 | 7300 | 7300 | 7300 | 7300 | 7300 | 7300 | 7300 | 7300 |
| Test results | | | | | | | | | | | | |
| Durability | Good | Poor | Good | Good | Good | Good | Good | Good | Good | Good | Good | Good |
| Riding comfort (score) | 3 | 3.5 | 3.5 | 3.5 | 3.5 | 3.5 | 3.5 | 3 | 3 | 3 | 3 | 2 |
| Driving stability (score) | 3 | 3 | 3 | 3.5 | 3.5 | 2.5 | 3 | 3 | 3.5 | 3.5 | 3.5 | 3.5 |
| Air leakage (index) | 100 | 99 | 102 | 100 | 96 | 100 | 100 | 100 | 100 | 100 | 99 | 99 |
| Rolling resistance (index) | 100 | 97 | 97 | 97 | 97 | 97 | 97 | 98 | 99 | 97 | 99 | 99 |

*1: Bonding layer is two-layer structure of isobutylene-isoprene copolymer (IIR) rubber layer and ultrahigh molecular weight (UHMwPE) sheet.

Despite the use of an air barrier layer with a thickness smaller than that of a general butyl liner tire (Standard Example 9), the tires of Examples 112 to 118 using the air barrier layer prescribed in the present invention were not inferior in terms of the air leakage and exhibited excellent results in terms of the durability, riding comfort and driving stability, and rolling resistance. As opposed to this, in the case of Comparative Example 62 using the conventional example (Japanese Unexamined Patent Publication (Kokai) No. 5-185805) comprised of two layers for the bonding rubber layer, the tire was inferior in terms of durability and further was difficult to shape. Further, in the case of Comparative Example 63 where the amount of formulation of HNBR was lower than the prescribed amount, the tire exhibited a large air leakage. It was seen that in Comparative Example 64 where the total of the zinc methacrylate and the carbon black was less than 10 parts by weight, the driving stability was poor, while in Comparative Example 65 where it exceeded 90 parts by weight, conversely the riding comfort was poor.

Standard Example 9, Examples 119 to 123, and Comparative Example 66 to 70

(Air Barrier Layer)

The results of tests in the case of leaving the formulation of the air barrier layer constant and changing the bonding rubber compound are shown in Table XVII.

TABLE XVII

<Examples of Changing Bonding Rubber Compound>

| Air barrier layer formulation | Stand Ex. 9 | Comp. Ex. 66 | Comp. Ex. 67 | Ex. 119 | Ex. 120 | Comp. Ex. 68 | Comp. Ex. 69 | Ex. 121 | Ex. 122 | Comp. Ex. 70 | Ex. 123 |
|---|---|---|---|---|---|---|---|---|---|---|---|
| IR (phr) | 80 | | | | | | | | | | |
| NR (phr) | 20 | | | | | | | | | | |
| HNBR (phr) | | 100 | 100 | 100 | 100 | 100 | 100 | 100 | 100 | 100 | 100 |
| Rubber total (phr) | 100 | 100 | 100 | 100 | 100 | 100 | 100 | 100 | 100 | 100 | 100 |
| Zinc methacrylate (phr) | 80 | 60 | 60 | 60 | 60 | 60 | 60 | 60 | 60 | 60 | 60 |
| Carbon (phr) | 60 | 0 | 0 | 0 | 0 | 0 | 0 | 0 | 0 | 0 | 0 |
| Zinc methacrylate + carbon total (phr) | 60 | 80 | 60 | 60 | 60 | 60 | 60 | 60 | 60 | 60 | 60 |
| Bonding rubber formulation *1 | | | | | | | | | | | |
| NR (phr) | — | | 0 | 10 | 90 | 100 | 60 | 60 | 60 | 60 | 60 |
| NBR (phr) | — | | 100 | 90 | 10 | 0 | 40 | 40 | 40 | 40 | 40 |
| Aromatic petroleum resin (phr) | — | | 40 | 40 | 40 | 40 | 0 | 5 | 80 | 90 | 90 |
| Sulfur (phr) | — | | 2 | 2 | 2 | 2 | 2 | 2 | 2 | 2 | 0 |
| Vulcanization accelerator (CZ) (phr) | — | | 1 | 1 | 1 | 1 | 1 | 1 | 1 | 1 | 0 |
| Vulcanization accelerator (TOT-N) (phr) | — | | 0.5 | 0.5 | 0.5 | 0.5 | 0.5 | 0.5 | 0.5 | 0.5 | 0 |
| Cross-linking agent (TAIC) (phr) | — | | 0 | 0 | 0 | 0 | 0 | 0 | 0 | 0 | 3 |
| Organic peroxide (phr) | — | | 0 | 0 | 0 | 0 | 0 | 0 | 0 | 0 | 1.4 |

TABLE XVII-continued

<Examples of Changing Bonding Rubber Compound>

| Air barrier layer formulation | Stand Ex. 9 | Comp. Ex. 66 | Comp. Ex. 67 | Ex. 119 | Ex. 120 | Comp. Ex. 68 | Comp. Ex. 69 | Ex. 121 | Ex. 122 | Comp. Ex. 70 | Ex. 123 |
|---|---|---|---|---|---|---|---|---|---|---|---|
| Tire structure | | | | | | | | | | | |
| Air barrier layer thickness (mm) | 0.5 | 0.5 | 0.6 | 0.6 | 0.6 | 0.6 | 0.6 | 0.6 | 0.6 | 0.6 | 0.6 |
| Tie rubber thickness (mm) | 0.8 | | | | | | | | | | |
| Bonding rubber thickness (mm) | | 0.4 | 0.2 | 0.2 | 0.2 | 0.2 | 0.2 | 0.2 | 0.2 | 0.2 | 0.2 |
| Total thickness (mm) | 1.3 | 0.9 | 0.8 | 0.8 | 0.8 | 0.8 | 0.8 | 0.8 | 0.8 | 0.8 | 0.8 |
| Tire mass (g) | 7300 | 7110 | 7060 | 7060 | 7060 | 7060 | 7060 | 7060 | 7060 | 7060 | 7060 |
| Test results | | | | | | | | | | | |
| Durability | Good | Poor | Poor | Good | Good | Poor | Poor | Good | Good | Poor | V. Good |
| Riding comfort (score) | 3 | 3.5 | 3.5 | 3.5 | 3.5 | 3.5 | 3.5 | 3.5 | 3.5 | 3 | 3.5 |
| Driving stability (score) | 3 | 3 | 3.5 | 3.5 | 3.5 | 3.5 | 3 | 3.5 | 3.5 | 3.5 | 3.5 |
| Air leakage (index) | 100 | 99 | 99 | 99 | 99 | 99 | 99 | 99 | 99 | 99 | 99 |
| Rolling resistance (index) | 100 | 97 | 97 | 97 | 97 | 97 | 97 | 97 | 100 | 101 | 97 |

The tires of Examples 119 to 123 using bonding rubber layers of the formulations defined in the present invention exhibited excellent results in terms of the durability, riding comfort and driving stability, air leakage, and rolling resistance. As opposed to this, in the case of Comparative Example 67 where the bonding rubber was only NBR and in the case of Comparative Example 68 where the bonding rubber was only a diene-based rubber (NR), the tires exhibited inferior bonding. Further, it was seen that, in the case of Comparative Example 69 not containing an aromatic petroleum resin, the predetermined bonding force was not satisfied, while in the case of Comparative Example 70 containing a larger amount than 80 parts by weight of the aromatic petroleum resin, the rolling resistance and durability became worse. According to Example 123 where the bonding rubber layer contains a co-cross-linking agent and is cross-linked by an organic peroxide, it was seen that the tire was more Superior in terms of durability.

Standard Example 9, Examples 124 to 128, and Comparative Examples 71 to 75

(Air Barrier Layer)

The results of tests in the case of leaving the formulations of the air barrier layer and bonding rubber layer constant and changing their thicknesses are shown in Table XVIII.

TABLE XVIII

<Examples of Changing Thickness of Air Barrier Layer and Bonding Rubber Layer>

| Air barrier layer formulation | Stand Ex. 9 | Comp. Ex. 71 | Comp. Ex. 72 | Ex. 124 | Ex. 125 | Comp. Ex. 73 | Comp. Ex. 74 | Ex. 126 | Ex. 127 | Ex. 128 | Comp. Ex. 75 |
|---|---|---|---|---|---|---|---|---|---|---|---|
| IR (phr) | 80 | | | | | | | | | | |
| NR (phr) | 20 | | | | | | | | | | |
| HNBR (phr) | | 100 | 100 | 100 | 100 | 100 | 100 | 100 | 100 | 100 | 100 |
| Rubber total (phr) | 100 | 100 | 100 | 100 | 100 | 100 | 100 | 100 | 100 | 100 | 100 |
| Zinc methacrylate (phr) | | 80 | 60 | 60 | 60 | 60 | 60 | 60 | 60 | 60 | 60 |
| Carbon (phr) | 60 | 0 | 0 | 0 | 0 | 0 | 0 | 0 | 0 | 0 | 0 |
| Zinc methacrylate + carbon total (phr) | 60 | 80 | 60 | 60 | 60 | 60 | 60 | 60 | 60 | 60 | 60 |
| Bonding rubber formulation *1 | | | | | | | | | | | |
| NR (phr) | — | | 60 | 60 | 60 | 60 | — | 60 | 60 | 60 | 60 |
| NBR (phr) | — | | 40 | 40 | 40 | 40 | — | 40 | 40 | 40 | 40 |
| Aromatic petroleum resin (phr) | — | | 40 | 40 | 40 | 40 | — | 40 | 40 | 40 | 40 |
| Sulfur (phr) | — | | 2 | 2 | 2 | 2 | — | 2 | 2 | 2 | 2 |
| Vulcanization accelerator (CZ) (phr) | — | | 1 | 1 | 1 | 1 | 1 | 1 | 1 | 1 | 1 |
| Vulcanization accelerator (TOT-N) (phr) | — | | 0.5 | 0.5 | 0.5 | 0.5 | 0.5 | 0.5 | 0.5 | 0.5 | 0.5 |
| Cross-linking agent (TAIC) (phr) | — | | 0 | 0 | 0 | 0 | 0 | 0 | 0 | 0 | 0 |
| Organic peroxide (phr) | — | | 0 | 0 | 0 | 0 | 0 | 0 | 0 | 0 | 0 |
| Tire structure | | | | | | | | | | | |
| Air barrier layer thickness (mm) | 0.5 | 0.5 | 0.1 | 0.2 | 1.2 | 1.5 | 0.2 | 0.2 | 0.2 | 0.2 | 0.2 |
| Tie rubber thickness (mm) | 0.8 | 0.4 | | | | | | | | | |
| Bonding rubber thickness (mm) | | | 0.2 | 0.2 | 0.1 | 0.1 | 0 | 0.1 | 0.2 | 1 | 1.2 |
| Total thickness (mm) | 1.3 | 0.9 | 0.3 | 0.4 | 1.3 | 1.6 | 0.2 | 0.3 | 0.4 | 1.2 | 1.4 |
| Tire mass (g) | 7300 | 7110 | 6810 | 6860 | 7300 | 7450 | 6770 | 6810 | 6860 | 7250 | 7350 |
| Test results | | | | | | | | | | | |
| Durability | Good | Poor | Good | Good | Good | Good | Poor | Good | Good | Good | Good |
| Riding comfort | 3 | 3.5 | 3.5 | 3.5 | 3 | 3 | 3.5 | 3.5 | 3.5 | 3.5 | 3.5 |

TABLE XVIII-continued

<Examples of Changing Thickness of Air Barrier Layer and Bonding Rubber Layer>

| Air barrier layer formulation | Stand Ex. 9 | Comp. Ex. 71 | Comp. Ex. 72 | Ex. 124 | Ex. 125 | Comp. Ex. 73 | Comp. Ex. 74 | Ex. 126 | Ex. 127 | Ex. 128 | Comp. Ex. 75 |
|---|---|---|---|---|---|---|---|---|---|---|---|
| Driving stability (score) | 3 | 3 | 3 | 3.5 | 3.5 | 3.5 | 3.5 | 3.5 | 3.5 | 3 | 3 |
| Air leakage (index) | 100 | 99 | 101 | 100 | 96 | 93 | 100 | 100 | 100 | 100 | 100 |
| Rolling resistance (index) | 100 | 97 | 97 | 97 | 99 | 99 | 97 | 97 | 98 | 100 | 101 |

The tires of Examples 124 to 128 selecting the thicknesses prescribed in the present invention exhibited good results in terms of the durability, riding comfort and driving stability, air leakage, and rolling resistance. As opposed to this, the tire of Comparative Example 72 making the thickness of the air barrier layer 0.1 mm exhibited an inferior air barrier property. Further, in the tire of Comparative Example 73 making the thickness of the air barrier layer 1.5 mm was increased in tire mass. In the tire of comparative Example 74 with no bonding rubber layer, the durability is not satisfied, while in the tire of Comparative Example 75 making the thickness of the bonding rubber 1.2 mm, the tire mass was increased and the rolling resistance became worse.

In the following standard Example 10, Examples 126 to 139, and Comparative Examples 76 to 83, test tires of a tire size of 185/65R14 were fabricated using the ingredients of the formulations listed in the tables and giving the tire configurations listed in the tables and the results of tests on the same were shown.

The following commercial products were used for the ingredients of the formulations used in the examples. Note that blending agents not changed in amount are not listed in the tables of the examples.

| 1) Ingredients of Formulations of Toe Portion Rubber Members | |
|---|---|
| HNBR: Zetpol 2020 (made by Nippon Zeon) | variate |
| Zinc methacrylate: R-20S (made by Asada Chemical Industry) | variate |
| Carbon black (FEF grade): HTC-100 (made by Shinnikka Carbon) | variate |
| Zinc oxide: Zinc White #3 (made by Seido Chemical Industry) | 5 parts by weight |
| Antioxidant: Nauguard 445 (made by Uniroyal) | 1.5 parts by weight |
| Organic peroxide: Parkadox 14/40 (made by Kayaku Akzo) | 5 parts by weight |
| 2) Ingredients of Formulations of Bonding Rubber Layer | |
| Diene-based rubber (NR): RSS#3 | variate |
| NBR: Nipol DN401 (made by Nippon Zeon) | variate |
| Carbon black: N339 (made by Showa Cabot) | 50 parts by weight |
| Aromatic petroleum resin: FR-120 (made by Fujikosan) | variate |
| Zinc oxide: Zinc White #3 (made by Seido Chemical Industry) | 5 parts by weight |
| Stearic acid: Beads Stearic Acid (made by Nippon Oil and Fat) | 1 part by weight |
| Antioxidant: Nocrac 224 (made by Ouchi Shinko Chemical) | 1 part by weight |
| Sulfur: Insoluble sulfur (case of sulfur vulcanization based formulation) | 2 parts by weight |
| Vulcanization accelerator: Nocceler CZ-G (made by Ouchi Shinko Chemical) (case of sulfur vulcanization based formulation) | 1 part by weight |
| Vulcanization accelerator: Nocceler | 0.5 part |

| -continued | |
|---|---|
| TOT-N (made by Ouchi Shinko Chemical) (case of sulfur vulcanization based formulation) | by weight |
| Organic peroxide (40% diluted): Parkadox 14/40 (made by Kayaku Akzo) (case of organic peroxide cross-linking based formulation) | 5 parts by weight |
| Co-cross-linking agent (TAIC): TAIC (made by Nippon Kasei Chemical) (case of organic peroxide cross-linking based formulation) | 3 parts by weight |

The rubber formulations used in Standard Example 10 and Comparative Example 76 were as follows:

| Rubber formulation | Conv. Ex. (Parts by weight) | Comp. Ex. 1 (Parts by weight) |
|---|---|---|
| NR: RSS#3 | 40 | 40 |
| BR: Nipol BR1220 (made by Nippon Zeon) | 60 | 60 |
| Carbon black: N326M (made by Showa Cabot) | 60 | 80 |
| Zinc oxide: Zinc White #3 (made by Seido Chemical Industry) | 5 | 5 |
| Stearic acid: Beads Stearic Acid (made by Nippon Oil and Fat) | 1 | 1 |
| Antioxidant: Nocrac 6C (made by Ouchi Shinko Chemical) | 2 | 2 |
| Phenol resin: Sumicanol 610 (made by Sumitomo Chemical) | 6 | 6 |
| Sulfur: Insoluble sulfur | 5 | 5 |
| Vulcanization accelerator: Nocceler NS-F (made by Ouchi Shinko Chemical) | 2 | 2 |

The methods of measurement and evaluation in the examples were as follows:

1) Evaluation of Resistance to Rim Detachment

Figure 12:
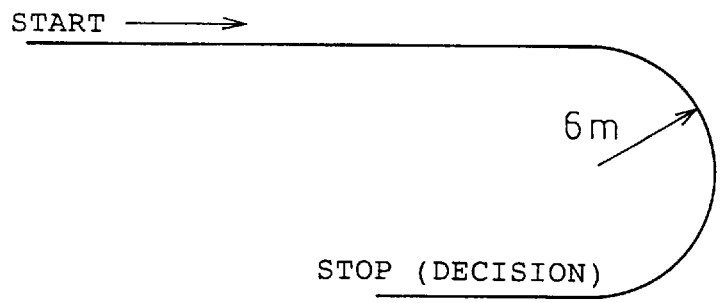
FIG. 12 is a view summarizing the test course used in a rim detachment test of a test tire.

Test tires attached to rims of 14×5.5J were mounted on a 1.5 liter engine displacement front engine front wheel drive passenger car. The car was driven on a test course comprised of a semicircle having a radius of 6 m and lines connecting with it shown in FIG. 12 at 35 km/h. The air pressure of the tire of the left front tire of the test vehicle was reduced from 200 kPa at 10 kPa increments and the air pressure when the rim touched or the tire detached from the rim was measured.

The test was conducted five times at different air pressures (200 kPa, 190 kPa, 180 kPa, . . . ) and the results were expressed indexed to the measured value for a conventional tire as reference (100) (reciprocal). The larger the index, the more superior the resistance to rim detachment.

2) Evaluation of Driving Stability

Test tires attached to rims of 14×5.5J were mounted on a 1.5 liter engine displacement front engine front wheel drive passenger car. The car was driven to warm up at a high speed for about 30 minutes. Immediately thereafter, it was driven on a slalom course comprised of an asphalt paved straight road set with five pylons at 30 meter intervals and the driving time was measured. The results were expressed indexed to the time of a conventional tire as 100 (reciprocal). The larger the index, the better the driving stability.

3) Evaluation of Rim Attachment

Test tires were attached and detached to and from rims of 14×5.5J by a rim assembler (Tire Changer MON-21E-4 made by Hoffman Japan) repeatedly 10 times and the damage to the bead toe portion was observed. Tires not damaged even after this repeated 10 times of attachment/ detachment were ranked as "very good", tires not damaged after 3 times, but damaged before 10 times were ranked as "good", and tires damaged before 3 times were ranked as "poor".

4) Evaluation of Fit

Soap water was lightly coated on the bead portions contiguous to the rim of the test tire and the tire was attached to the rim by a rim assembler (Tire Changer MON-21E-4 made by Hoffman Japan) before the soap water was dried. Next, the tire was filled to an air pressure of 200 kPa and allowed to stand for 10 minutes, then the distances between the rim check line at the bead portion of the tire and the rim flange were measured in a direction perpendicular to the tire axis at 20 locations at equal intervals along the circumference and the peak-toe-peak value was found. The value was expressed indexed to a conventional tire as 100 (reciprocal). The larger the index, the better the fit.

Standard Example 10, Examples 129 to 132, and Comparative Examples 76 to 77

(Bead Toe Portion)

The results of tests on the resistance to rim detachment, driving stability, rim attachment, and fit of test tires in the case of changing the amount of formulation of the hydrogenated NBR in the toe portion rubber member are shown in the following Table XIX.

TABLE XIX (Tire Size 185/65R14)

| | Stand. Ex. 10 | Comp. Ex. 76 | Ex. 129 | Ex. 130 | Comp. Ex. 77 | Ex. 131 | Ex. 132 |
|---|---|---|---|---|---|---|---|
| <Toe portion rubber member> | | | | | | | |
| Formulation | A | B | C | C | D | E | E |
| Hydrogenated NBR (parts by weight) | 0 | 0 | 100 | 100 | 60 | 70 | 100 |
| Zinc methacrylate (parts by weight) | 0 | 0 | 80 | 80 | 80 | 80 | 80 |
| Carbon black (parts by weight) | 60 | 80 | 0 | 0 | 0 | 0 | 0 |
| Zinc methacrylate and carbon black total (parts by weight) | 60 | 80 | 80 | 80 | 80 | 80 | 80 |
| <Bonding rubber layer> | | | | | | | |
| Existence of bonding rubber layer | No | No | No | Yes | Yes | Yes | Yes |
| Formulation | | | | R | R | R | R |
| Ratio A:B of (A) diene-based rubber and (B) NBR | — | — | — | 50:50 | 50:50 | 50:50 | 50:50 |
| (C) aromatic petroleum resin to 100 parts by weight (A) + (B) (parts by weight) | — | — | — | 30 | 30 | 30 | 30 |
| Sulfur (parts by weight) | — | — | — | 2 | 2 | 2 | 2 |
| Vulcanization accelerator (CZ) parts by weight) | — | — | — | 1 | 1 | 1 | 1 |
| Vulcanization accelerator (TOT-N) (parts by weight) | — | — | — | 0.5 | 0.5 | 0.5 | 0.5 |
| Triallyl isocyanurate (parts by weight) | — | — | — | 0 | 0 | 0 | 0 |
| Organic peroxide (parts by weight) | — | — | — | 0 | 0 | 0 | 0 |
| Thickness of bonding rubber layer (mm) | — | — | — | 0.5 | 0.5 | 0.5 | 0.5 |
| <Evaluation> | | | | | | | |
| Resistance to rim detachment (index) | 100 | 121 | 121 | 121 | 106 | 106 | 121 |
| Driving stability (index) | 100 | 106 | 107 | 106 | 97 | 101 | 106 |
| Rim attachment | Good | Poor | V. Good | V. Good | V. Good | V. Good | V. Good |
| Fit (index) | 100 | 99 | 101 | 100 | 102 | 101 | 100 |

From the results of Table XIX, it is seen that the tires of examples using rubber members of toe portion having the compositions of the hydrogenated NBR in accordance with the present invention all exhibited superior resistance to rim detachment, driving stability, rim attachment, and fit.

Standard Example 10, Examples 133 to 135, and Comparative Examples 78 to 81

(Bead Toe Portion)

The results of tests on the resistance to rim detachment, driving stability, rim attachment, and fit of test tires in the case of changing the amounts of formulation of zinc methacrylate and carbon black in the rubber members of the toe portion are shown in the following Table XX.

TABLE XX (Tire Size 185/65R14)

|  | Stand. Ex. 10 | Comp. Ex. 78 | Ex. 133 | Ex. 134 | Comp. Ex. 79 | Ex. 135 | Comp. Ex. 80 | Comp. Ex. 81 |
|---|---|---|---|---|---|---|---|---|
| <Toe portion rubber member> | | | | | | | | |
| Formulation | A | G | H | I | J | K | L | M |
| Hydrogenated NBR (parts by weight) | 0 | 100 | 100 | 100 | 100 | 100 | 100 | 100 |
| Zinc methacrylate (parts by weight) | 0 | 10 | 20 | 120 | 130 | 80 | 80 | 100 |
| Carbon black (parts by weight) | 60 | 0 | 0 | 0 | 0 | 40 | 45 | 30 |
| Zinc methacrylate and carbon black total (parts by weight) | 60 | 10 | 20 | 120 | 130 | 120 | 125 | 130 |
| <Bonding rubber layer> | | | | | | | | |
| Existence of bonding rubber layer | No | Yes | Yes | Yes | Yes | Yes | Yes | Yes |
| Formulation | — | R | R | R | R | R | R | R |
| Ratio A:B of (A) diene-based rubber and (B) NBR | — | 50:50 | 50:50 | 50:50 | 50:50 | 50:50 | 50:50 | 50:50 |
| (C) aromatic petroleum resin to 100 parts by weight (A) + (B) (parts by weight) | — | 30 | 30 | 30 | 30 | 30 | 30 | 30 |
| Sulfur (parts by weight) | — | 2 | 2 | 2 | 2 | 2 | 2 | 2 |
| Vulcanization accelerator (CZ) parts by weight) | — | 1 | 1 | 1 | 1 | 1 | 1 | 1 |
| Vulcanization accelerator (TOT-N) (parts by weight) | — | 0.5 | 0.5 | 0.5 | 0.5 | 0.5 | 0.5 | 0.5 |
| Triallyl isocyanurate (parts by weight) | — | 0 | 0 | 0 | 0 | 0 | 0 | 0 |
| Organic peroxide (parts by weight) | — | 0 | 0 | 0 | 0 | 0 | 0 | 0 |
| Thickness of bonding rubber layer (mm) | — | 0.5 | 0.5 | 0.5 | 0.5 | 0.5 | 0.5 | 0.5 |
| <Evaluation> | | | | | | | | |
| Resistance to rim detachment (index) | 100 | 95 | 103 | 121 | 131 | 131 | 131 | 131 |
| Driving stability (index) | 100 | 94 | 101 | 105 | 106 | 104 | 104 | 105 |
| Rim attachment | Good | V. Good | V. Good | V. Good | Poor | V. Good | Poor | Poor |
| Fit (index) | 100 | 103 | 103 | 102 | 98 | 101 | 98 | 97 |

From the results of Table XX, it is seen that the tires of examples using rubber members of toe portion having the compositions of zinc methacrylate and carbon black in accordance with the present invention all exhibited superior resistance to rim detachment, driving stability, rim attachment, and fit.

Standard Example 10 and Examples 136 to 137 (Bead Toe Portion)

The results of tests on the resistance to rim detachment, driving stability, rim attachment, and fit of test tires in the case of changing the ratio of formulation of the (A) diene-based rubber and (B) NBR in the bonding rubber layer are shown in the following Table XXI.

TABLE XXI (Tire Size: 185/65R14)

|  | Stand. Ex. 10 | Ex. 136 | Ex. 137 |
|---|---|---|---|
| <Toe portion rubber members> | | | |
| Hydrogenated NBR (parts by weight) | 0 | 100 | 100 |
| Zinc methacrylate (parts by weight) | 0 | 80 | 80 |
| Carbon black (parts by weight) | 0 | 0 | 0 |
| Total of zinc methacrylate and carbon black (parts by weight) | 60 | 80 | 80 |
| <Bonding rubber layer> | | | |
| Existence of bonding rubber layer | No | Yes | Yes |
| Formulation | — | U | V |
| Ratio of formulation A:B of (A) diene-based rubber and (B) NBR | — | 10:90 | 90:10 |
| (C) Aromatic petroleum resin to 100 parts by weight of (A) + (B) (parts by weight) | — | 30 | 30 |
| Sulfur (parts by weight) | — | 2 | 2 |
| Vulcanization accelerator (CZ) (parts by weight) | — | 1 | 1 |
| Vulcanization accelerator (TOT-N) (parts by weight) | — | 0.5 | 0.5 |

TABLE XXI-continued (Tire Size: 185/65R14)

|  | Stand. Ex. 10 | Ex. 136 | Ex. 137 |
|---|---|---|---|
| Triallyl isocyanurate (parts by weight) | — | 0 | 0 |
| Organic peroxide (parts by weight) | — | 0 | 0 |
| Thickness of bonding rubber layer (mm) | — | 0.5 | 0.5 |
| <Evaluation> | | | |
| Resistance to rim detachment (index) | 100 | 121 | 121 |
| Driving stability (index) | 100 | 104 | 105 |
| Rim attachment | Good | V. Good | V. Good |
| Fit (index) | 100 | 102 | 101 |

From the results of Table XXI, it is seen that the tires of examples using bonding rubber layers having the compositions of bonding rubber layers in accordance with the present invention all exhibited superior resistance to rim detachment, driving stability, rim attachment, and fit.

Standard Example 10, Examples 138 to 142, and Comparative Examples 82 to 83

(Bead Toe Portion)

The results of tests on the resistance to rim detachment, driving stability, rim attachment, and fit of test tires in the case of changing the thickness of the bonding rubber layer are shown in the following Table XXII.

TABLE XXII (Tire Size 185/65R14)

|  | Stand. Ex. 10 | Comp. Ex. 82 | Ex. 138 | Ex. 139 | Ex. 140 | Ex. 141 | Comp. Ex. 83 | Ex. 142 |
|---|---|---|---|---|---|---|---|---|
| <Toe portion rubber member> | | | | | | | | |
| Formulation | A | A | C | C | C | C | C | C |
| Hydrogenated NBR (parts by weight) | 0 | 0 | 100 | 100 | 100 | 100 | 100 | 100 |
| Zinc methacrylate (parts by weight) | 0 | 0 | 80 | 80 | 80 | 80 | 80 | 80 |
| Carbon black (parts by weight) | 60 | 60 | 0 | 0 | 0 | 0 | 0 | 0 |
| Zinc methacrylate and carbon black total (parts by weight) | 60 | 60 | 80 | 80 | 80 | 80 | 80 | 80 |
| <Bonding rubber layer> | | | | | | | | |
| Existence of bonding rubber layer | No | Yes | Yes | Yes | Yes | Yes | Yes | Yes |
| Formulation | — | R | R | R | R | R | R | S |
| Ratio A:B of (A) diene-based rubber and (B) NBR | — | 50:50 | 50:50 | 50:50 | 50:50 | 50:50 | 50:50 | 50:50 |
| (C) aromatic petroleum resin to 100 parts by weight (A) + (B) (parts by weight) | — | 30 | 30 | 30 | 30 | 30 | 30 | 30 |
| Sulfur (parts by weight) | — | 2 | 2 | 2 | 2 | 2 | 2 | 0 |
| Vulcanization accelerator (CZ) (parts by weight) | — | 1 | 1 | 1 | 1 | 1 | 1 | 0 |
| Vulcanization accelerator (TOT-N) (parts by weight) | — | 0.5 | 0.5 | 0.5 | 0.5 | 0.5 | 0.5 | 0 |
| Triallyl isocyanurate (parts by weight) | — | 0 | 0 | 0 | 0 | 0 | 0 | 3 |
| Organic peroxide (parts by weight) | — | 0 | 0 | 0 | 0 | 0 | 0 | 2 |
| Thickness of bonding rubber layer (mm) | — | 0.05 | 0.1 | 0.2 | 0.8 | 1.5 | 2.0 | 0.5 |
| <Evaluation> | | | | | | | | |
| Resistance to rim detachment (index) | 100 | (Productivity poor) | 121 | 121 | 113 | 106 | 100 | 113 |
| Driving stability (index) | 100 | | 105 | 104 | 103 | 102 | 101 | 103 |
| Rim attachment | Good | | V. Good | V. Good | V. Good | V. Good | V. Good | V. Good |
| Fit (index) | 100 | | 103 | 102 | 102 | 100 | 97 | 102 |

From the results of Table XXII, it is seen that the tires of examples using bonding rubber layers having thicknesses of bonding rubber layers in accordance with the present invention all exhibited superior resistance to rim detachment, driving stability, rim attachment, and fit.

The following commercial products were used for the ingredients for the formulations in the predetermined parts and bonding rubber layers used for the following Standard Example 11 to 12, Examples 143 to 154, and Comparative Examples 84 to 86. Note that, in the ingredients of the formulations of the bonding rubber layers, the blending agents not changed in amount are not listed in the tables of the examples.

1) Ingredients of Formulations of Tire Parts

TABLE XXIII

Formulation of Tire Parts of Examples

| Part name | Name of product | Manufacturer | Formulation 1 Cap tread | Formulation 2 Carcass coat | Formulation 3 Belt coat | Formulation 4 Bead filler | Formulation 5 Side wall | Formulation 6 Cushion rubber | Formulation 7 Insulation | Formulation 8 Base tire* |
|---|---|---|---|---|---|---|---|---|---|---|
| | | | | | | Formulation (phr) | | | | |
| Natural rubber | RSS#3 | | | 40 | 20 | | | 20 | 20 | |
| BR | Nipol BR-1220 | Nippon Zeon | | | | | 30 | | | |
| Hydrogenated NBR | Zetpol 2020 | Nippon Zeon | 100 | 60 | 80 | 100 | 70 | 80 | 80 | 100 |
| Zinc methacrylate | R-20S | Asada Chemical Industry | 40 | 50 | 70 | 100 | 40 | 70 | 70 | 60 |
| Carbon (HAF grade) | N339 | Showa Cabot | 20 | | | | | | | |
| Carbon (FEF grade) | HTC-100 | Shinnikka Carbon | | | 10 | | 10 | 10 | 10 | |
| Zinc oxide | Zinc white #3 | Seido Chemical Industry | 3 | 3 | 3 | 5 | 3 | 3 | 3 | 3 |
| Plasticizer | BOP | Mitsubishi Gas Chemical | 10 | | | | | | | |
| Antioxidant | Nauguard 445 | Uniroyal | 1.5 | 1.5 | 1.5 | 1.5 | 1.5 | 1.5 | 1.5 | 1.5 |
| Cross-linking agent | Perkadox 14/40 | Kayaku Akzo | 5 | 5 | 5 | 8 | 3.5 | 5 | 5 | 5 |
| Co-cross-linking agent | TAIC | Nippon Kasei Chemical | 2 | 2 | 2 | 3 | 2 | 2 | 2 | 2 |

2) Ingredients of Formulations of Bonding Rubber Layer

| | |
|---|---|
| Diene-based rubber (NR): RSS#3 | variate |
| NBR: Nipol DN401 (made by Nippon Zeon) | variate |
| Carbon black: N339 (made by Showa Cabot) | 50 parts by weight |
| Aromatic petroleum resin: FR-120 (made by Fujikosan) | variate |
| Zinc oxide: Zinc White #3 (made by Seido Chemical Industry) | 5 parts by weight |
| Stearic acid: Bead Stearic Acid (made by Nippon Oil and Fat) | 1 part by weight |
| Antioxidant: Nocrac 224 (made by Ouchi Shinko Chemical) | 1 part by weight |
| Sulfur: Insoluble sulfur (case of sulfur vulcanization) | 2 parts by weight |
| Vulcanization accelerator: Nocceler CZ-G (made by Ouchi Shinko Chemical) (case of sulfur vulcanization) | 1 part by weight |
| Vulcanization accelerator: Nocceler TOT-N (made by Ouchi Shinko Chemical) (case of sulfur vulcanization) | 0.5 part by weight |
| Organic peroxide (40% diluted): Parkadox 14/40 (made by Kayaku Akzo) (case of organic peroxide cross-linking) | variate |
| Co-cross-linking agent: TAIC (made by Nippon Kasei Chemical) (case of organic peroxide cross-linking) | variate |

3) Ingredients of Conventional Formulations of Tire Parts

[1] Conventional Formulation of Cap Tread

| | |
|---|---|
| NR: RSS#3 | 50 parts by weight |
| SBR: Nipol 1502 (made by Nippon Zeon) | 50 parts by weight |
| Carbon black (HAF grade): N339 (made by Showa Cabot) | 50 parts by weight |
| Zinc oxide: Zinc White #3 (made by Seido Chemical Industry) | 3 parts by weight |
| Stearic acid: Beads Stearic Acid (made by Nippon Oil and Fat) | 1 part by weight |
| Aromatic oil: Komorex 300 (made by Nippon Oil) | 10 parts by weight |
| Antioxidant: Nocrac 6C (made by Ouchi Shinko Chemical) | 1.5 parts by weight |
| Wax: Sunnoc (made by Ouchi Shinko Chemical) | 5 parts by weight |
| Sulfur: Sanfer (made by Sanshin Chemical) | 2 parts by weight |
| Vulcanization accelerator: Nocceler NS-F (made by Ouchi Shinko Chemical) | 1 part by weight |

[2] Conventional Formulation of Carcass Coat

| | |
|---|---|
| NR: RSS#3 | 70 parts by weight |
| SBR: Nipol 1502 (made by Nippon Zeon) | 30 parts by weight |
| Carbon black (FEF grade): HTC-100 (made by Shinnikka Carbon) | 50 parts by weight |
| Zinc oxide: Zinc White #3 (made by Seido Chemical Industry) | 5 parts by weight |
| Stearic acid: Beads Stearic Acid (made by Nippon Oil and Fat) | 1 part by weight |

-continued

| | |
|---|---|
| Aromatic oil: Komorex 300 (made by Nippon Oil) | 8 parts by weight |
| Antioxidant: Nocrac 224 (made by Ouchi Shinko Chemical) | 1.5 parts by weight |
| Sulfur: Sanfer (made by Sanshin Chemical) | 2.5 parts by weight |
| Vulcanization accelerator: Nocceler CZ-G (made by Ouchi Shinko Chemical) | 1 part by weight |
| Vulcanization accelerator: Nocceler NS-F (made by Ouchi Shinko Chemical) | 1.5 parts by weight |
| [3] Conventional Formulation of Belt Coat | |
| NR: RSS#3 | 100 parts by weight |
| Carbon black (HAF grade): N339 (made by Showa Cabot) | 60 parts by weight |
| Zinc oxide: Zinc White #3 (made by Seido Chemical Industry) | 7 parts by weight |
| Stearic acid: Beads Stearic Acid (made by Nippon Oil and Fat) | 0.5 part by weight |
| Antioxidant: Nocrac 224 (made by Ouchi Shinko Chemical) | 2 parts by weight |
| Cobalt stearate (made by Dainippon Ink and Chemicals) | 1 part by weight |
| RF resin: Sumicanol 610 (made by Sumitomo Chemical) | 2 part by weight |
| Sulfur: Sanfer (made by Sanshin Chemical) | 5 parts by weight |
| Vulcanization accelerator: Nocceler CZ-G (made by Ouchi Shinko Chemical) | 1 part by weight |
| [4] Conventional Formulation of Bead Filler | |
| NR: RSS#3 | 80 parts by weight |
| SBR: Nipol 1502 (made by Nippon Zeon) | 20 parts by weight |
| Carbon black (HAF grade): N339 (made by Showa Cabot) | 70 parts by weight |
| Zinc oxide: Zinc White #3 (made by Seido Chemical Industry) | 5 parts by weight |
| Stearic acid: Beads Stearic Acid (made by Nippon Oil and Fat) | 1 part by weight |
| Aromatic oil: Komorex 300 (made by Nippon Oil) | 5 parts by weight |
| Antioxidant: Nocrac 224 (made by Ouchi Shinko Chemical) | 1.5 parts by weight |
| Sulfur: Sanfer (made by Sanshin Chemical) | 3 parts by weight |
| Vulcanization accelerator: Nocceler CZ-G (made by Ouchi Shinko Chemical) | 1 part by weight |
| [5] Conventional Formulation of Side Wall | |
| NR: RSS#3 | 60 parts by weight |
| BR: Nipol BR1220 (made by Nippon Zeon) | 40 parts by weight |
| Carbon black (FEF grade): HTC-100 (made by Shinnikka Carbon) | 50 parts by weight |
| Zinc oxide: Zinc White #3 (made by Seido Chemical Industry) | 5 parts by weight |
| Stearic acid: Beads Stearic Acid (made by Nippon Oil and Fat) | 1 part by weight |
| Aromatic oil: Komorex 300 (made by Nippon Oil) | 8 parts by weight |
| Antioxidant: Nocrac 6C (made by Ouchi Shinko Chemical) | 1 part by weight |
| Antioxidant: Nocrac 224 (made by Ouchi Shinko Chemical) | 0.5 parts by weight |
| Wax: Sunnoc (made by Ouchi Shinko Chemical) | 1 part by weight |
| Sulfur: Sanfer (made by Sanshin Chemical) | 2 parts by weight |
| Vulcanization accelerator: Nocceler NS-F (made by Ouchi Shinko Chemical) | 1 part by weight |
| [6] Conventional Formulation of Bead Insulation | |
| NR: RSS#3 | 70 parts by weight |
| SBR: Nipol 1502 (made by Nippon Zeon) | 30 parts by weight |
| Carbon black (FEF grade): HTC-100 (made by Shinnikka Carbon) | 70 parts by weight |
| Clay: T clay (made by Nippon Talc) | 10 parts |

-continued

| | |
|---|---|
| | by weight |
| Zinc oxide: Zinc White #3 (made by Seido Chemical Industry) | 3 parts by weight |
| Stearic acid: Beads Stearic Acid (made by Nippon Oil and Fat) | 2 parts by weight |
| Aromatic oil: Komorex 300 (made by Nippon Oil) | 10 parts by weight |
| Antioxidant: Nocrac 224 (made by Ouchi Shinko Chemical) | 1 part by weight |
| Sulfur: Sanfer (made by Sanshin Chemical) | 4 parts by weight |
| Vulcanization accelerator: Nocceler NS-F (made by Ouchi Shinko Chemical) | 1 part by weight |

The test tires used in the following examples were fabricated as follows:

Fabrication of Test Tires

Parts and bonding rubber layers comprised of compositions of the formulations shown in the examples were successively arranged and bonded at predetermined positions in accordance with the tire configurations of the example to prepare test tires (size: 185/65R14) for use in the following tests.

The test and evaluation methods in the examples were as follows:

1) Durability Test Method

Tires were run under the following conditions and ranked as failing (poor) when trouble occurred and passing (good) when it did not.

Running conditions; A drum tester having a smooth drum surface, made of steel, and having an inside diameter of 1707 mm was used, the ambient temperature was controlled to 38±3° C., and the tires were run under conditions of a rim size of 14×5 1/2JJ, an internal pressure of 180 kPa, and a speed of 80 km/h under a load of 4.42 kN for 4 hours, then under a load of 4.68 kN for 6 hours, then under a load of 5.20 kN for 24 hours. Here, the running was stopped once, then if no abnormalities were observed in the appearance, it was resumed under a load of 5.98 kN for 4 hours, then under a load of 6.76 kN for 2 hours.

When judged as passing (good), the tires were further run under a load of 6.76 kN for 2 hours, then under a load of 7.28 kN for 4 hours, then under a load of 8.32 kN for 4 hours. At this time, when there was no trouble in the appearance or inside, the tires were judged as passing (very good).

2) Rolling Resistance Test Method

Tires were run under the following conditions to measure the rolling resistance at that time. The results were expressed indexed to the measured value for a conventional tire as 100. (The smaller the value, the better.)

Running conditions: A drum tester having a smooth drum surface, made of steel, and having an inside diameter of 1707 mm was used, the ambient temperature was controlled to 23±2° C., and the tires were run under conditions of a rim size of 14×5 1/2JJ, an internal pressure of 200 kPa, and a speed of 80 km/h.

3) Vehicular Driving Stability Test Method

Test tires mounted on 14×5 1/2JJ rims at an internal pressure of 200 kPa were mounted on a 1.6 liter engine displacement front engine front wheel drive compact passenger car. The car was driven over a test course by five trained drivers to evaluate the feeling. The results were ranked by a five-point system based on the following judgement criteria in relative comparison with reference tires. The average of the three drivers, not including the highest score and lowest score, was shown. (The larger the values, the better.)

5: Excellent, 4: good, 3.5: somewhat good, 3: equal to reference, 2.5: somewhat poor (practical lower limit), 2: poor, 1: very poor 4) Abrasion Resistance Test Method Test tires were mounted on the four wheels of a 1.6 liter engine displacement compact passenger car. This was driven 10,000 km on a predetermined course and the average amount of abrasion for the four tires was measured. The result was expressed indexed to the amount of abrasion of a cap tread of a conventional formulation as 100. (The larger the value, the more resistant to abrasion.)

5) Cut Resistance Test Method

Tires were run under the following conditions to find the average value of the critical speed at which tires do not burst. When the average value of the critical speed was less than that of a conventional tire, the tire was rated "no good" (Poor), while when it was the same as or higher than that of a conventional tire, it was rated "good" (Good). Further, when the average value of the critical speed was more than 2 km/h higher than that of the conventional tire, it was rated "very good" (V.Good).

Running conditions: Test tires were mounted on a 1.6 liter engine displacement front engine front wheel drive compact passenger car with a rim size of 14×5 1/2JJ and an internal pressure of 200 kPa and were driven over a steel rail of a height of 100 mm as shown below at an angle of 30°. The speed at this time was changed from 10 km/h in steps of 1.0 km/h. The critical speed at which the tires would not burst was investigated by n=3 and the cut resistance was evaluated from that average value.

6) Air Leakage Test Method

The tire was allowed to stand at an initial pressure of 200 kPa, room temperature of 21° C., and no load conditions for three months. The internal pressure was measured at intervals of four days. The α value was found by recurrence to the following equation where the measurement pressure was Pt, the initial pressure was $P_0$, and the number of days elapsed was t:

$$Pt/P_0 = exp(-\alpha t)$$

Using the α obtained and substituting 30 (days) for t, the following was obtained:

$$\beta = [1 - exp(-\alpha t)] \times 100$$

β was made the air leakage (%/month) per month,

Standard Example 11, Example 143 to 147, and Comparative Example 84 to 86

These examples show the results of tests on the durability and rolling resistance of test tires (configurations of FIG. 7) using a rubber containing the hydrogenated NBR for the carcass coat, belt coat, rubber between belt end layers, and rubber between belt end and carcass layer (cushion rubber) and using conventional formulations of rubber (diene-based rubber) for other part members. The results are shown in Table XXIV.

TABLE XXIV (Tire Size: 185/65R14)

| Bonding rubber formulation | Stand. Ex. 11 (Control) | Comp. Ex. 84 | Ex. 143 | Ex. 144 | Comp. Ex. 85 | Ex. 145 | Ex. 146 | Comp. Ex. 86 | Ex. 147 |
|---|---|---|---|---|---|---|---|---|---|
| NR (phr) | — | | 10 | 90 | 60 | 60 | 60 | 60 | 60 |
| NBR (phr) | — | | 90 | 10 | 40 | 40 | 40 | 40 | 40 |
| Aromatic petroleum resin (phr) | — | | 40 | 40 | 3 | 5 | 80 | 85 | 40 |
| Sulfur (phr) | — | | 2 | 2 | 2 | 2 | 2 | 2 | |
| Vulcanization accelerator (CZ) (phr) | — | | 1 | 1 | 1 | 1 | 1 | 1 | |
| Vulcanization accelerator (TOT-N) (phr) | — | | 0.5 | 0.5 | 0.5 | 0.5 | 0.5 | 0.5 | |
| Co-cross-linking agent (TAIC) (phr) | — | | | | | | | | 3 |
| Organic peroxide (phr) | — | | | | | | | | 1.4 |
| IIR sheet (mm) | | 0.4 | | | | | | | |
| Ultrahigh molecular weight PE sheet (mm) | | 0.1 | | | | | | | |
| Test results* | | | | | | | | | |
| Durability | V. Good | Poor | Good | Good | Poor | Good | Good | Poor | V. Good |
| Rolling resistance (index) | 100 | 96 | 96 | 96 | 96 | 96 | 97 | 97 | 96 |

*Composition of Japanese Unexamined Patent Publication (Kokai) No. 5-185805

Standard Example 11: Conventional tire having carcass coat and belt coat of conventional rubber formulations.

Comparative Example 84: Example where bonding layer is made two-layer structure of IIR of thickness of 0.4 mm and UHMwPE (ultrahigh molecular weight polyethylene) of thickness of 0.1 mm. (Bond poor and durability no good.)

The thicknesses of the bonding rubber layers in the following Example 143, Comparative Example 85 and the subsequent Examples thereof were entirely made 0.5 mm.

Example 143: Example where the ratio of rubbers in bonding rubber is NR/NBR=10/90.

Example 144: Example where the ratio of rubbers in bonding rubber is NR/NBR=90/10.

Comparative Example 85: Example where the amount of aromatic petroleum resin formulated in bonding rubber is less than lower limit. (Bond poor and durability no good.)

Example 145: Example where the amount of aromatic petroleum resin formulated in bonding rubber is lower limit.

Example 146: Example where the amount of aromatic petroleum resin formulated in bonding rubber is upper limit.

Comparative Example 86: Example where the amount of aromatic petroleum resin formulated in bonding rubber exceeds upper limit. (Bond poor and durability no good.)

Example 147: Example of case of blending co-cross-linking agent in bonding rubber and cross-linking by organic peroxide. (Bond good and durability further improved.)

Standard Example 12 and Examples 148 to 154

These examples show the results of tests on the durability, rolling resistance, vehicular driving stability, abrasion resistance, cut resistance, and air barrier property of test tires (configurations of FIG. 7 to FIG. 11) using a rubber containing the hydrogenated NBR for different predetermined part members and using conventional formulations of rubber (diene-based rubber) for other than the predetermined part members. The results are shown in Table XXV.

CAPABILITY OF UTILIZATION IN INDUSTRY

As explained above, according to the present invention, by using a rubber containing a predetermined hydrogenated NBR for predetermined parts or all of the part members in a pneumatic tire and using a predetermined bonding rubber layer for the bonding layer between the rubber containing the hydrogenated NBR and the adjoining other general purpose rubber, it is possible to obtain a pneumatic tire which lightens the weight of the tire, improves the characteristics such as the durability, rolling resistance, vehicular driving stability, cut resistance, and air leakage or can be decorated.

What is claimed is:

1. A pneumatic tire having at a side wall portion a crescent sectional-shape reinforcing liner layer comprised of a rubber composition containing, based on a total 100 parts by weight of a rubber containing 70 to 100 parts by weight of an

TABLE XXV (Tire Size: 185/65R14)

| Bonding rubber formulation | Stand. Ex. 12 | Ex. 148 | Ex. 149 | Ex. 150 | Ex. 151 | Ex. 152 | Ex. 153 | Ex. 154 |
|---|---|---|---|---|---|---|---|---|
| NR (phr) | — | 60 | 60 | 60 | 60 | 60 | — | — |
| NBR (phr) | — | 40 | 40 | 40 | 40 | 40 | — | — |
| Aromatic petroleum resin (phr) | — | 30 | 30 | 30 | 30 | 30 | — | — |
| Sulfur (phr) | — | 2 | 2 | 2 | 2 | 2 | — | — |
| Vulcanization accelerator (CZ) (phr) | — | 1 | 1 | 1 | 1 | 1 | — | — |
| Vulcanization accelerator (TOT-N) (phr) | — | 0.5 | 0.5 | 0.5 | 0.5 | 0.5 | — | — |
| Co-cross-linking agent (TAIC) (phr) | — | | | | | | | |
| Organic perioxide (phr) | — | | | | | | | |
| Tire configuration | | | | | | | | |
| Member comprised by rubber including hydrogenated NBR | No | *6 (FIG. 7) | *7 | *8 (FIG. 8) | *9 (FIG. 9) | *10(FIG. 11) | *11(see FIG. 10) | *12(see FIG. 10) |
| Cap tread | C. form. | C. form | C. form. | C. form. | C. form. | C. form. | Form. 1 | Form. 1 |
| Carcass coat | C. form. | Form. 2 | Form. 2 | Form. 2 | Form. 2 | Form. 2 | Form. 2 | Form. 8 |
| Belt coat | C. form. | Form. 3 | Form. 3 | Form. 3 | Form. 3 | Form. 3 | Form. 3 | Form. 8 |
| Bead filler | C. form. | C. form. | C. form. | Form. 4 | Form. 4 | Form. 4 | Form. 4 | Form. 8 |
| Side wall | C. form. | C. form. | C. form. | C. form. | Form. 5 | Form. 5 | Form. 5 | Form. 8 |
| Bead insulation | C. form. | C. form. | C. form. | C. form. | C. form. | C. form. | C. form. | Form. 8 |
| Bonding rubber thickness (mm) | — | 0.5 | 0.5 | 0.5 | 0.5 | 0.5 | — | — |
| Inner liner | Yes | Yes | No | Yes | Yes | Yes | No | No |
| Mass (g) | 7300 | 7350 | 6940 | 6860 | 6800 | 6850 | 6850 | 6880 |
| Test results | | | | | | | | |
| Durability | V. Good | Good | Good | Good | Good | Good | Good | Good |
| Rolling resistance (index) | 100 | 96 | 94 | 95 | 93 | 93 | 91 | 91 |
| Vehicular driving stability | 3.0 | 3.0 | 3.0 | 3.2 | 3.2. | 3.3 | 3.2 | 3.3 |
| Abrasion resistance (index) | 100 | 100 | 100 | 100 | 100 | 100 | 125 | 125 |
| Cut resistance | Good | Good | Good | Good | V. Good | V. Good | V. Good | V. Good |
| Air leakage (%/month) | 3.0 | 2.7 | 3 | 2.7 | 2.5 | 2.5 | 2.6 | 2.6 |

Standard Example 12: Conventional tire where all part members are constituted by conventional formulations of rubber.

As will be understood from Examples 148 to 154, according to the present invention, by using a rubber containing a predetermined hydrogenated NBR for predetermined parts or all of the part members in a pneumatic tire and using a predetermined bonding rubber layer for the bonding layer between the rubber containing the hydrogenated NBR and adjoining parts comprised of other general purpose rubber, it is possible to obtain a pneumatic tire which is lightened in the weight of the tire and improves the characteristics such as the durability, rolling resistance, vehicular driving stability, cut resistance, and air leakage.

ethylenic unsaturated nitrile-conjugated diene-based highly saturated copolymer rubber having a content of conjugated diene units of not more than 30 percent by weight, 20 to 120 parts by weight of zinc mothacrylate, containing no carbon black or not more than 40 parts by weight of the same, and having a total of formulations of zinc methacrylate and carbon black of not more than 120 parts by weight, and bonded with an adjoining rubber layer through a bonding rubber layer having a thickness of 0.2 to 0.8 mm, cross-linked by an organic peroxide and containing, based on a total 100 parts by weight of (A) at least one type of diene-based rubber selected from the group consisting of a natural rubber, polyisoprene rubber, polybutadiene rubber, and conjugated diene-aromatic vinyl copolymer rubber and (B) an acrylonitrile-butadiene copolymer rubber, (C) 5 to 80 parts by weight of an aromatic petroleum resin having an average molecular weight of 300 to 1500, a softening point of 50 to 160° C., and an iodine adsorption value of at least 20 g/100g.

2. A pneumatic tire as set forth in claim 1, wherein the bonding rubber layer further contains at least one co-cross-linking agent selected from the group consisting of a methacrylic acid higher ester, triallyl isocyanurate, metal salt of methacrylic acid or acrylic acid, diallyl phthalate ester, and 1,2-polybutadiene, and is cross-linked by the organic peroxide together with the co-cross-linking agent.

3. A pneumatic tire as set form in claim 1, wherein the reinforcing liner layer is placed inside a carcass at a side portion in such a manner that one end overlaps an end of a belt layer and another end overlaps an upper end of a bead filler.

4. A pneumatic tire as set forth in claim 1, wherein a carcass at a side portion is comprised of at least two plies and has a structure in which these plies are in one piece turned up outward from the inside of the tire around a bead core.

* * * * *